United States Patent
Matsumoto et al.

(10) Patent No.: US 12,188,843 B2
(45) Date of Patent: Jan. 7, 2025

(54) TEST DEVICE FOR CONTROLLING A TEST PROCESS AND METHOD FOR TESTING A STEERING DEVICE

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuyoshi Tashiro, Kanagawa (JP); Kazuhiro Murauchi, Tokyo (JP); Hiroyuki Miura, Tokyo (JP); Akihiro Yonekawa, Kanagawa (JP); Kazuki Shinohara, Tokyo (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 734 days.

(21) Appl. No.: 17/200,438

(22) Filed: Mar. 12, 2021

(65) Prior Publication Data
US 2021/0199539 A1  Jul. 1, 2021

Related U.S. Application Data

(63) Continuation-in-part of application No. PCT/JP2019/037598, filed on Sep. 25, 2019.

(30) Foreign Application Priority Data

Sep. 28, 2018 (JP) ................ 2018-185741
Nov. 13, 2018 (JP) ................ 2018-212723

(51) Int. Cl.
*G01M 17/007* (2006.01)
*G06N 20/00* (2019.01)

(52) U.S. Cl.
CPC .......... *G01M 17/007* (2013.01); *G06N 20/00* (2019.01)

(58) Field of Classification Search
CPC ............................ G01M 17/007; G06N 20/00
See application file for complete search history.

(56) References Cited

U.S. PATENT DOCUMENTS 5,819,194 A * 10/1998 Hara ............... B60K 17/35
                                                    475/221
2009/0240389 A1 * 9/2009 Nomura ............... H02P 6/16
                                                    701/41

(Continued)

FOREIGN PATENT DOCUMENTS

CN    205138806 U    4/2016
JP    S61-11633 Y2   4/1986

(Continued)

OTHER PUBLICATIONS

JP2012093327A (Year: 2012).*

(Continued)

*Primary Examiner* — Manish S Shah
*Assistant Examiner* — Sharad Timilsina
(74) *Attorney, Agent, or Firm* — Oliff PLC

(57) ABSTRACT

A test device includes an input side drive part that drives a steering shaft of a steering device, a control part that controls the input side drive part, and a position detecting part that detects an angular position of the steering shaft. The control part restricts a maximum value of a torque of the steering shaft when the angular position reaches an end-abutment position. The control part also controls driving of the steering shaft by a position control in which the angular position is used as a controlled variable and a torque control in which the torque is used as a controlled variable. The control part performs the position control when the angular position is outside a first angular range including the end-abutment position and switches the driving of the steering shaft from (Continued)

the position control to the torque control when the angular position reaches within the first angular range.

19 Claims, 38 Drawing Sheets

(56) References Cited

U.S. PATENT DOCUMENTS

| | | | |
|---|---|---|---|
| 2011/0125450 | A1 | 5/2011 | Lindenstruth |
| 2017/0199102 | A1 | 7/2017 | Badiru et al. |
| 2019/0225260 | A1* | 7/2019 | Tsubaki ............. B62D 6/002 |
| 2019/0316532 | A1* | 10/2019 | Houle ................. F02D 9/02 |
| 2019/0367085 | A1* | 12/2019 | Kataoka ............. B62D 6/10 |

FOREIGN PATENT DOCUMENTS

| | | | |
|---|---|---|---|
| JP | S62-225923 | A | 10/1987 |
| JP | H04-11819 | B2 | 3/1992 |
| JP | 2809272 | B2 | 10/1998 |
| JP | 2002-228555 | A | 8/2002 |
| JP | 4807545 | B2 * | 11/2011 |
| JP | 4831338 | B2 | 12/2011 |
| JP | 2012-93327 | A | 5/2012 |
| JP | 5483592 | B2 * | 5/2014 |
| JP | 2015-219115 | A | 12/2015 |
| KR | 10-1998-0058879 | A | 10/1998 |
| KR | 10-2001-0009053 | A | 2/2001 |
| WO | WO-2009086700 | A1 * | 7/2009 ............. B60K 6/448 |

OTHER PUBLICATIONS

WO_2009086700 (Year: 2009).*
JP_4807545_B2_ (Year: 2011).*
Mar. 23, 2021 International Preliminary Report on Patentability issued in International Patent Application No. PCT/JP2019/037598.
Aug. 14, 2023 Office Action issued in Japanese Patent Application No. 2021-208302.
Dec. 17, 2019 International Search Report issued in International Patent Application No. PCT/JP2019/037598.
Feb. 14, 2024 Request for the Submission of an Opinion issued in Korean Patent Application No. 10-2024-7002109.
Oct. 25, 2024 Office Action issued in Korean Patent Application No. 10-2024-7002109.

* cited by examiner

| EXECUTION NUMBER | WAVEFORM PATTERN | |
|---|---|---|
| 1 | WAVEFORM PATTERN A | ⎫ |
| 2 | WAVEFORM PATTERN A | |
| 3 | WAVEFORM PATTERN B | |
| 4 | WAVEFORM PATTERN B | |
| 5 | WAVEFORM PATTERN E | |
| 6 | WAVEFORM PATTERN E | ⎬ L1(TEST GROUP I x 2) |
| 7 | WAVEFORM PATTERN A | |
| 8 | WAVEFORM PATTERN A | |
| 9 | WAVEFORM PATTERN B | |
| 10 | WAVEFORM PATTERN B | |
| 11 | WAVEFORM PATTERN E | |
| 12 | WAVEFORM PATTERN E | ⎭ |
| 13 | WAVEFORM PATTERN F | ⎫ |
| 14 | WAVEFORM PATTERN F | ⎬ L2(TEST GROUP F x 3) |
| 15 | WAVEFORM PATTERN F | ⎭ |
| 16 | WAVEFORM PATTERN C | ⎫ |
| 17 | WAVEFORM PATTERN D | |
| 18 | WAVEFORM PATTERN D | ⎬ L3(TEST BLOCK H x 2) |
| 19 | WAVEFORM PATTERN C | |
| 20 | WAVEFORM PATTERN D | |
| 21 | WAVEFORM PATTERN D | ⎭ |
| 22 | WAVEFORM PATTERN A | ⎫ |
| 23 | WAVEFORM PATTERN C | |
| 24 | WAVEFORM PATTERN D | |
| 25 | WAVEFORM PATTERN D | |
| 26 | WAVEFORM PATTERN C | |
| 27 | WAVEFORM PATTERN D | |
| 28 | WAVEFORM PATTERN D | |
| 29 | WAVEFORM PATTERN A | ⎬ L4(TEST GROUP J x 2) |
| 30 | WAVEFORM PATTERN C | |
| 31 | WAVEFORM PATTERN D | |
| 32 | WAVEFORM PATTERN D | |
| 33 | WAVEFORM PATTERN C | |
| 34 | WAVEFORM PATTERN D | |
| 35 | WAVEFORM PATTERN D | ⎭ |

FIG. 13

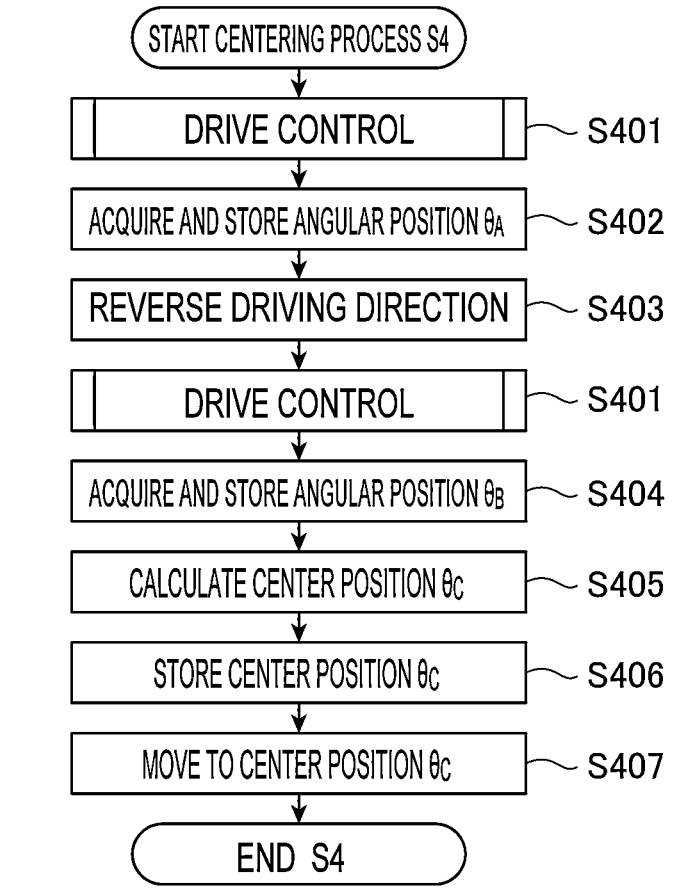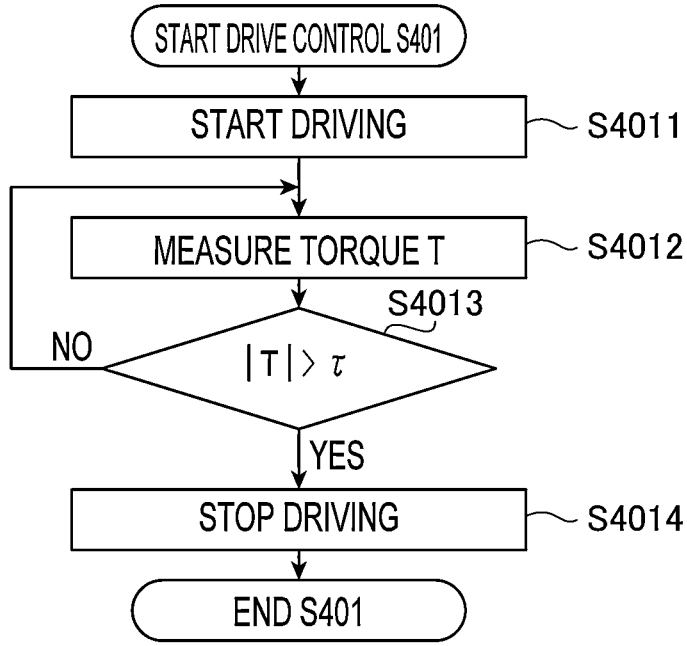
FIG. 21

TEST DEVICE FOR CONTROLLING A TEST PROCESS AND METHOD FOR TESTING A STEERING DEVICE

CROSS-REFERENCE TO RELATED APPLICATION

This is a Continuation-in-Part of International Application No. PCT/JP2019/037598 filed on Sep. 25, 2019, which claims priorities from Japanese Patent Application No. 2018-185741 filed on Sep. 28, 2018 and Japanese Patent Application No. 2018-212723 filed on Nov. 13, 2018. The entire disclosures of the prior applications are incorporated herein by reference.

BACKGROUND

Technical Field

The present disclosure relates to a test device, a method for setting a test process, and a method for testing a steering device.

Related Art

There has been known a test device that tests durability and the like of a steering device of a vehicle.

SUMMARY

In the durability test of the steering device, a steering shaft is repeatedly driven to reciprocally rotate at a predetermined angular velocity over the entire movable range. When the steering shaft reaches an end (end-abutment position) of the movable range of the steering device while being driven at a predetermined angular velocity, a rack end may violently collide with a gear case or the like, and a load significantly exceeding an allowable value may be instantaneously applied to the specimen. When such an excessive load is applied to the specimen, validity of the test result is impaired.

Aspects of the present disclosure are advantageous to provide one or more test devices that enables more appropriate evaluation of a specimen by driving the steering shaft so that torque exceeding the allowable value is not applied to the specimen when the specimen reaches the end-abutment position.

According to aspects of the present disclosure, there is provided a test device including an input side drive part capable of rotationally driving a steering shaft of a steering device as a specimen, a control part configured to control the input side drive part, and a position detecting part configured to detect an angular position of the steering shaft. The control part is configured to be capable of controlling the input side drive part so as to restrict a maximum value of a torque of the steering shaft when the angular position of the steering shaft reaches an end-abutment position being an end of a movable range of the steering shaft. The control part is also configured to be capable of controlling driving of the steering shaft by a position control in which the angular position of the steering shaft is used as a controlled variable and a torque control in which the torque of the steering shaft is used as a controlled variable. The control part performs the position control when the angular position of the steering shaft is outside a first angular range including the end-abutment position and switches the driving of the steering shaft from the position control to the torque control when the angular position of the steering shaft reaches within the first angular range.

According to aspects of the present disclosure, there is further provided a test device including an input side drive part capable of rotationally driving a steering shaft of a steering device as a specimen, and a control part configured to control the rotational driving of the steering shaft by the input side drive part, the control part being configured to be capable of executing a reversing control of immediately reversing a rotation direction of the steering shaft when an angular position of the steering shaft reaches an end-abutment position being an end of a movable range of the steering shaft, and the reversing control including a skip process of jumping to a next control point at which a torque is expected to be substantially equal to the torque at that time when the angular position of the steering shaft reaches the end abutment position.

According to aspects of the present disclosure, there is further provided a test device Including an input side drive part capable of rotationally driving a steering shaft of a steering device as a specimen, and a control part configured to control the rotational driving of the steering shaft by the input side drive part, the control part being configured to be capable of executing a reversing control of reversing a rotation direction of the steering shaft when an angular position of the steering shaft reaches an end-abutment position being an end of a movable range of the steering shaft, and the reversing control including a skip process of jumping to a next control point at which a target value of the angular position of the steering shaft decreases to substantially the same level as a value at that time when a torque of the steering shaft exceeds a predetermined value.

BRIEF DESCRIPTION OF THE ACCOMPANYING DRAWINGS

FIG. 13 is a diagram showing a schematic configuration of a developed sequence table.

FIG. 21 is a flowchart showing a procedure of a centering process.

DETAILED DESCRIPTION

Figure 1:
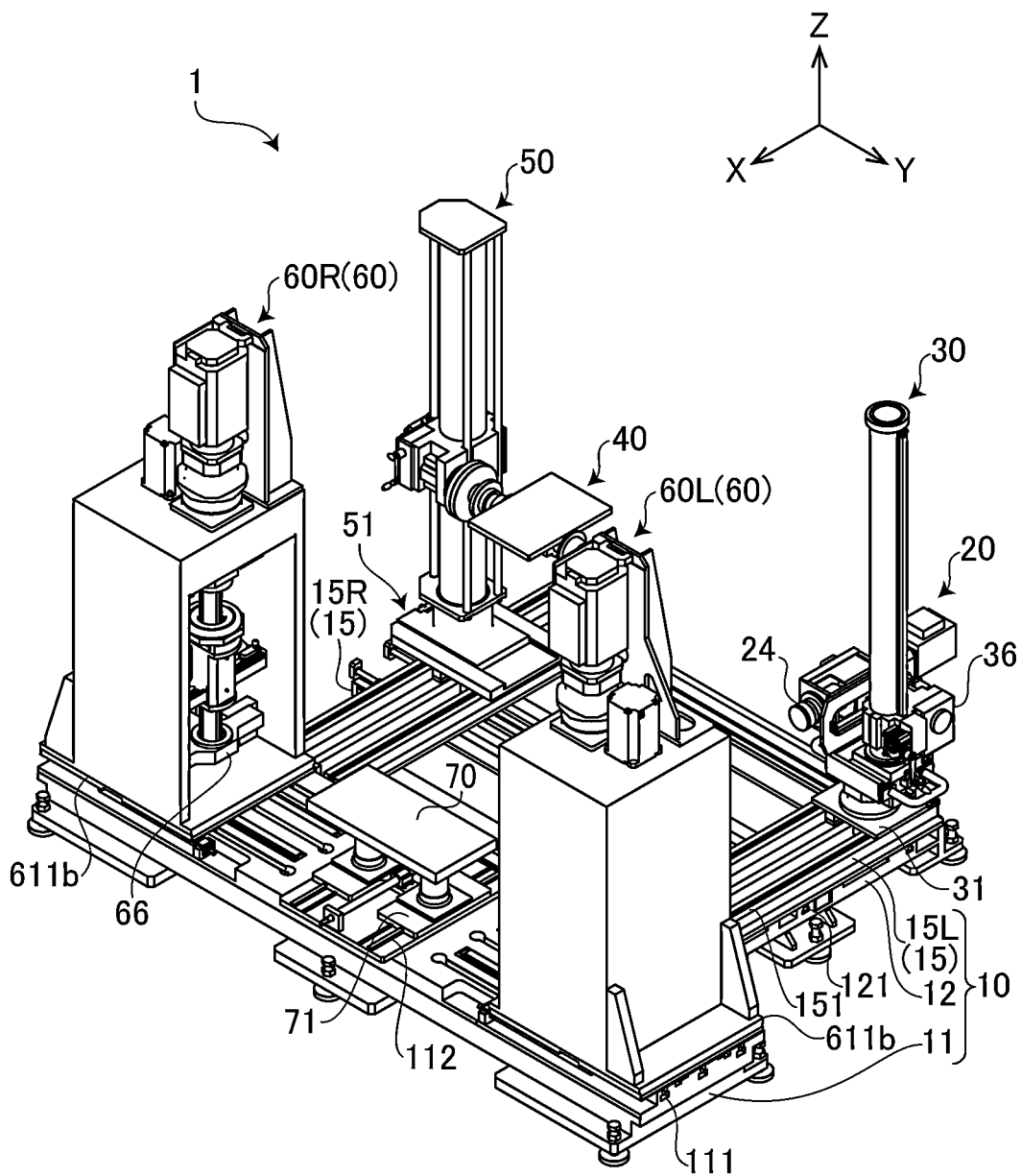
FIG. 1 is an external view of a test device according to an embodiment of the present disclosure.

Hereinafter, an embodiment of the present disclosure will be described with reference to the drawings, in the following description, the same or corresponding items are assigned the same or corresponding reference numerals, and redundant description thereof will be omitted. In addition, in each of the drawings, in a case where a plurality of items having a common reference sign are shown, the reference sign is not necessarily assigned to all of the plurality of items, and the assignment of the reference sign to a part of the plurality of item is appropriately omitted. Regarding a configuration which is provided on the left and the right as a pair, as a general rule, the configuration on the left is described, and the configuration on the right is written together in square brackets and redundant description thereof is omitted.

A test device 1 (a so-called "steering test device") according to an embodiment of the present disclosure is a device capable of testing a steering device for a vehicle such as an automobile. The test device 1 can be used to test steering devices of passenger cars, trucks, buses, and special vehicles such as trailers.

FIG. 1 is an external view of the test device 1. In the following description, a direction from the upper right to the lower left in FIG. 1 is defined as an X-axis direction, a direction from the upper left to the lower right is defined as a Y-axis direction, and a direction from the lower side to the upper side is defined as a Z-axis direction. The X-axis direction and the Y-axis direction are horizontal directions orthogonal to each other, and the Z-axis direction is a vertical direction. The X-axis direction corresponds to a traveling direction of a vehicle to which a steering device as a specimen W is to be attached, and an X-axis positive direction is referred to as "front," an X-axis negative direction is referred to as "rear," a Y-axis positive direction is referred to as "left," and a Y-axis negative direction is referred to as "right."

Figure 2:
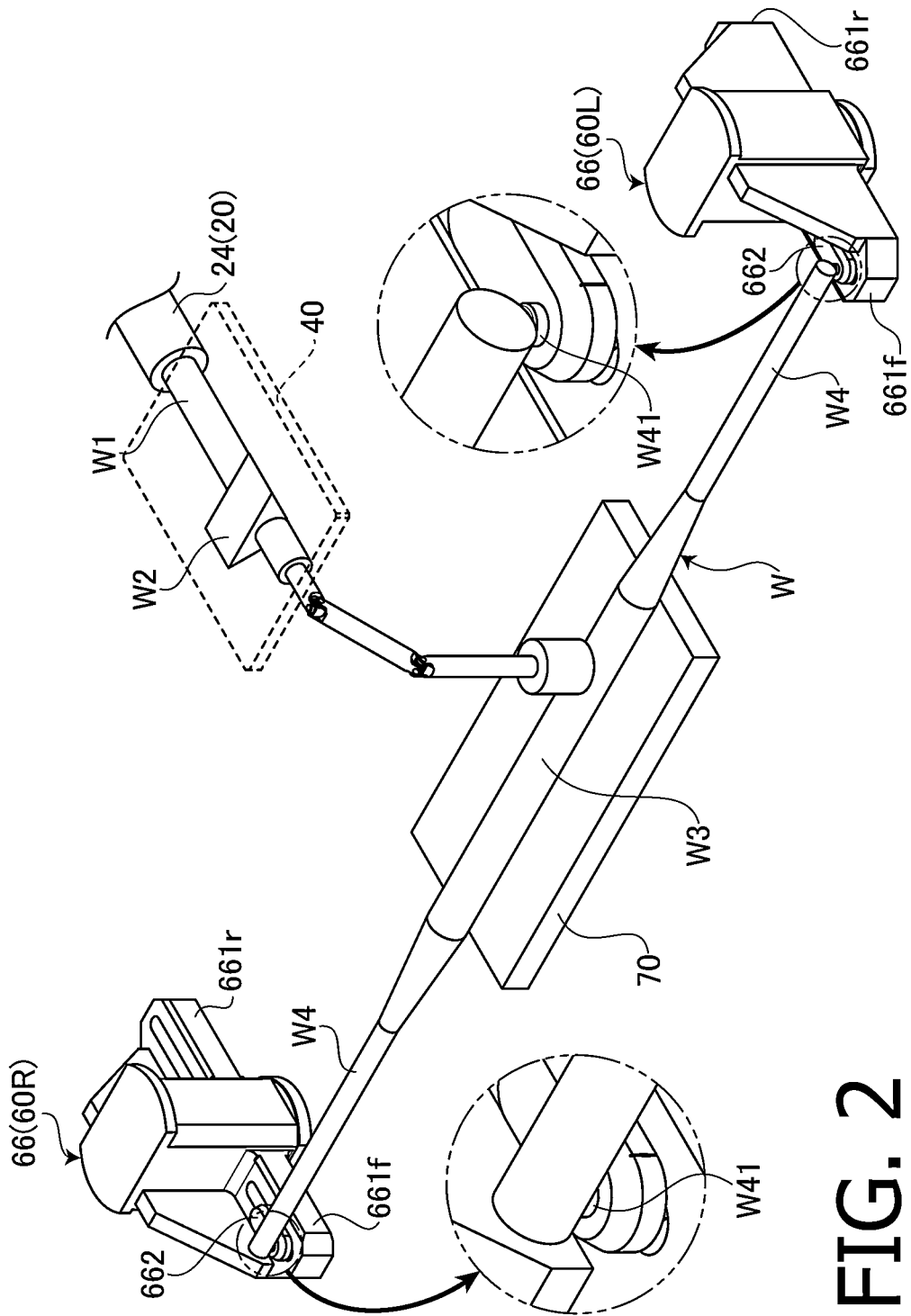
FIG. 2 is a schematic view showing a state in which a specimen is connected to each part of the test device.

FIG. 2 is a schematic view showing a state in which the specimen W is attached to the test device 1. The test device 1 is a device capable of testing performance and durability of a steering device by rotating a steering shaft W1 while applying an axial force (a load L) to left and right tie rods W4 of the steering device as the specimen W.

As shown in FIG. 1, the test device 1 includes a mount 10, an input side drive part 20, a columnar support part 30 supporting the input side drive part 20, a column base 40, a columnar support part 50 supporting the column base 40, a pair of left and right output side drive parts 60 (60L and 60R), and a table 70.

As shown in FIG. 2, the input side drive part 20 is connected to the steering shaft W1 of the specimen W and rotationally drives the steering shaft W1. The output side drive parts 60L and 60R are connected to the left and right tie rods W4 of the specimen W, respectively, and apply a load L to the tie rods W4. A steering column W2 of the specimen W is attached to the column base 40, and a steering gear box W3 of the specimen W is attached to the table 70.

As shown in FIG. 1, the columnar support parts 30 and 50, the output side drive parts 60L and 60R, and the table 70 are installed on the mount 10. The input side drive part 20 is attached to the columnar support part 30, and the column base 40 is attached to the columnar support part 50.

The mount 10 includes a fixed frame 11 disposed on the front side, a fixed frame 12 disposed on the rear side of the fixed frame 11, and a pair of left and right movable frames 15 (15L and 15R) disposed on the fixed frame 12. On the fixed frame 11, a pair of left and right bases 71 of the table 70 are attached at a central portion, and bases 611b of the pair of output side drive parts 60L and 60R are attached on the left and right sides across the table 70. A base 51 of the support 50 is attached on the right movable frame 15R, and a base 31 of the columnar support part 30 is attached on the left movable frame 15L.

A plurality of T-shaped grooves 111 extending in the Y-axis direction are formed on the upper surface of the fixed frame 11 on both left and right sides of the table 70, and a plurality of T-shaped grooves 112 extending in the X-axis direction are formed at the center of the upper surface of the fixed frame 11 in the left-right direction. A plurality of T-shaped grooves 121 extending in the Y-axis direction are formed on the upper surface of the fixed frame 12. A plurality of T-shaped grooves 151 extending in the X-axis direction are also formed on the upper surface of each movable frame 15. A plurality of T-shaped groove nuts (not shown) are fitted in each of the T-shaped grooves 111, 112, 121 and 151.

The fixed frames 11 and 12 and the movable frames 15L and 15R are each provided with a feed screw mechanism (not shown) in parallel with respective T-shaped grooves 111, 112, 121 and 151.

Each movable frame 15 is fixed to the fixed frame 12 by the T-siped groove nuts fitted in each T-shaped groove 121 and bolts (not shown). A position of the movable frame 15 in the Y-axis direction can be adjusted by loosening the bolts and moving a feed screw mechanism provided in parallel with the T-shaped grooves 121.

The base 611*b* of each output side drive part 60 is fixed to the fixed frame 11 by the T-shaped groove nuts fitted into each T-shaped groove 111 and bolts (not shown). By loosening the bolts and moving the feed screw mechanism provided in parallel with the T-shaped grooves 111, a position of each output side drive part 60 in the Y-axis direction can be adjusted.

Each base 71 of the table 70 is fixed to the fixed frame 11 by the T-shaped groove nuts fitted in each T-shaped groove 112 and bolts (not shown). By loosening the bolts and moving a feed screw mechanism provided in parallel with the T-shaped grooves 112, a position of the table 70 in the X-axis direction can be adjusted.

The base 31 of the columnar support part 30 and the base 51 of the columnar support part 50 are each fixed to the movable frame 15 by the T-shaped groove nuts fitted into the T-shaped grooves 151 of the movable frame 15 and bolts (not shown). By loosening the bolts and moving a feed screw mechanism provided in parallel with the T-shaped grooves 151, positions of the columnar support parts 30 and 50 in the X-axis direction can be adjusted.

That is, in accordance with shape and size of the specimen W, a position of the columnar support part 30 (the input side drive part 20) and the columnar support part 50 (the column base 40) in the front-back and left-right directions, a position of each output side drive part 60 in the left-right direction, and a position of the table 70 in the front-back direction are adjustable.

Figure 3:
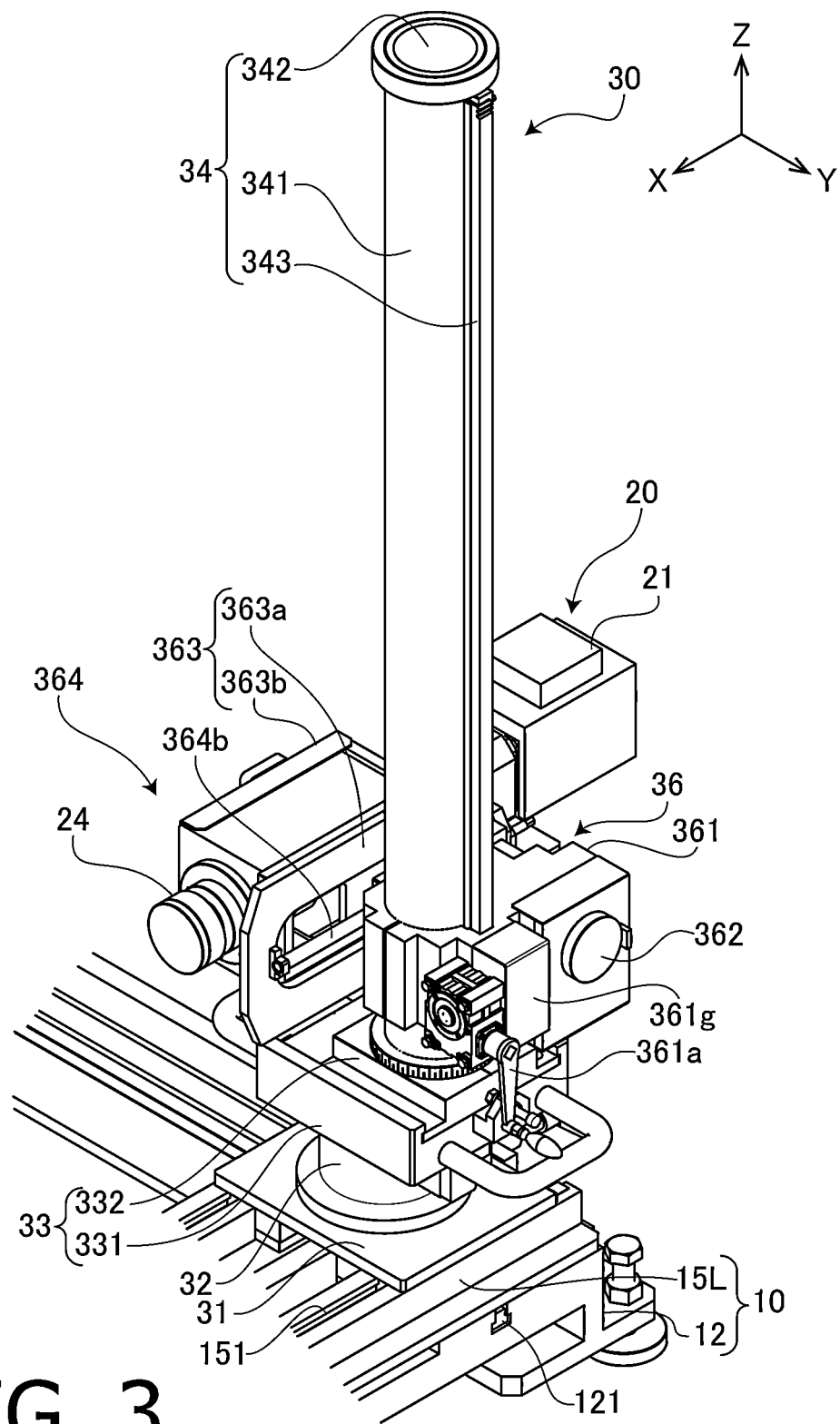
FIG. 3 is an external view of an input side drive part.
Figure 4:
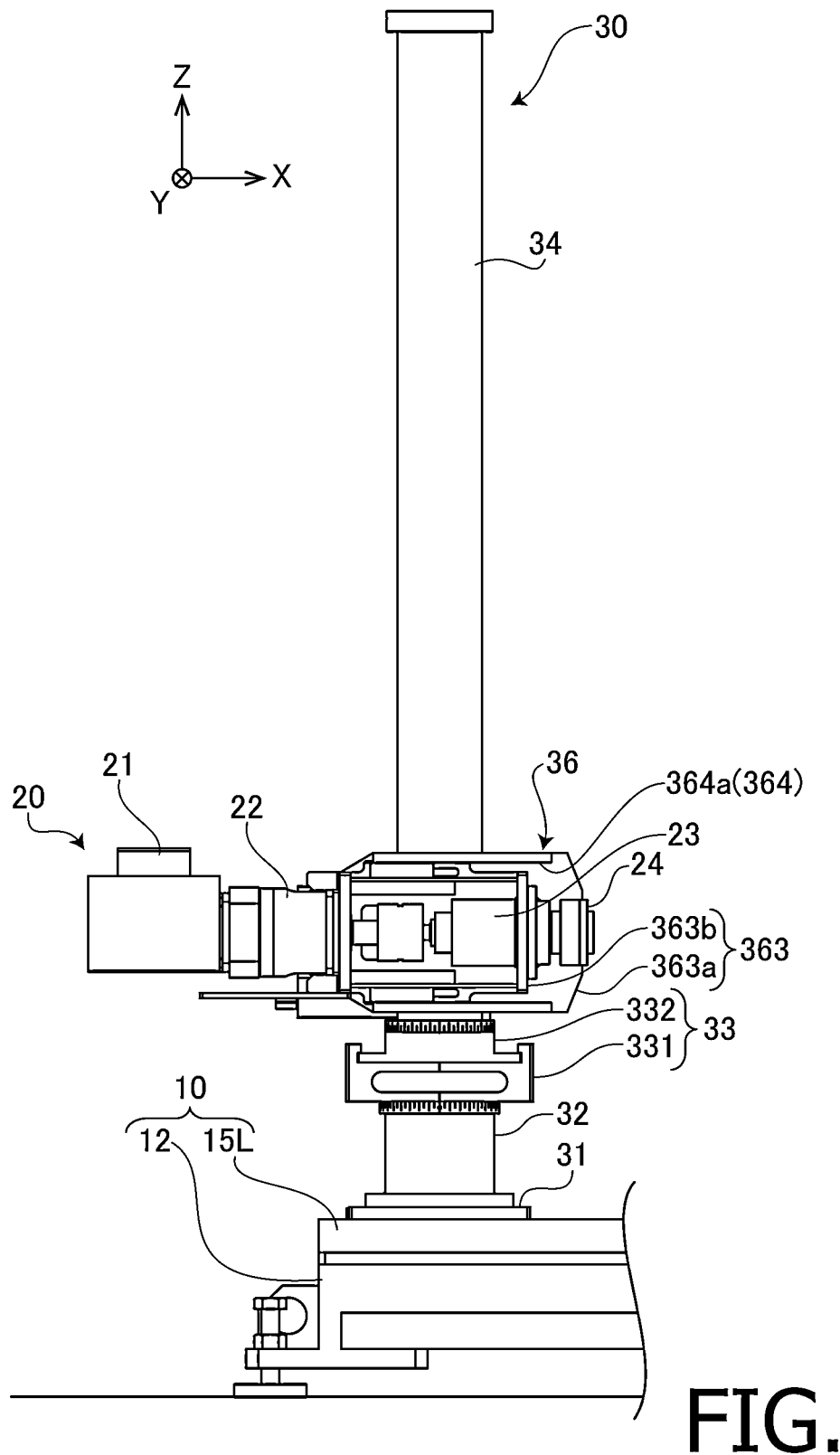
FIG. 4 is an external view of the input side drive part.
Figure 5:
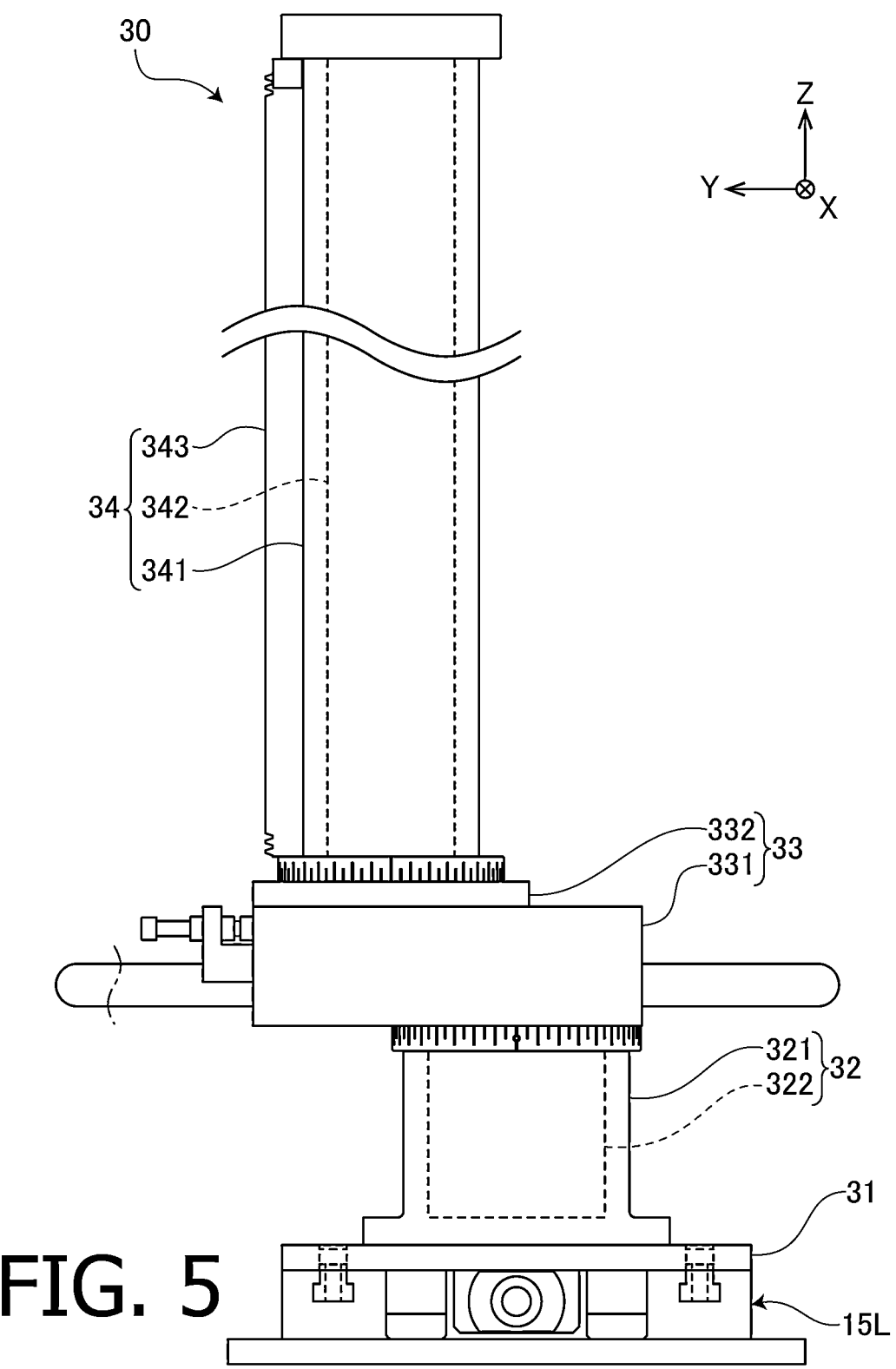
FIG. 5 is a side view of a columnar support part.

FIGS. 3 and 4 are diagrams showing the input side drive part 20 attached to the columnar support part 30, and FIG. 5 is a side view of the columnar support part 30 (except an elevating part 36 which will be described later). The columnar support part 30 includes the base 31, a rotary stage 32, a linear stage 33, a rotary column 34, and an elevating part 36 (FIGS. 3 and 4) attached to the rotary column 34 to be movable up and down. The input side drive part 20 is attached to the elevating part 36.

As shown in FIG. 5, the rotary stage 32 includes a cylindrical tube part 321 fixed to the base 31 and a columnar column part 322 rotatably fitted in the tube part 321.

The linear stage 33 includes a fixed block 331 fixed to an upper end portion of the pillar part 322 of the rotary stage 32 at one end portion in a sliding direction (Y-axis direction in the illustrated arrangement) of a lower surface thereof, and a movable block 332 slidable in the sliding direction with respect to the fixed block 331.

The rotary column 34 includes a columnar column part 342 erected on the movable block 332 of the linear stage 33, a cylindrical tube part 341 rotatably fitted to the column part 342, and a rack 343 attached to a side surface of the tube part 341 in parallel with an axis of the tube part 341. The rotary stage 32 and the rotary column 34 are eccentrically connected to each other via the linear stage 33 with their rotation axes oriented vertically. By rotating the rotary stage 32 and the rotary column 34 eccentrically connected to each other and sliding the linear stage 33, it is possible to adjust an orientation about the Z-axis and a position in the X-axis and Y-axis directions of the elevating part 36 attached to the tube part 341 of the rotary column 34 (and the input side drive part 20 attached to the elevating part 36).

As shown in FIG. 3, the elevating part 36 includes a main body part 361 that vertically slidably fits to the tube part 341 of the rotary column 34, a horizontally extending shaft 362 rotatably fitted to the main body part 361, and a rotary part 363 attached to a distal end portion of the shaft 362. A gear mechanism 361*g* including a pinion (not shown) that meshes with the rack 343 is provided to the main body 361 of the elevating part 36. As a handle 361*a* connected to an input shaft of the gear mechanism 361*g* is turned, the pinion rotates and the elevating part 36 moves in the vertical direction along the rotary column 34. It is thereby made possible to adjust a height of the input side drive part 20 attached to the elevating part 36.

The main body part 361 of the elevating part 36 includes a rotation mechanism (not shown) that rotates the shaft 362 about a central axis. When a handle (not shown) connected to the rotation mechanism is rotated, the rotary part 363 and the input side drive part 20 are rotates together with the shaft 362, whereby an inclination of the input side drive part 20 about a horizontal axis can be adjusted.

The rotary part 363 (FIGS. 3 and 4) of the elevating part 36 includes a fixed frame 363*a* fixed to a distal end portion of the shaft 362 (FIG. 3), a movable frame 363*b* to which the input side drive part 20 is attached, and a slide mechanism 364 that slidably couples the fixed frame 363*a* and the movable frame 363*b* in one direction perpendicular to the shaft 362. The slide mechanism 364 includes a pair of rails 364*a* (FIG. 4) that guides the slide of the movable frame 363*b* and a feed screw mechanism 364*b* (FIG. 3) that causes the movable frame 363*b* to slide. When a handle (not shown) coupled to a feed screw of the feed screw mechanism 364*b* is rotated, the movable frame 363*b* of the rotary part 363 attached to the input side drive part 20 moves in one direction perpendicular to the shaft 362 (more specifically, in an axial direction of the steering shaft W1 of the specimen W connected to the input side drive part 20) by the feed screw mechanism 364*b*.

As shown in FIG. 4, the input side drive part 20 includes a servomotor 21, an optional speed reducer 22 that reduces a rotation speed of an output of the servomotor 21, a torque sensor 23 (torque detecting part) that detects an output torque, and a chuck 24 (an output shaft) to which the steering shaft W1 of the specimen W is to be attached.

Figure 6:
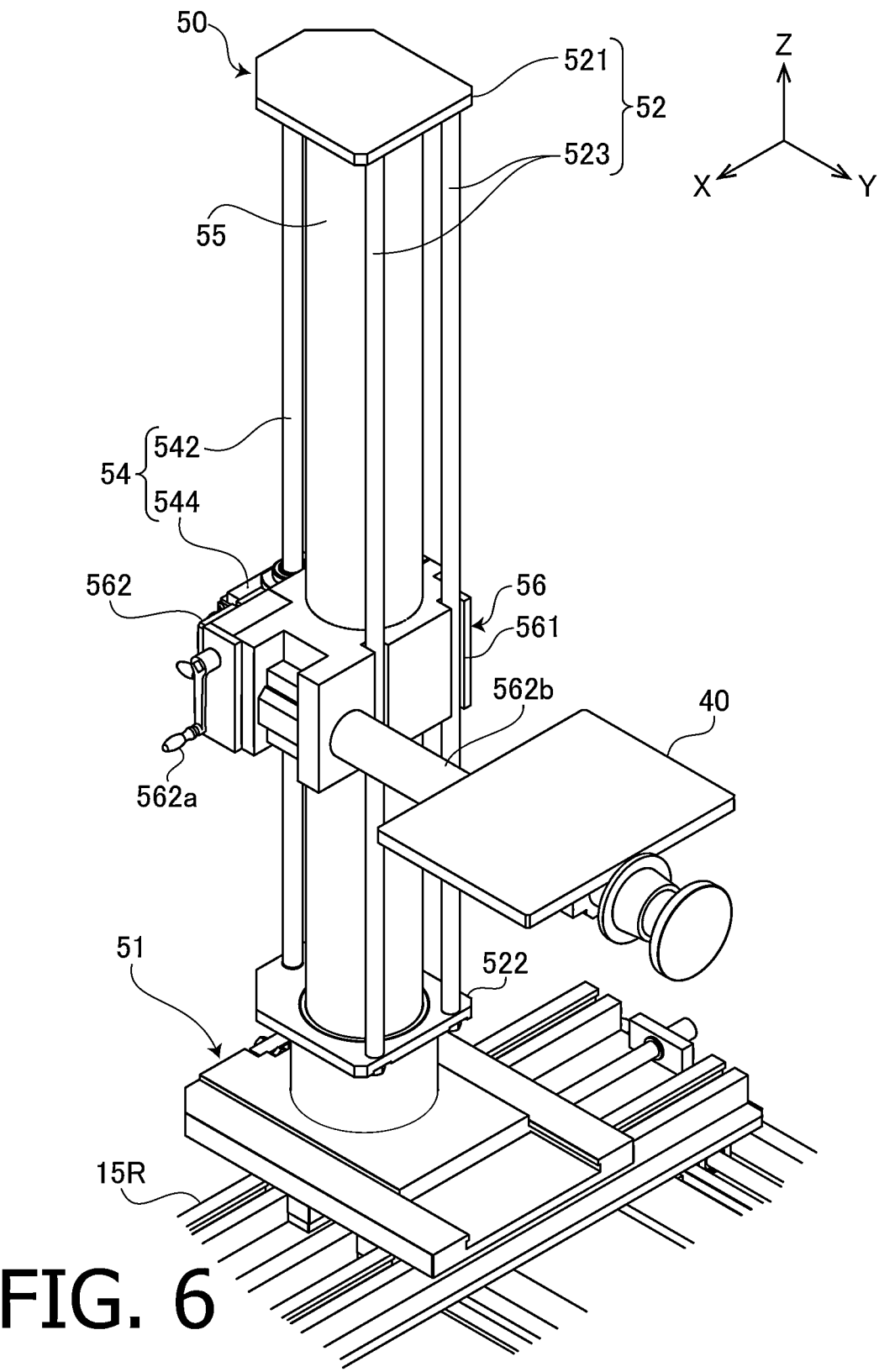
FIG. 6 is an external view of a column base.

FIG. 6 is a view showing the column base 40 attached to the columnar support part 50. The columnar support part 50 includes a support column 55, an elevating part 56 attached to the support column 55 to be movable up and down, a linear guide part 52 that guides the up-and-down movement of the elevating part 56, and a drive part 54 that causes the elevating part 56 to move up and down.

The linear guide part 52 includes an upper plate 521 horizontally attached to an upper end of the support column 55, a lower plate 522 horizontally attached to a lower portion of the support column 55, and three guide rods 523 (only two are shown in FIG. 6) connecting the upper plate 521 and the lower plate 522. To the elevating part 56, three vertically extending grooves 561 that slidably fit to respective guide rods 523 are formed. By the fitting of the 3 sets of guide rods 523 and the grooves 56, a movable direction of the elevating part 56 is restricted only to the vertical direction.

The drive part 54 includes a worm 542 connecting the upper plate 521 and the lower plate 522 of the linear guide part 52, and a gear box 544 attached to the elevating part 56. The gear box 544 includes a worm wheel (not shown) that meshes with the worm 542, and a handle (not shown) connected to the worm wheel. When the handle is rotated, the worm wheel rotates and the drive part 54 and the elevating part 56 move up and down.

The elevating part 56 includes a rotation mechanism 562(a gear mechanism) that rotates the column base 40 around a horizontal axis, and the column base 40 is attached to a shaft 562b (an output shall) of the rotation mechanism 562 that extends horizontally. When a handle 562a connected to an input shaft of the rotation mechanism 562 is rotated, the rotation is decelerated and the shaft 562b rotates, and an inclination of the column base 40 attached to the shaft 562b changes.

Figure 7:
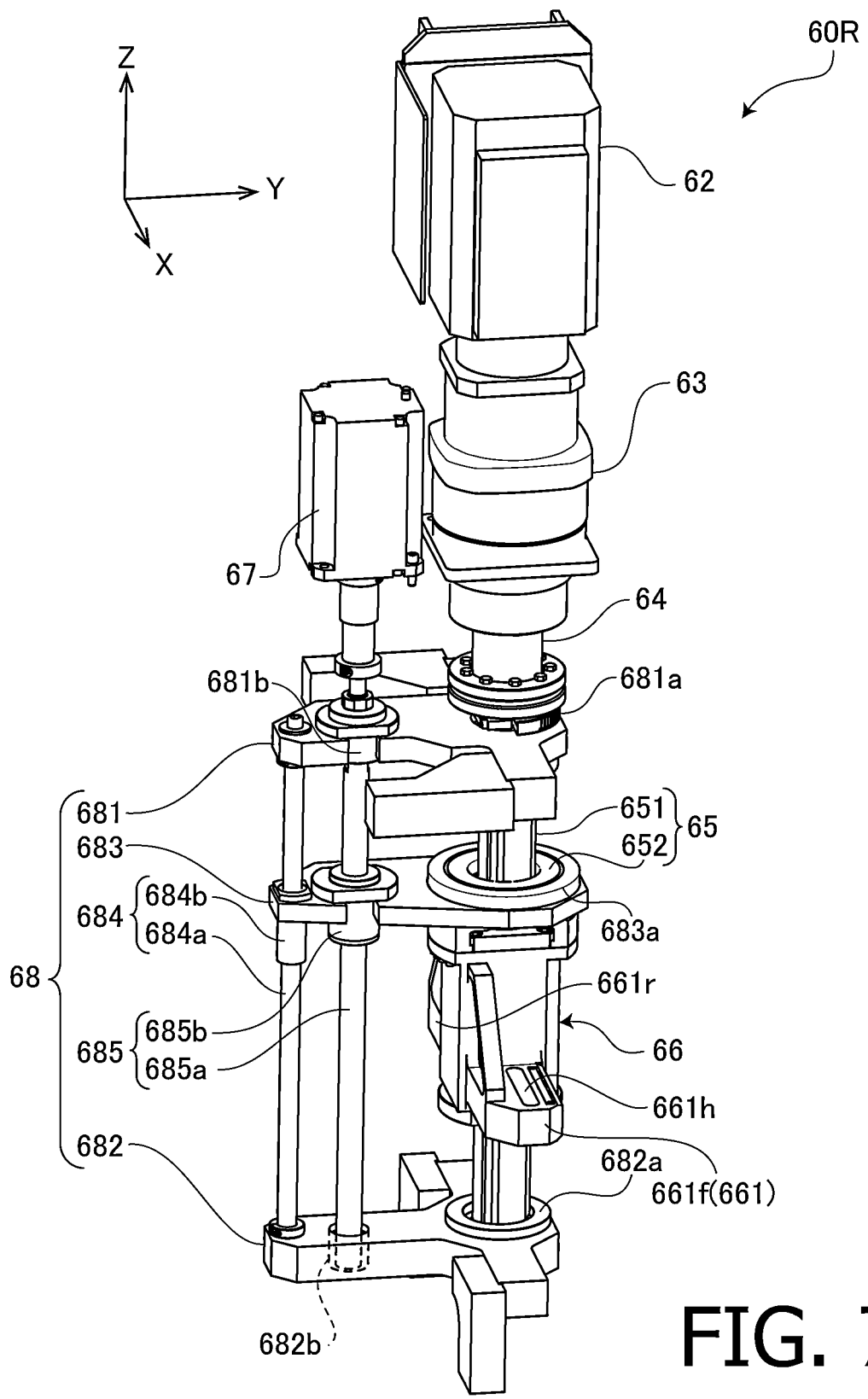
FIG. 7 is a diagram showing a main structure of an output side drive part.
Figure 8:
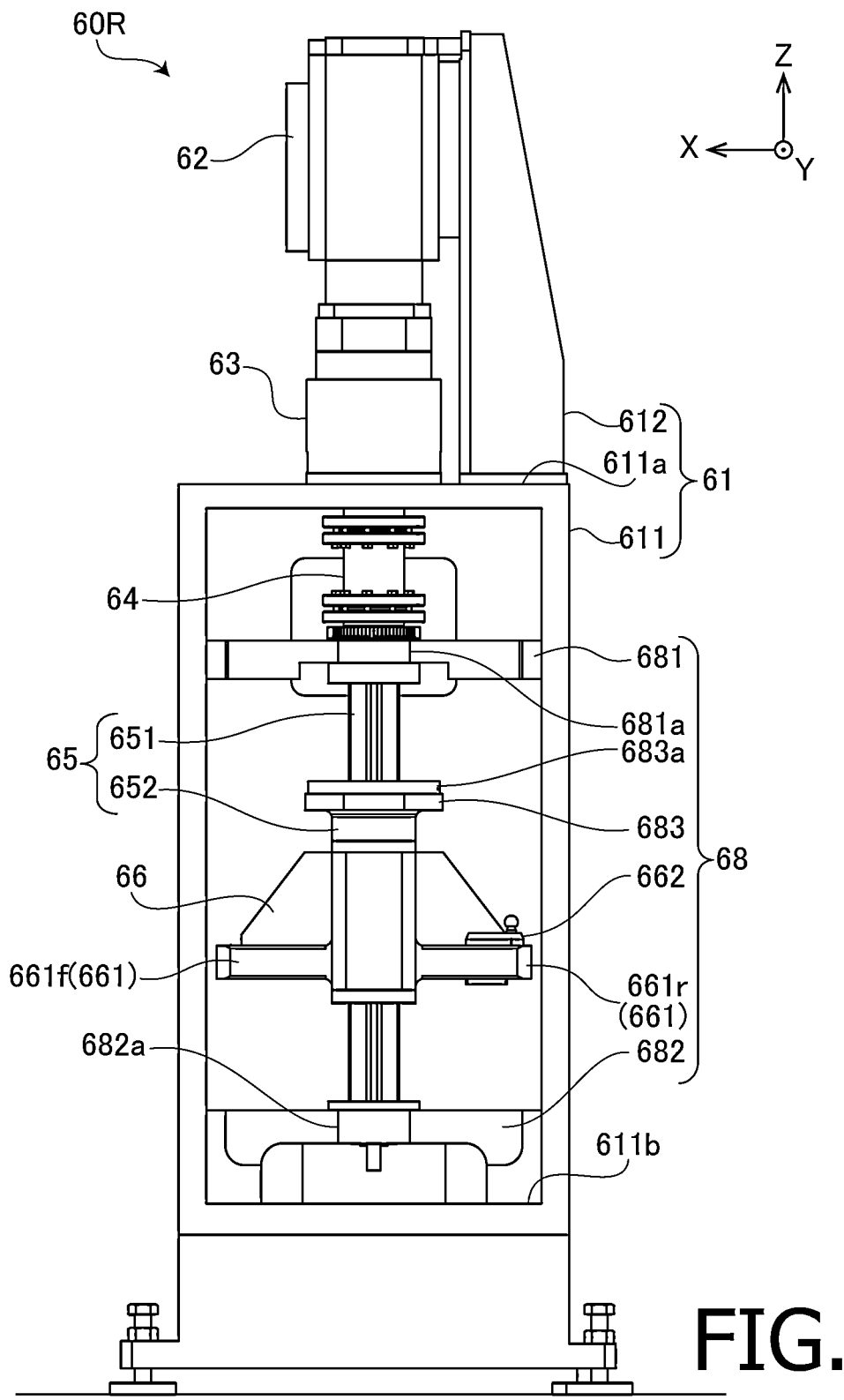
FIG. 8 is an external view of the output side drive part.

FIGS. 7 and 8 are diagrams showing the output side drive part 60R on the right. FIG. 7 is a diagram of the main structure of the output side drive part 60R viewed from the front, and FIG. 8 is an external view of the output side drive part 60R viewed from the left. In FIGS. 7 and 8, some of components of the output side drive part 60R are not shown for convenience of explanation.

The output side drive part 60 includes a frame 61 (FIG. 8), a servomotor 62, an optional speed reducer 63, a torque sensor 64, a ball spline 65, a movable base 66, a servomotor 67 (FIG. 7), and a linear motion mechanism 68 (FIG. 7). The ball spline 65 includes a spline shaft 651 and a nut 652. The spline shaft 651 and the nut 652 are fitted to each other to be slidable in an axial direction. It is noted that the torque sensor 64 is an example of a torque detection part that detects a torque generated by the servomotor 62 and amplified by the optional speed reducer 63.

The spline shaft 651 is connected to an output shaft of the speed reducer 63 via the torque sensor 64. The spline shaft 651 is rotationally driven by an output of the servomotor 62 reduced in speed by the speed reducer 63. The nut 652 fitted to the spline shaft 651 is also rotationally driven together with the spline shaft 651. A torque acting on the ball spline 65 is detected by the torque sensor 64. A height of the movable base 66 to which the tie rod W4 of the specimen W is to be attached can be adjusted by the linear motion mechanism 68. The linear motion mechanism 68 is driven by the servomotor 67. A configuration of the linear motion mechanism 68 will be described later.

The movable base 66 is a portion corresponding to a steering knuckle that supports an axle of a steering wheel in a vehicle equipped with a steering device, and a pair of arms 661 extending in a front-rear direction substantially orthogonal to an axis of the ball spline 65 (i.e., a rotation axis of the movable base 66) is provided to a lower portion of the movable base 66. The pair of arms 661 includes a front arm 661f extending forward and a rear arm 661r extending rearward. The front arm 661f and the rear arm 661r are formed symmetrically to each other with respect to a plane including the rotation axis of the movable base 66 and substantially symmetrically with respect to the rotation axis of the movable base 66. The arm 661 is a portion that corresponds to a knuckle arm of a vehicle, and a rod end of the tie rod W4 of the specimen W is attached to the arm 661. When a torque is applied to the movable base 66 by the servomotor 62, a load L is applied to the tie rod W4 of the specimen W as an axial force.

Further, in an actual vehicle, the steering knuckle to which the tie rod W4 of the steering device is attached is supported by a suspension, and thus moves up and down with respect to a frame of the vehicle during traveling. That is, a dynamic strain is applied to the steering device mounted on the actual vehicle by the steering knuckle during traveling. By moving the movable base 66 up and down by the servomotor 67 and the linear motion mechanism 68, it is possible to apply a dynamic strain similar to that at the time of traveling of the vehicle to the specimen W. With this configuration, it becomes possible to test the specimen W under a test condition closer to a state in which the specimen W is mounted on an actual vehicle to evaluate the specimen W more appropriately.

As shown in FIG. 8, the frame 61 includes a lower frame 611 attached on the fixed frame 11, and an upper frame 612 mounted on an upper plate 611a of the lower frame 611. The speed reducer 63 and the servomotor 67 (FIG. 7) are attached to the upper plate 611a of the lower frame 611.

As shown in FIGS. 7 and 8, the linear motion mechanism 68 includes an upper frame 681 and a lower frame 682 fixed to the lower frame 611, a movable frame 683 disposed between the upper frame 681 and the lower frame 682 and being vertically movable, a slide guide 684 (FIG. 7) that guides the vertical movement of the movable frame 683, and a feed screw mechanism 685 (FIG. 7) that drives the movable frame 683.

The slide guide 684 shown in FIG. 7 includes a vertically erected rod 684a, and a bush 684b slidably fitted to the rod 684a. The bush 684b is, for example, a sliding bearing or a rolling bearing provided with rolling bodies such as balls or rollers. The rod 684a is fixed to the upper frame 681 at an upper end portion and to the lower frame 682 at a lower end portion. The bush 684b is fixed to the movable frame 683.

The feed screw mechanism 685 shown in FIG. 7 includes a vertically erected ball screw 685a, and a nut 685b fitted to the ball screw 685a. The ball screw 685a is rotatably supported at its upper end portion by a bearing 681b provided to the upper frame 681 and is rotatably supported at its lower end portion by a bearing 682b provided to the lower frame 682. The nut 685b is fixed to the movable frame 683.

The spline shaft 651 is rotatably supported at its upper end portion by a bearing 681a provided to the upper frame 681 and is rotatably supported at its lower end portion by a bearing 682a provided to the lower frame 682. The nut 652 slidably fitted to the spline shaft 651 and the movable base 66 attached to the nut 652 are rotatably supported coaxially with the spline shaft 651 by a bearing 683a provided to the movable frame 683. The movable base 66 is rotationally driven by the servomotor 62 together with the ball spline 65. When the movable frame 683 is driven up and down by the servomotor 67 and the linear motion mechanism 68, the nut 652 and the movable base 66 also move up and down together with the movable frame 683.

As shown in FIG. 8, the movable base 66 has the above-mentioned pair of arms 661 (the front arm 661f and the rear arm 661r) extending in the front-rear direction in an initial state (an initial position) equivalent to a straight traveling state of a vehicle. As shown in FIG. 7, the arm 661 is formed with a long hole 661h extending in an extending direction of the arm 661 for attaching a tie rod end W41 of the specimen W. It is noted that the front arm 661f is the arm 661 for attaching a so-called "front steer" specimen W and the rear arm 661r is the arm 661 for attaching a so-called "rear steer" specimen W, but the test can also be performed by attaching the specimen W to the opposite arm (for example, the rear arm 661r for a "front steer"). However, in case the specimen W is attached to the opposite arm, since a rotation direction of the steering knuckle in an actual vehicle and a rotation direction of the movable base 66 are opposite to each other, it is necessary to set a polarity of the test device 1 (i.e., a relationship between a rotation direction of the steering shaft W1 and the rotation direction of the movable base 66) to "negative."

The arm 661 is provided with a force sensor 662 as a load detecting part that detects an axial load (a load L) acting on the tie rod W4 of the specimen W. The tie rod end W41 of the specimen W is attached to the arm 661 (the front arm 661f or the rear arm 661r) via the force sensor 662. It is noted that the load detecting part may be directly attached to the specimen W. For example, a strain gauge may be attached to a surface of the tie rod W4 of the specimen W, and the strain gauge may be used as the load detecting part.

Figure 9:
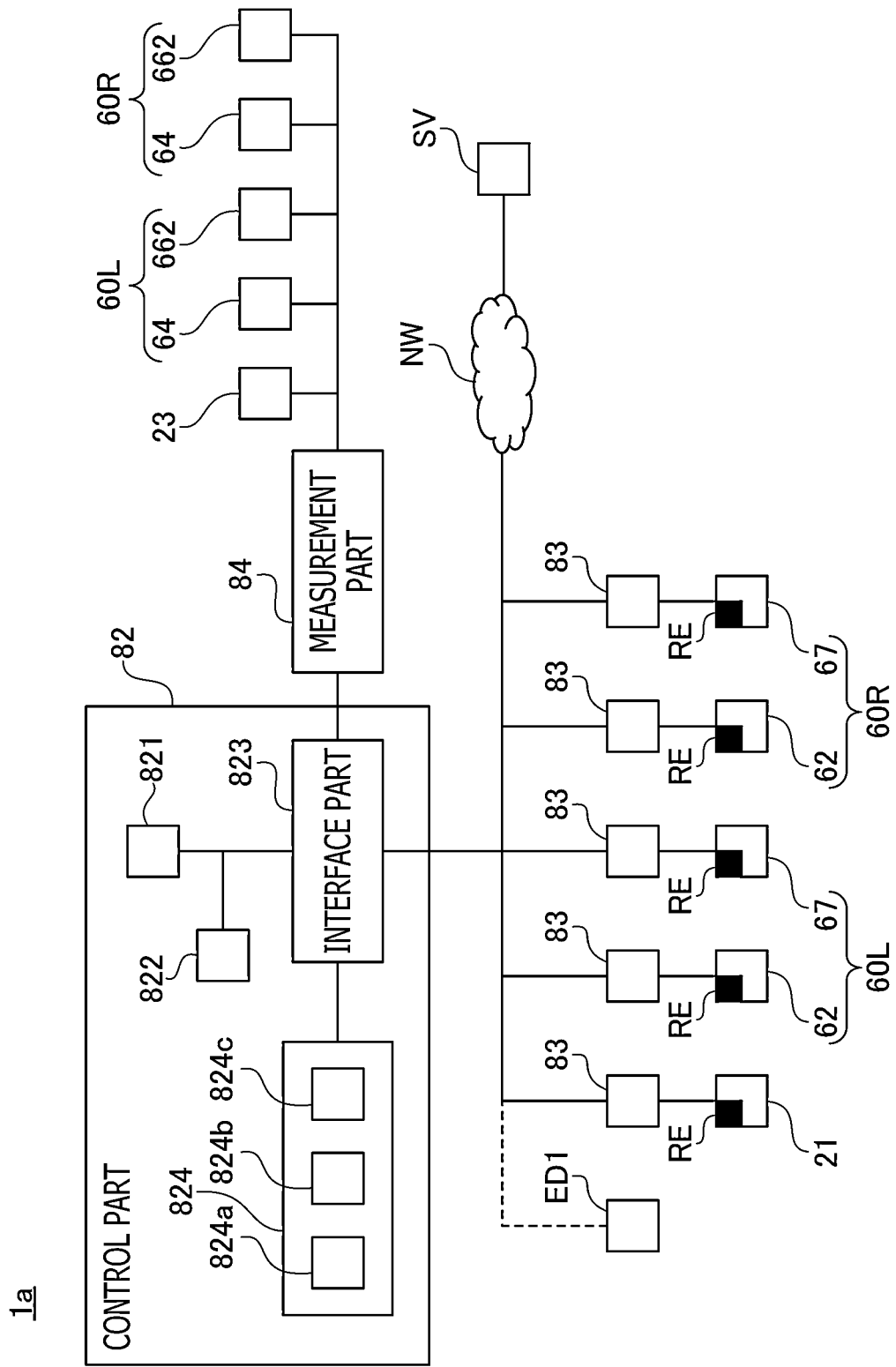
FIG. 9 is a block diagram showing a schematic configuration of a control system.

FIG. 9 is a block diagram showing a schematic configuration of a control system 1a of the test device 1. The control system 1a is a computer system including a control part 82 that controls behaviors of the entire test device 1 and a measurement part 84 that performs various measurements. The control part 82 includes a CPU 821, a main storage device 822, an interface part 823, and a storage 824 (an auxiliary storage device). The storage 824 is, for example, an HDD (Hard Disc Drive) or an SSD (Solid State Drive) and various programs for controlling the test device 1 (for example, a management program 824a, a setting program 824b, and a test program 824c, which will be described later) are stored in the storage 824.

The interface part 823 is a unit that has a role of executing input and output between the control unit 82 and the outside. The interface part 823 includes, for example, one or more of a user interface for performing input and output with a user, a network interface for connecting to various networks NW in a wired or wireless manner such as a LAN (Local Area Network), and various communication interfaces such as a USB (universal Serial Bus) and a GPIB (General Purpose Interface Bus) for connecting to an external device in a wired or wireless manner. The user interface includes, for example, one or more of various input/output devices such as various operation switches, a display, various display devices such as an LCD (Liquid Crystal Display), various pointing devices such as a mouse and a touch pad, a touch screen, a video camera, a printer, a scanner, a buzzer, a speaker, a microphone, and a memory card reader/writer. A portable terminal such as a smartphone capable of communicating with the control unit 82 may also be used as the interface part 823 or a part of the control part 82.

The servomotor 21 of the input side drive part 20 and the servomotors 62 and 67 of the output side drive parts 60R and 60L are connected to the control part 82 via respective servo amplifiers 83.

The control part 82 and each servo amplifier 83 are connected by an optical fiber so as to be capable of communicating in high speed. By this configuration, synchronous control of the five servomotors 21, 62 (60L), 62 (60R), 67 (60L), and 67 (60R) with higher accuracies (a high resolution and a high accuracy on the time base) is made possible. The control part 82 transmits a command for each servomotor to each servo amplifier 83 at a constant cycle. In the present specification, one unit (a single) drive control of a servomotor by one command or a section of a drive control corresponding to one command is referred to as a control point.

The torque sensors 23, 64 (60L) and 64 (60R) and the force sensors 662 (60L) and 662 (60R) are connected to the measurement part 84. The measurement part 84 converts a signal acquired from each sensor into digital data and transmits the digital data to the control part 82. Further, information about rotation of a shaft (specifically, for example, an angular position and an angular velocity) detected by a rotary encoder RE built in each servomotor is input to the control part 82 via each servo amplifier 83. It is noted that the rotary encoder RE is an example of a position detecting part that detects an angular position of a shaft of each servomotor, and is also an example of a speed detecting part that detects an angular velocity of a shaft of each servomotor.

The test device 1 is configured to be capable of operating in cooperation with external devices. For example, a temperature adjusting part ED1 (FIG. 9) such as a constant temperature oven for adjusting a temperature of the specimen W can be connected to the test device 1 to add a temperature adjusting function to the test device 1. The temperature adjusting part ED1 is mounted, for example, on the table 70 or the column base 40 supporting an electronic control unit (ECU) of the specimen W.

The control part 82 synchronously controls driving of respective servomotors based on test conditions (including, for example, target values of controlled variables of the input side drive part 20 [an angular position $\theta_{20}$ and an angular velocity $\omega_{20}$] and controlled variables of the output side drive part 60 [the load L, a vertical displacement D, a vertical speed V or a vertical acceleration A of the movable base 66]) input through the interface part 823. Processes shown in FIG. 19, which will be described later, are executed under the control of the control part 82.

A control of the rotational driving of the steering shaft W1 (FIG. 2) of the specimen W by the input side drive part 20 (input shaft controls S10 and S11 which will be described later) is performed in accordance with one of a constant speed mode in which the steering shaft W1 is driven in a constant angular velocity $\omega_{20}$, a pattern mode in which driving of the steering shaft W1 in accordance with a constant waveform pattern is repeated, and an external signal mode in which the steering shaft W1 is driven based on a continuous waveform signal inputted from outside. It is noted that the control of the rotational driving of the steering shaft W1 of the specimen W by the input side drive part 20 can be performed in a position control in which a controlled variable is an angular position $\theta_{20}$ of the steering shaft W1 (i.e., an angular position of an output shaft of the input side drive part 20) (i.e., a command value is an angular position $\Theta_{21}$ of a shaft of the servomotor 21) or a velocity control in which a controlled variable is an angular velocity $\omega_{20}$ (i.e., a command value is an angular velocity $\Omega_{21}$ of the shaft of the servomotor 21).

The control of the load L to be applied to the tie rod W4 (FIG. 2) of the specimen W by the output side drive part 60 (load controls S20 and Sa20 which will be described later) is performed in one of a constant load mode in which a constant load L is always applied, a frequency mode in which a load L varying in accordance with a basic waveform is continuously applied at a predetermined frequency, a pattern mode in which a load L varying according to a constant waveform pattern is repeatedly applied, a steering angle response mode in which a load L associated with an angular position $\theta_{20}$ of the steering shaft W1 is applied, and an external signal mode in which a load L varying in accordance with an externally input continuous waveform signal is applied. The control of the load L can be performed in synchronization with or in conjunction with the drive control of the steering shaft W1 of the specimen W by the input side drive part 20 (the input shaft control S10 which will be described later) and a control of a vertical oscillation of the tie rod end W41 of the specimen W by the servomotor 67 of the output side drive part 60 (an oscillation control S30 which will be described later).

The control of the vertical displacement D to be applied to the tie rod end W41 of the specimen W by the output side drive part 60 is performed in one of a constant displacement mode in which a constant displacement D is always applied, a frequency mode in which a varying displacement D (i.e., vibration) is continuously applied in accordance with a basic waveform at a predetermined frequency, a pattern mode in which a varying displacement D of a constant waveform pattern is repeatedly applied synchronously or asynchronously with the rotation of the steering shaft W1, and an external signal mode in which a varying displacement D is applied in accordance with an externally input continuous waveform signal. It is noted that, in addition to the position control in which the vertical displacement D of the tie rod end W41 is used as a controlled variable, the control of the vibration of the tie rod end W41 of the specimen W by the output side drive part 60 can be performed in a velocity control in which the speed V of the vertical movement of the tie rod end W41 is used as a controlled variable or an acceleration control in which the acceleration A of the vertical movement of the tie rod end W41 is used as a controlled variable.

As the basic waveform to be used in the frequency mode, in addition to a preset waveform such as a sine wave, a half-sine wave, a sawtooth wave, a triangular wave and a trapezoidal wave, a waveform measured during running of an actual vehicle, a waveform obtained by simulation calculation, or other arbitrary synthesized waveforms (for example, a waveform generated by a function generator or the like) can be used.

The waveform pattern to be used in the pattern mode is selected from, in addition to a standard pattern registered in advance, an edited pattern edited by a user based on the standard pattern, and a user pattern created by the user.

The continuous waveform signal to be used in the external signal mode includes, for example, a waveform signal measured during running of an actual vehicle, a waveform signal obtained by simulation calculation, or other arbitrary synthesized waveforms (for example, a waveform generated by a function generator or the like).

Figure 10:
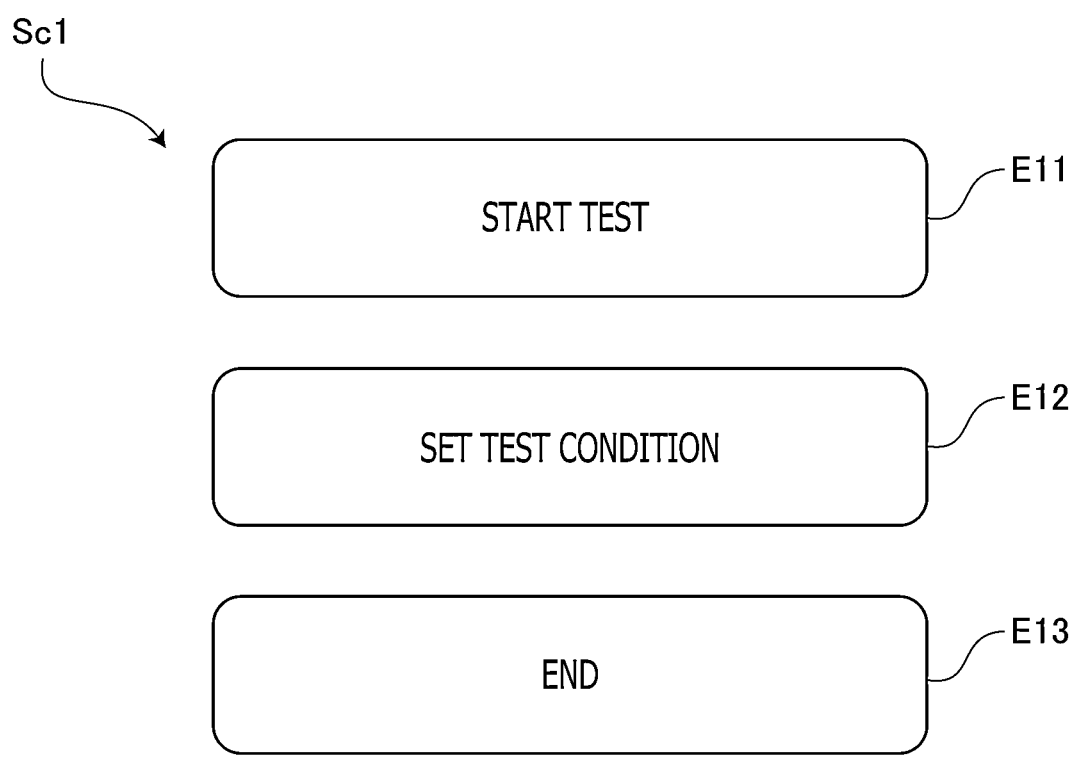
FIG. 10 is a menu screen to be displayed after activation of the test device.

FIG. 10 is a schematic diagram of a menu screen Sc1 displayed on a touch screen of the interface peart 823 after the test device 1 is activated (a main power is turned on). The screen (image information) to be displayed on the touch screen is generated by the control part 82. The menu screen Sc1 is generated by the management program 824*a* (FIG. 9) that is called up after the test device 1 is activated.

The menu screen Sc1 includes a test start button E11, a test condition setting button E12, and an end button E13. When the test start button E11 is touched, the test program 824*c* (FIG. 9) for executing a steering device test (FIG. 19) which will be described later is called, and a test such as a durability test is started. When the test condition setting button E12 is touched, the setting program 824*b* (FIG. 9) is called, and a test condition setting process is started. When the end button E13 is touched, a process for shifting to a state in which the power can be safely turned off is performed, and the management program 824*a* ends.

Figure 11:
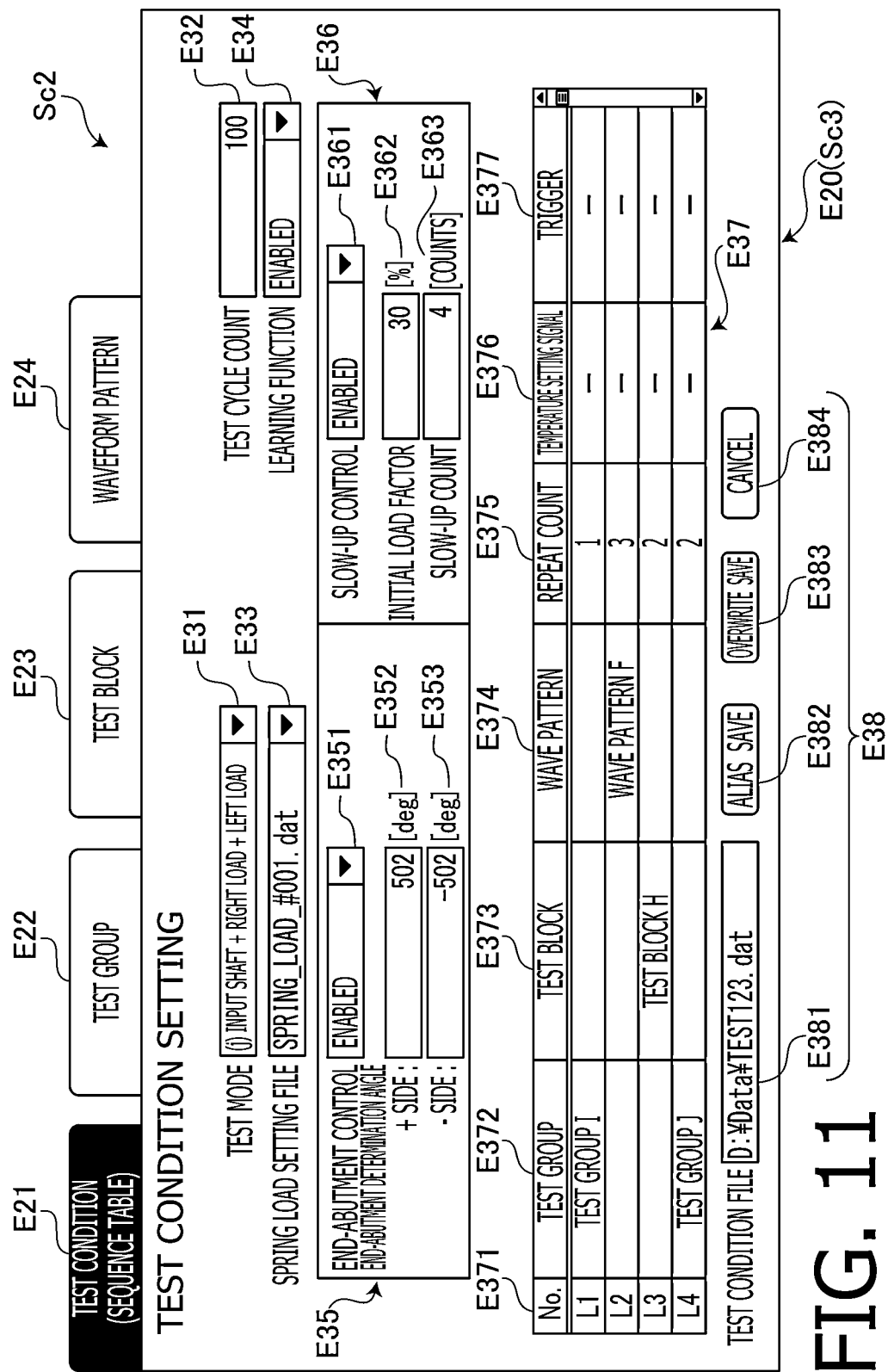
FIG. 11 is a setting screen displayed in a test condition setting process.

FIG. 11 is a setting screen Sc2 to be displayed in the test condition setting process. The test condition setting process of the present embodiment is configured such that a setting of a test process (hereinafter referred to as a "test sequence") that is modularized and hierarchized can be performed so that a complex test process can be efficiently set. Specifically, the test condition setting process of the present embodiment is configured such that the test process can be set by sequentially (or parallelly) coupling process modules. It is noted that the process module is a functionally integrated part constituting the setting of the test process.

Further, in the present embodiment, the process module is provided with a three-layer nesting structure consisting of a waveform pattern (first layer), a test block (second layer), and a test group (third layer). It is noted tint the depth (the number of layers) of the nesting structure is not limited to three layers, and may be two layers or four or more layers.

As shown in FIG. 11, the setting screen Sc2 includes a window E20 and tabs E21 to E24. The window E20 is a display area in which a setting screen for each setting item is to be displayed. By touching one of the tabs E21 to E24, setting items associated with one of the tabs E21 to E24 that has been touched are selected, and the setting screen for each setting item displayed in the window E20 switches to the setting screen corresponding to the selected setting items. It is noted that FIG. 11 shows a state in which a test condition setting screen Sc3 which will be described later is displayed in the window E20.

The tab E21 is associated with settings of the overall test condition, and when the tab E21 is touched, the test condition setting process shifts to a test condition setting subroutine for setting the overall test condition, and the display of the window E20 switches to the test condition setting screen Sc3.

Figure 14:
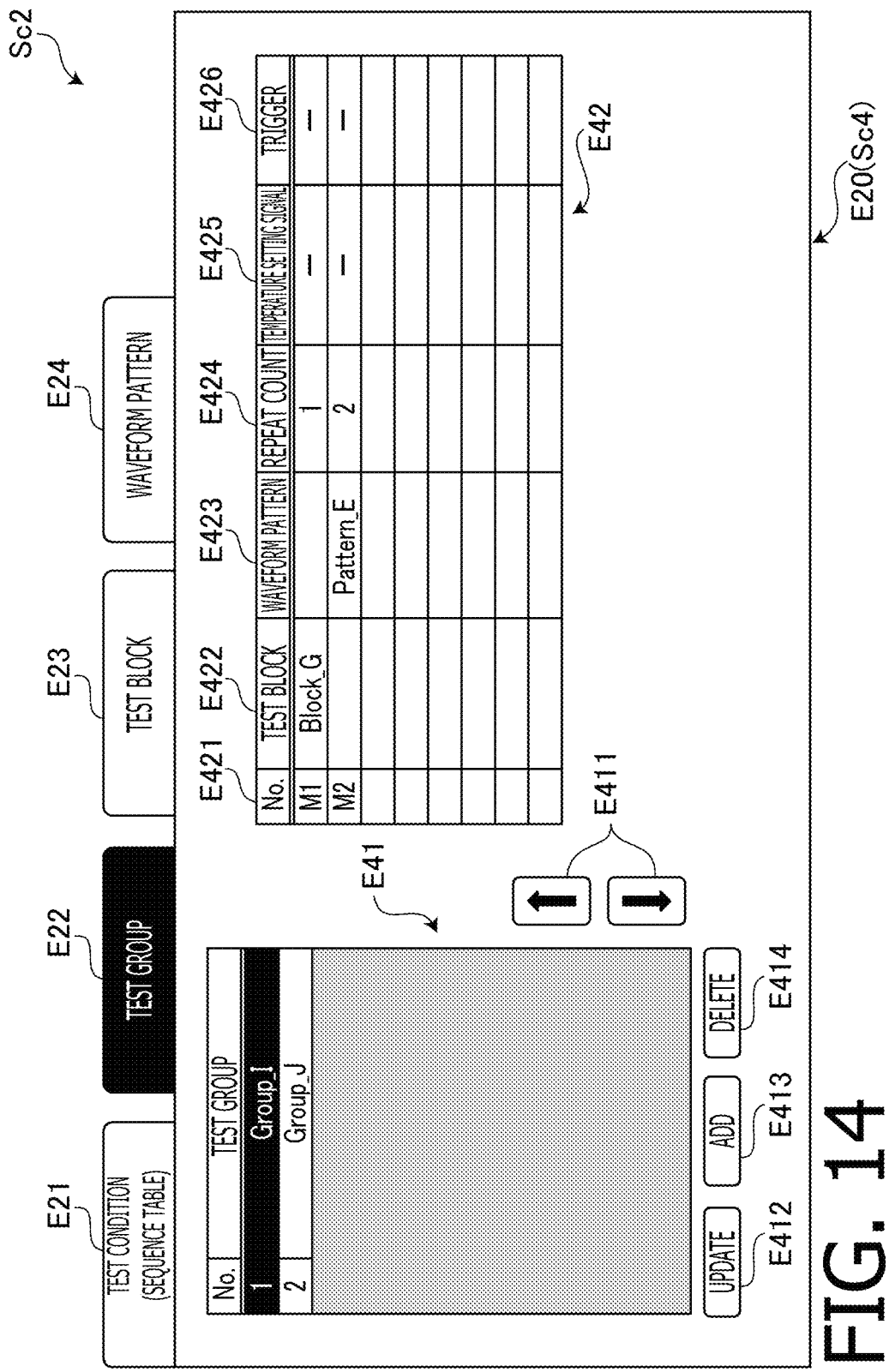
FIG. 14 is a setting screen displayed during execution of a test group setting subroutine.

The tab E22 is associated with settings of the test group, and when the tab E22 is touched, the test condition setting process shifts to a test group setting subroutine for setting the test group, and the display of the window E20 switches to a test group setting screen Sc4 (FIG. 14).

Figure 15:
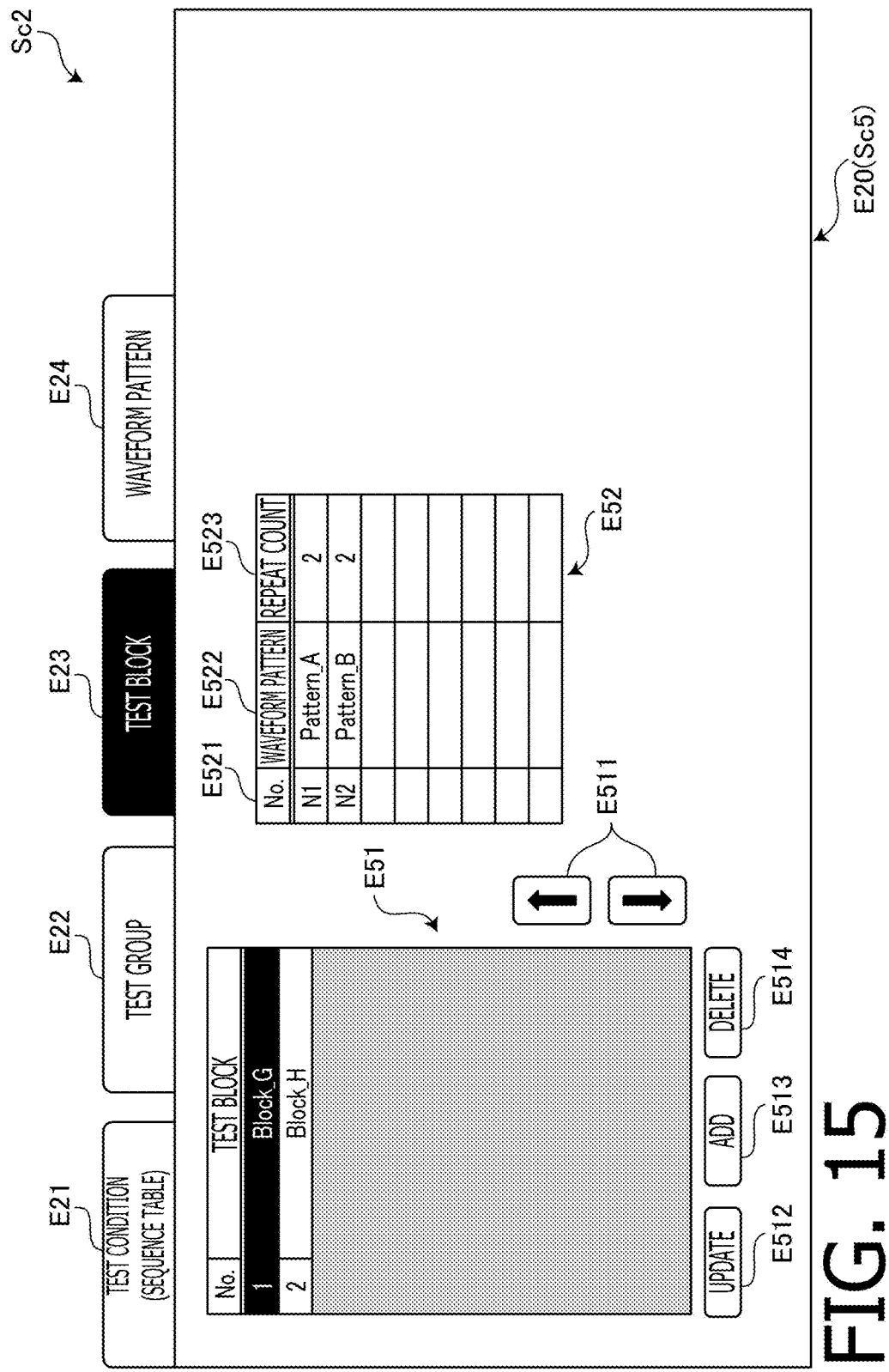
FIG. 15 is a setting screen displayed during execution of a test block setting subroutine.

The tab E23 is associated with settings of the test block, and when the tab E23 is touched, the test condition setting process shills to a test block setting subroutine for setting the test block, and the display of the window E20 switches to a test block setting screen Sc5 (FIG. 15).

Figure 16:
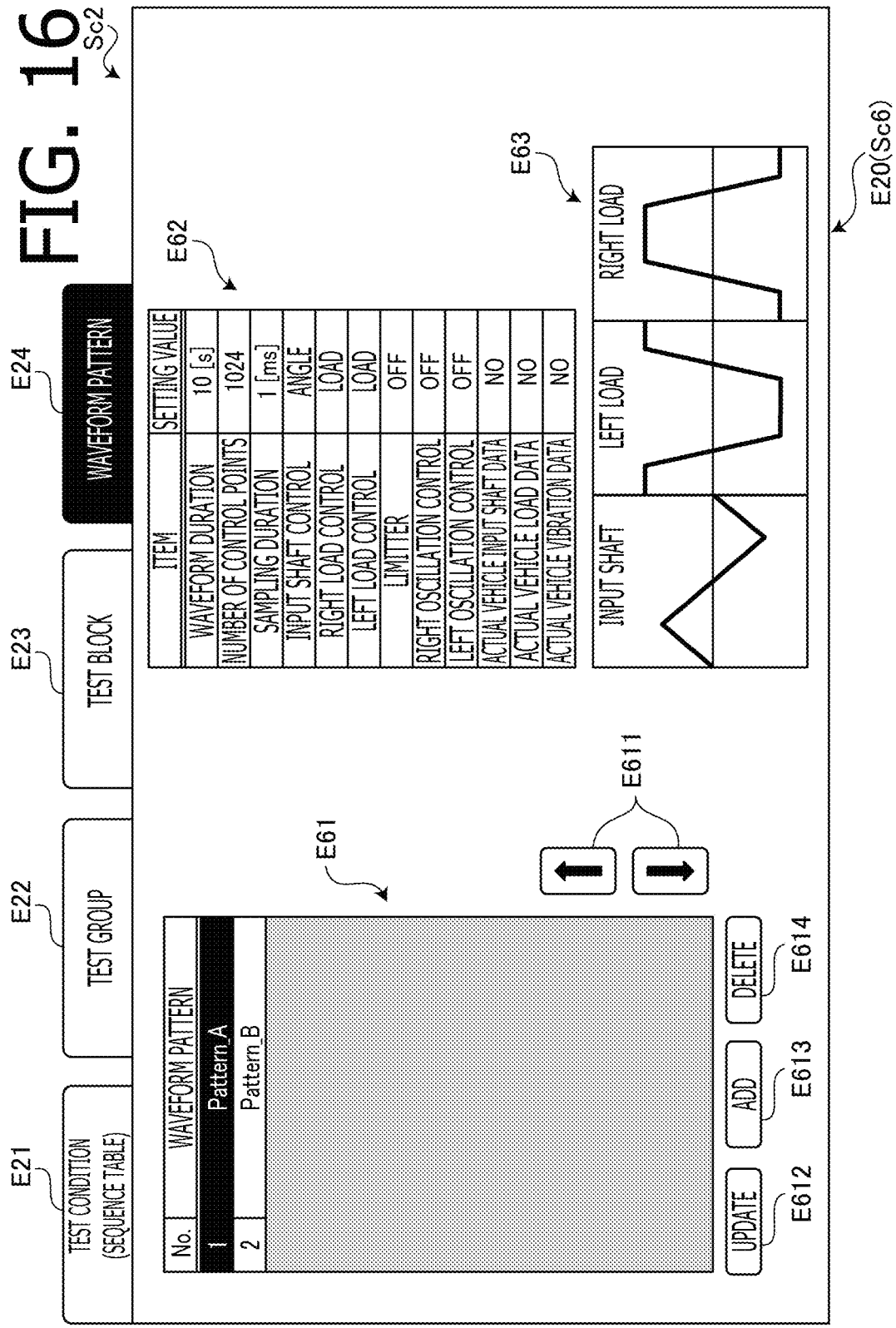
FIG. 16 is a setting screen displayed during execution of a waveform pattern setting subroutine.

The tab E24 is associated with settings of the waveform pattern, and when the tab E24 is touched, the test condition setting process shifts to a waveform pattern setting subroutine for setting the waveform pattern, and the display of the window E20 switches to a waveform pattern setting screen Sc6 (FIG. 16).

Figure 12A:
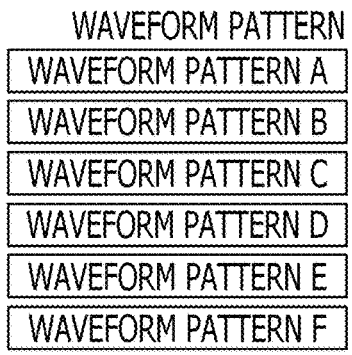
FIGS. 12A to 12C are diagrams illustrating a nesting structure of a process module.
Figure 12B:
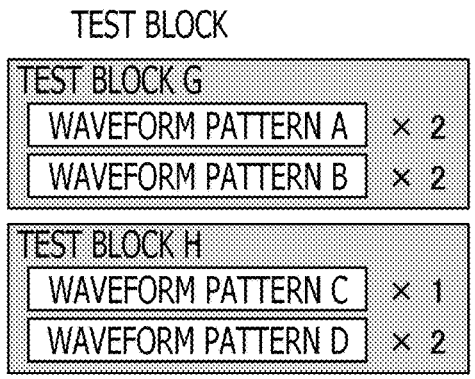
Figure 12C:
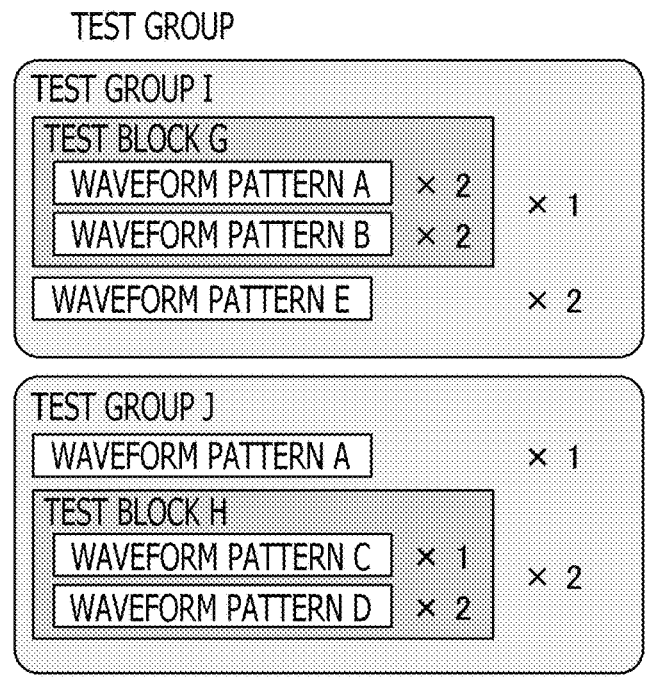

FIGS. 12A to 12C are diagrams illustrating the nesting structure of the process module. FIG. 12A shows an example with six types of waveform patterns (waveform patterns A to F), FIG. 12B shows an example with two types of test blocks (test blocks G and H), and FIG. 12C shows an example with two types of test groups (test groups I and J). It is noted that the waveform patterns A to F, the test blocks G and H, and the test groups I and J are set in a sequence table E37 shown in FIG. 11 and which will be described later. Each of the test blocks and the test groups consists of a plurality of lower-order process modules (waveform patterns or waveform blocks). It is noted that, in FIGS. 12B, 12C and 13, the recitation "×$n_0$" (where no is a natural number and is referred to as a "repeat count") indicates that the process module is to be consecutively executed no times.

As shown in FIG. 12A, the waveform pattern is the lowest-order process module (i.e., the most basic configuration that does not include other process modules). For example, in the case of a cyclic process, a sub-process for one cycle is set as the waveform pattern. It is noted that the waveform pattern of the present embodiment defines not only a behavior of one control target (for example, the servomotor 21 of the input side drive part 20) but also the entire or a part of a behavior (sub-process) of the test device 1.

As shown in FIG. 12B, the test block consists of a plurality of lower-order process modules (i.e., waveform patterns). For example, the test block G consists of four waveform patterns (2 waveform patterns A and 2 waveform patterns B), and the test block H consists of three waveform patterns (one waveform pattern C and 2 waveform patterns D). It is noted that each of the test blocks G and H consists of a plurality of types of waveform patterns but it is also possible to compose a test block from one waveform pattern (with the repeat count no of equal to or more than two).

As shown in FIG. 12C, the test group consists of a plurality of lower-order process modules (i.e., waveform patterns or test blocks) including at least one test block. For example, the test group I consists of one test block G and two waveform patterns E, and the test group J consists of one waveform pattern A and two test blocks 11.

As shown in FIG. 11, the test condition setting screen Sc3 includes a test mode setting part E31, a test cycle count setting part E32, a spring load setting part E33, a learning-function setting part E34, an end-abutment control setting part E35, a slow-up process setting part E36, the sequence table E37, and a test condition file operation part E38.

The test mode setting part E31 is an element for setting a test mode described below. The test mode setting part E31 of the present embodiment is implemented in the form of a pull-down menu through which a test mode to be applied can be selected from 19 types of test modes which will be described later.

With the above-described hardware configuration, the test device 1 is configured to be capable of performing the following five inputs (1) to (5) on the specimen W.

(1) Rotation of the steering shaft W1 (input shaft rotation)
(2) Application of the load L to the left tie rod W4 (left load)
(3) Application of the load L to the right tie rod W4 (right load)
(4) Oscillation of the left tie rod W4 (left oscillation)
(5) Oscillation of the right tie rod W4 (right oscillation)

The above-mentioned (1) is performed by driving the input side drive part 20, the above-mentioned (2) and (3) are performed by driving the servomotors 62 of the left and right output side drive parts 60L and 60R, and the above-mentioned (4) and (5) are performed by driving the servomotors 67 of the left and right output side drive parts 60L and 60R.

The test device 1 is configured to be capable of performing tests in the following 19 test modes (a) to (s) by a combination of the inputs (1) to (5).

(a) input shaft rotation
(b) left load
(c) right load
(d) left load+right load
(e) left oscillation
(f) right oscillation
(g) left oscillation+right oscillation
(h) input shaft rotation+left load
(i) input shaft rotation+right load
(j) input shaft rotation+left load+right load
(k) input shaft rotation+left oscillation
(l) input shaft rotation+right oscillation
(m) input shaft rotation+left oscillation+right oscillation
(n) input shaft rotation+left load+left oscillation
(o) input shaft rotation+right load+right oscillation
(p) input shaft rotation+left load+right load+left oscillation+right oscillation
(q) left load+left oscillation
(r) right load+right oscillation
(s) left load+right load+left oscillation+right oscillation The test cycle count setting part E32 is an element for setting the number of times the test sequence (test cycle) set in the sequence table E37 is to be repeatedly executed (hereinafter referred to as a "test cycle count"). The test cycle count setting part E32 of the present embodiment is implemented in the form of a text box to which a numerical value can be inputted, and is configured to set the numerical value input by the user as the test cycle count.

The spring load setting part E33 is an element for setting a load condition (specifically, a relationship between the angular position $\theta_{20}$ of the steering shaft W1 and a target value $R_L$ of the load L) to be used in a spring load control which will be described later. A load condition file as a file including data indicating the relationship between the angular position $\theta_{20}$ and the load L (for example, a function or a numerical value table) is stored in advance in the storage 824 of the control part 82 or a server SV or the like the control part 82 can access (hereinafter referred to as a "storage 824 or the like"). The spring load setting part E33 of the present embodiment is implemented in the form of a pull-down menu in which one or more load condition files are set as options, and is configured to set a load condition included in a load condition file selected by the user.

The learning-function setting part E34 is an element for setting whether to enable a learning function realized by the load control Sa20 which will be described later. The learning-function setting part E34 of the present embodiment is implemented in the form of a pull-down menu through which "enable" or "disable" can be selected, and is configured to set enablement or disablement of the learning function in accordance with the selection by the user.

The end-abutment control setting part E35 is an element for performing settings related to an end-abutment control S9 which will be described later. The end-abutment control setting part E35 includes an enablement/disablement setting part E351 that sets whether to enable the end-abutment control S9, and a plus-side end-abutment determination angle setting part E352 and a minus-side end-abutment determination angle setting part E353 that respectively set boundary values of plus-side and minus-side end-abutment determination angle ranges. Specifically, a value of the angular position $\theta_{20}$ of a boundary of the end-abutment determination angle range when the steering shaft W1 is rotated clockwise is set by the plus-side end-abutment determination angle setting part E352, and a value of the angular position $\theta_{20}$ of a boundary of the end-abutment determination angle range when the steering shaft W1 is rotated counterclockwise is set by the minus side end-abutment determination angle setting part E353.

The enablement/disablement setting part E351 of the present embodiment is implemented in the form of a pull-down menu through which "enable" or "disable" can be selected, and is configured to set the enablement or disablement of the end-abutment control in accordance with the selection by the user.

Further, the plus-side end-abutment determination angle setting part E352 and the minus-side end-abutment determination angle setting part E353 of the present embodiment are implemented in the form of text boxes to which numerical values can be inputted, and are configured to set the numerical values input by the user as values of the angular positions $\theta_{20}$ of the plus-side and minus-side boundaries of the end-abutment determination angle range, respectively.

The slow-up process setting part E36 is an element for performing settings related to a slow-up process S22 (slow-up procedure) which will be described later. The slow-up process setting part E36 includes an enablement/disablement setting part E361 for setting whether to enable the slow-up process S22, an initial load factor setting part E362 for setting an initial load factor $r_{S0}$ being a load factor at the start of the driving, and a slow-up count setting part E363 for setting a slow-up count $N_S$. It is noted that the slow-up process S22 is a process of gradually increasing the load at the initial stage of the load control S20, and the load factor $r_{S0}$ is a load factor $r_S$ (a reduction ratio of the load L) to be applied to the first control cycle. The load factor $r_S$ is a positive decimal of 1 or less and is defined as a ratio of the target value $R_L$ of the load L in case the slow-up process S22 is applied against the target value $R_L$ of the load L in case the slow-up process S22 is not applied (i.e., the reduction factor of the load L).

The enablement/disablement setting part E361 of the present embodiment is implemented in the form of a pull-down menu through which "enable" or "disable" can be selected, and is configured to set enablement or disablement of the slow-up process in accordance with the selection by the user.

The initial load factor setting part E362 and the slow-up count setting part E363 of the present embodiment are implemented in the form of text boxes through which numerical values can be inputted, and are configured to set the numerical values input by the user to the initial load factor $r_{S0}$ and the slow-up count $N_S$, respectively.

A single process module (a test group, a test block, or a waveform pattern) is set in each row of the sequence table E37, and the process modules set in respective rows are executed in an order of row numbers (L1 to L4) of the sequence table E37.

The sequence table E37 includes a column E371 in which the row numbers (L1 to L4) indicating the order of execution of the process modules are to be set, a column E372 in which test groups are to be set, a column E373 in which test blocks are to be set, a column E374 in which waveform patterns are to be set, a column E375 in which the repeat counts (the number of times the process modules are to be repeatedly executed) are to be set, a column E376 in which temperature setting signals are to be set, and a column E377 in which triggers are to be set. It is noted that, in each row of the sequence table E37, any one of a test group (column E372), a test block (column E373) and a waveform pattern (column E374) is to be set.

FIG. 13 is a developed sequence table showing a developed sequence obtained by developing the test sequence set in the sequence table E37 shown in FIG. 11 for each waveform pattern. Numbers L1 to L4 in FIG. 13 are row numbers that are set in the column E371 of the sequence table E37 and indicate the order of execution of the process modules. It is noted that configurations of the test groups I and J and the test block H included in this test sequence are those that are shown in FIG. 12C. The waveform patterns constituting the test sequence are executed in order of the execution numbers in the developed sequence table.

The test device 1 is configured to be capable of operating in cooperation with external devices. For example, the temperature adjusting part ED1 (FIG. 9) such as a constant temperature oven for adjusting the temperature of the specimen W can be connected to the test device 1 to add a temperature adjusting function to the test device 1. In case the temperature adjusting part ED1 is to be used, a temperature setting signal for controlling the temperature adjusting part ED1 is set in the column E376.

The trigger (column E377) is also a setting item for operating in cooperation with external devices. The process module in the row to which the trigger is set is executed in response to detection of a trigger signal from an external device (or generated by an internal process of the test device 1). For example, when adjusting the temperature with the temperature adjusting part ED1, the temperature adjusting part ED1 can be set so that the temperature adjusting part ED1 generates a trigger signal when the temperature reaches a set temperature, and a trigger can be set in the sequence table E37 so that the process module is executed in response to detection of this trigger signal by the control part 82. This makes it possible to reliably perform the test under correct temperature conditions.

The test condition file operation part E38 includes a file information display part E381, an alias save button E382, an overwrite save button E383, and a cancel button E384. The file information display part E381 displays information of a test condition file being applied (for example, a path of the test condition file). The test condition set on the test condition setting screen Sc3 is stored in the test condition file. When the alias save button E382 is touched, a test condition file storing test conditions being set at that time is newly generated and saved in the storage 824 or the like. When the overwrite save button E383 is touched, contents of the test condition file being applied are updated (overwritten and saved). When the cancel button E384 is touched, the test conditions being set are not saved, and the test condition setting process ends.

In the present embodiment, each of the test mode setting part E31, the spring load setting part E33, and the learning-function setting part E34 is implemented in the form of the pull-down menu but may be implemented in the form of an element such as a widget (i.e., a GUI component configuring a graphical user interface) of another type through which a target item can be selected from a plurality of items (for example, radio buttons, list boxes or the like). Further, since the learning-function setting part E34, the enablement/disablement setting part E351 of the end-abutment control setting part E35, and the enablement/disablement setting part E361 of the slow-up process setting part E36 are for receiving an input of either enable or disable, they can also be implemented in the form of another type of element capable of receiving an input of two values such as, for example, a check box or a toggle switch.

In the present embodiment, the test cycle count setting part E32, the plus-side end-abutment determination angle setting part E352, the minus-side end-abutment determination angle setting part E353, the initial load factor setting part E362 and the slow-up count setting part E363 are each implemented in the form of a text box, but may be implemented in the form of another type of element (for example, a slider, a spin button, or the like) to which a numerical value can be inputted.

FIG. 14 is a schematic diagram of the setting screen Sc2 in which the test group setting screen Sc4 is displayed in the window E20, which is displayed during the test group setting subroutine.

The test group setting screen Sc4 includes a test group list E41 and a test group table E42. In the test group list E41, a list of registered test groups is displayed. In the test group list E41, a selected test group is highlighted (the background is displayed in black). In the test group table E42, contents of the test group selected in the test group list E41 are displayed. The test group can be edited (set) on the test group table E42.

The test group list E41 is accompanied by a pair of upper and lower arrow buttons E411, an update button E412, an add button E413, and a delete button E414. When the arrow button E411 is touched, the selection of the test group on the test group list E41 is switched in the direction of the arrow. When the update button E412 is touched, setting contents of the test group are updated to the setting contents being edited on the test group table E42. When the add button E413 is touched, the setting contents being edited on the test group table E42 are additionally registered as a new test group. When the delete button E414 is touched, the registration of the selected test group is deleted.

A single process module (a test block or a waveform pattern) is set in each row of the test group table E42. The process modules set in respective rows are executed in order of row numbers (M1, M2) of the test group table E42.

The test group table E42 includes a column E421 in which the row numbers (M1 and M2) indicating the order of execution of the process modules are to be set, a column E422 in which the test blocks are to be set, a column E423 in which the waveform patterns are to be set, a column E424 in which the repeat counts are to be set, a column E425 in which the temperature setting signals are to be set, and a column E426 in which the triggers are to be set. It is noted that one of the test block (column E422) and the waveform pattern (column E423) is to be set in each row of the test group table E42.

FIG. 15 is a schematic diagram of the setting screen Sc2 in which the test block setting screen Sc5 is displayed in the window E20, which is displayed during the test block setting subroutine.

The test block setting screen Sc5 includes a test block list E51 and a test block table E52. In the test block list E51, a list of registered test blocks is displayed. In the test block list E51, a selected test block is highlighted. In the test block table E52, the setting contents of the test block selected in the test block list E51 are displayed. The test block can be edited (set) on the test block table E52.

The test block list E51 is accompanied by a pair of upper and lower arrow buttons E511, an update button E512, an add button E513, and a delete button E514. When the arrow button E511 is touched, the selection of the test block on the test block list E51 is switched in the direction of the arrow. When the update button E512 is touched, the setting contents of the test block are updated to the setting contents being edited on the test block table E52. When the add button E513 is touched, the setting contents being edited on the test block table E52 are additionally registered as a new test block. When the delete button E514 is touched, the registration of the selected test block is deleted.

One type of waveform pattern is set in each row of the test block table E52, and the waveform patterns set in respective rows are executed in order of row numbers (N1, N2) of the test block table E52.

The test block table E52 includes a column E521 in which the row numbers (N1, N2) indicating the order of execution the waveform patterns are to be set, a column E522 in which the waveform patterns are to be set, and a column E523 in which the repeat counts are to be set.

FIG. 16 is a schematic diagram of the setting screen Sc2 in which the waveform pattern setting screen Sc6 is displayed in the window E20, which is displayed during execution of the waveform pattern setting subroutine.

The waveform pattern setting screen Sc6 includes a waveform pattern list E61, a waveform pattern table E62, and a waveform pattern viewer E63. In the waveform pattern list E61, a list of registered waveform patterns is displayed. In the waveform pattern list E61, a selected waveform pattern is highlighted. In the waveform pattern table E62, setting contents of the waveform pattern selected in the waveform pattern list E61 is displayed. In the waveform pattern viewer E63, the waveform pattern selected in the waveform pattern list E61 is graphically displayed.

As the waveform pattern, at least one of an input shaft test waveform (hereinafter abbreviated as an "input shaft waveform"), a left-side load test waveform (hereinafter abbreviated as a "left load waveform"), a right-side load test waveform (hereinafter abbreviated as a "right load waveform"), a left-side oscillation test waveform (hereinafter abbreviated as a "left oscillation waveform"), and a right-side oscillation test waveform (hereinafter abbreviated as a "right oscillation waveform") to be used for the test is set. The input shaft waveform is waveform data representing a change over time of the angular position $\theta_{2O}$ of the output shaft of the input side drive part 20 (i.e., the chuck 24).

The left load waveform [right load waveform] is waveform data representing a temporal change of the load IL to be applied to the tie rod W4 on the left side [right side] of the specimen W by the output side drive part 60L [60R]. The left oscillation waveform [right oscillation waveform] is waveform data representing a temporal change of the vertical displacement D to be applied to the tie rod end W41 on the left side [right side] of the specimen W by the output side drive part 60L [60R]. In the waveform pattern viewer E63, at least one test waveform set in the waveform pattern is displayed. It is noted that, in the waveform patterns shown in FIG. 16, the input shaft waveform, the left load waveform and the right load waveform are set, and these 3 test waveforms are displayed in the waveform pattern viewer E63.

It is noted that, in each test waveform, a "control point", which is a parameter corresponding to time, and an "amplitude," which is a parameter corresponding to each controlled variable, are associated with each other, and each test waveform is set in the form of a numerical value table, a function or a waveform identification number (hereinafter abbreviated as a "waveform ID"). The waveform ID is a unique identification number assigned to each basic waveform registered in advance (or a user-registered waveform registered by the user).

The waveform pattern list E61 is accompanied by a pair of upper and lower arrow buttons E611, an edit button E612, an add button E613, and a delete button E614. When the arrow button E611 is touched, the selection of the waveform pattern on the waveform pattern list E61 is switched in a direction of the arrow. When the edit button E612 is touched, a waveform pattern edit screen Sc7 (FIG. 17) is displayed and it becomes possible to edit the selected waveform pattern. When the add button E613 is touched, a new waveform pattern is additionally registered, and when the delete button E614 is touched, the registration of the selected waveform pattern is deleted.

Figure 17:
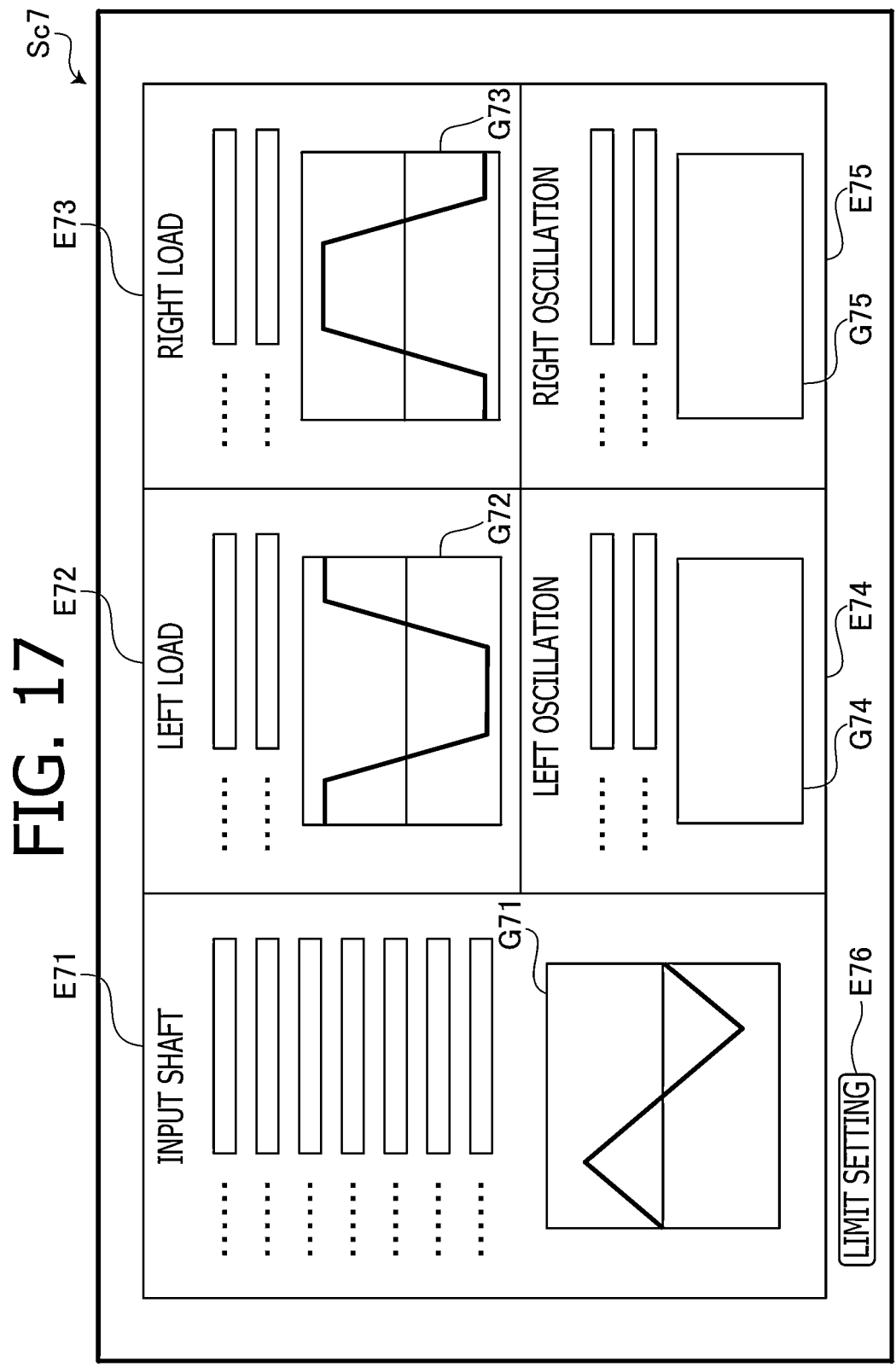
FIG. 17 is a diagram showing a schematic configuration of a waveform pattern editing screen.

FIG. 17 is a schematic diagram of the waveform pattern edit screen Sc7. The waveform pattern edit screen Sc7 includes an input shaft waveform setting part E71 for setting the input shaft waveform, a left load waveform setting part E72 for setting the left load waveform, a right load waveform setting part E73 for setting the right load waveform, a left oscillation waveform setting part E74 for setting the left oscillation waveform, a right oscillation waveform setting part E75 for setting the right oscillation waveform, and a limit setting button E76. The setting parts E71 to E75 respectively include waveform viewers G71 to G75 that graphically display the set test waveforms.

Figure 18:
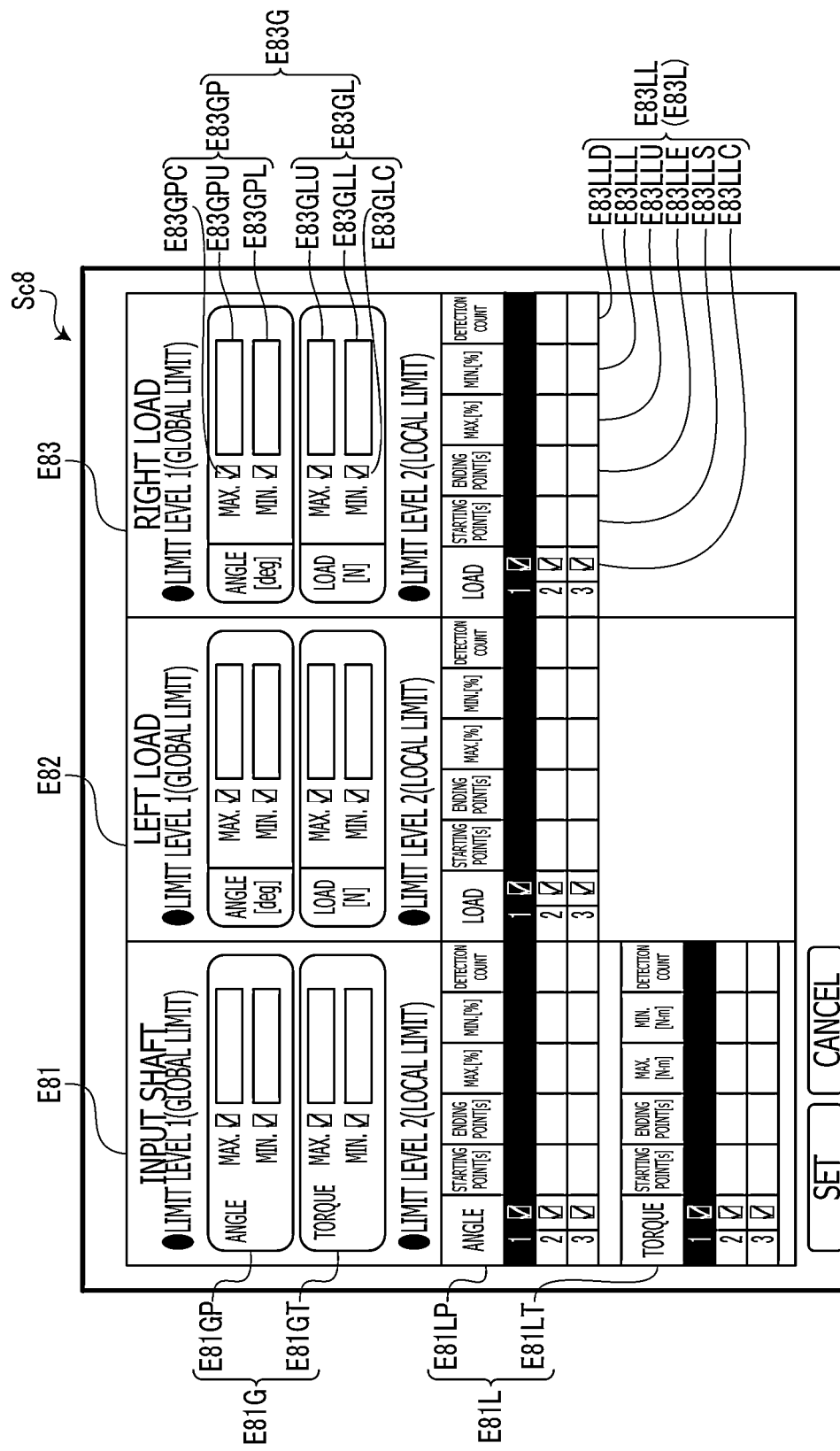
FIG. 18 is a diagram showing a schematic configuration of a limit setting screen.

FIG. 18 is a schematic diagram of a limit setting screen Sc8 which is displayed when the limit setting button E76 (FIG. 17) is touched. The limit setting screen Sc8 includes an input shaft limit setting part E81 for setting limits related to the input shaft rotation, a left load limit setting part E82 for setting limits related to the left load, a right load limit setting part E83 for setting limits related to the right load, a set button E891 for applying the settings that are set in the limit setting screen Sc8, and a cancel button E892 for aborting the setting operation. It is noted that, when the left oscillation waveform or the right oscillation waveform is set in the waveform pattern edit screen Sc7 (FIG. 17), a left oscillation setting part or a right oscillation setting part for setting limits relating to the left oscillation or the right oscillation is further provided to the limit setting screen Sc8.

The present embodiment is configured such that the limit can be set in two stages for each input. The limits of the first stage (hereinafter referred to as "first limit level") are global limits that are applied over the entire test time (i.e., applied at all times during the test), and the limits of the second stage (hereinafter referred to as "second limit level") are local limits that are applied in a limited way to a predetermined time range. By setting the limits in two stages as described above, since it becomes possible to finely set the limits in accordance with the test condition (the waveform pattern) that varies depending on time (the control point), it becomes possible to more reliably prevent validity of the test result from being impaired due to an unexpected excessive stress being applied to the specimen W.

The right load limit setting part E83 includes a global limit setting part E83G for setting the global limits and a local limit setting part E83L for setting the local limits.

The global limit setting part E83G includes an angular position global limit setting part E83GP for setting the global limits of an angular position $\theta_{60}$ of the movable base 66 of the output side drive part 60R, and a load global limit setting part E83GL for setting the global limits of the load L to be applied to the specimen by the output side drive part 60R.

The angular position global limit setting part E83GP includes maximum value setting part E83GPU for setting a maximum value of the angular position $\theta_{60}$, a minimum value setting part E83GPL for setting a minimum value of the angular position $\theta_{60}$, and check boxes (enablement setting parts) E83GPC for setting enablement or disablement of respective setting items (the maximum value and the minimum value).

Similarly to the angular position global limit setting part E83GP, the load global limit setting part E83GL includes a maximum value setting part E83GLU for setting a maximum value of the load L, a minimum value setting part E83GLL for setting a minimum value of the load L, and check boxes E83GLC for setting enablement or disablement of respective setting items.

The local limit setting part E83L includes a load local limit setting part E83LL for setting the local limits of the load L. The load local limit setting part E8311, includes check boxes E83LLC for setting enablement or disablement of respective setting items, a start point setting part E83LLS for setting a start point of a test section (time) for setting the local limits, an end point setting part E83LLE for setting an end point of the test section, a maximum value setting part E83LLU for setting a maximum value of the load L, a minimum value setting part E83LLL for setting a minimum value of the load L, and a reference detection count setting part E83LLD for setting a reference detection count. The local limit setting part E83L is configured to be capable of setting the local limit for one or more test sections (in the limit setting screen Sc8 of FIG. 18, three sections). It is noted that the start point and the end point of the test section input in units of "second" to the start point setting part E83LLS and the end point setting part E83LLE are converted into corresponding control points based on a sampling time set in the waveform pattern table E62 of the waveform pattern setting screen Sc6 (FIG. 16).

The limit values (the maximum value and the minimum value) of the local limits are set between the maximum value and the minimum value of the global limits. Once the maximum value or the minimum value of the global limits is exceeded, the test is immediately aborted. On the other hand, the test is aborted only when the maximum value or the minimum value of the local limits is exceeded continuously for the reference detection count. In addition, the test program 824c is configured to immediately stop operation of the test device 1 even in the middle of a test cycle when the measured value exceeds the maximum value or the minimum value of the global limits, but to stop operation of the test device 1 after the test cycle is completed when the measured value exceeds the maximum value or the minimum value of the local limits continuously for the reference detection count.

The global limits are limit values set mainly for the purpose of detecting abnormalities such as mounting error of the specimen W and failure of the test device 1, and the local limits are limit values set mainly for the purpose of detecting failure of the specimen W due to fatigue. In many cases, the failure of the specimen W due to fatigue gradually progresses, and thus, in many cases, behaviors of the specimen W become unstable before the specimen W completely fails and the measurement value temporarily indicates an abnormal value. Further, when the specimen W completely breaks down, the measured value continuously shows abnormal values over a certain time. By using this knowledge, the present embodiment is configured such that, when the measured value exceeds the maximum value or the minimum value of the local limits continuously for the reference detection count, it is determined that the specimen W has failed and the test is automatically terminated. With this configuration, since the test automatically ends when the specimen W breaks down during the test, the test is prevented from being unnecessarily continued after the specimen W breaks down. Further, the test is prevented from being interrupted before the specimen W fails.

Further, when the specimen W is deteriorated by the test, in many cases, an abnormality appears at a timing at which a large stress is applied to the specimen W but the specimen W operates normally when the stress is small. However, as the specimen W breaks down, an abnormality often appears even when the stress is small. Therefore, by setting the local limit at a timing at which the stress applied to the specimen W is small (i.e., the abnormality of the measurement value is less likely to occur before the failure), it is possible to detect the occurrence of the failure more accurately.

The present embodiment is configured such that, in the maximum value setting part E83LLU and the minimum value setting part E83LLL, the local limits (the maximum value and the minimum value) of the load L can be set not as absolute values but as relative values (unit:%) with respect to the global limits (maximum value and minimum value) of the load L set in the maximum value setting part E83GLU and the minimum value setting part E83GLL of the load global limit setting part E83GL, respectively. With this configuration, when the setting of the global limits of the load L are changed, the local limits of the load L are automatically changed to appropriate magnitudes. Therefore, it is not necessary to change the setting of the local limits of the load L one by one, and complicated setting of the limits is simplified.

Since the left load limit setting part E82 and the right load limit setting part E83 described above share a common configuration, the description of the left load limit setting part E82 is herein omitted.

The input shaft limit setting part E81 includes a global limit setting part E81G for setting the global limits and a local limit setting part E81L for setting the local limits.

The global limit setting part E81G includes an angular position global limit setting part E81GP for setting the global limits of the angular position $\theta_{20}$ of the output shaft of the input side drive part 20 (i.e., the angular position $\theta_{20}$ of the steering shaft W1 of the specimen W, and a torque global limit setting part E81GT for setting the global limits of a torque T to be applied to the output shaft of the input side drive part 20. Since the configurations of the angular position global limit setting part E81GP and the torque global limit setting part E81GT share similarity with the configurations of the angular position global limit setting part E83GP and the load global limit setting part E83GL of the right load limit setting part E83 described above, descriptions thereof are herein omitted.

The local limit setting part E81L includes an angular position local limit setting part 81LP for setting the local limits relating to the angular position $\theta_{20}$ of the input side drive part 20, and a torque local limit setting part E81LT for setting the local limits relating to the torque T of the input side drive part 20. The configurations of the angular position local limit setting part E81LP and the torque local limit setting part E81LT share similarity with the configuration of the load local limit setting part E83LL of the right load limit setting part E83 described above, and thus descriptions thereof are herein omitted.

Next, processes performed by the test device 1 when performing a durability test of the steering device will be described.

Figure 19:
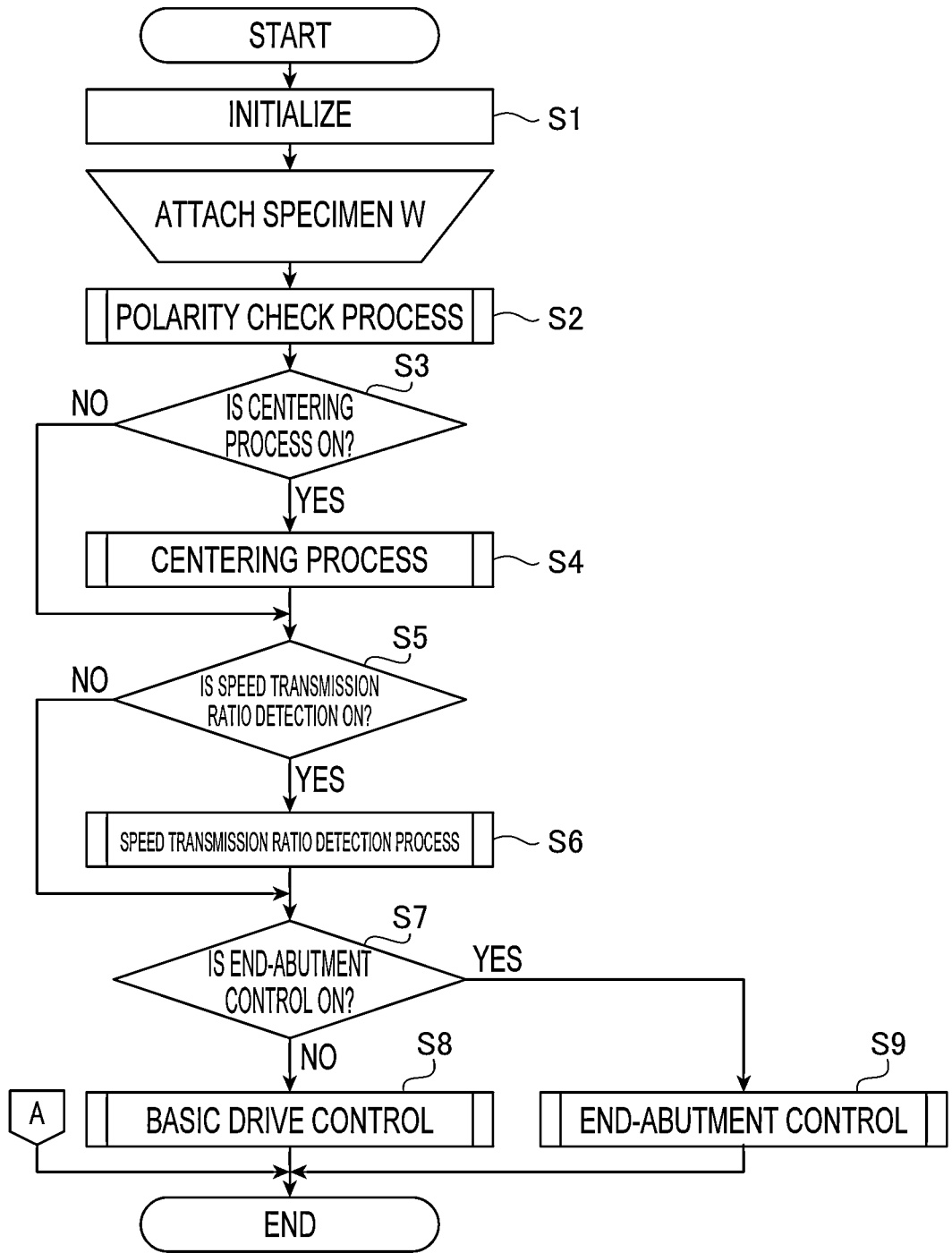
FIG. 19 is a flowchart showing a procedure of a durability test of the steering device.

FIG. 19 is a flowchart showing a procedure of a durability test of a steering device using the test device 1. It is noted that processes from an initialization S1 to a transmission ratio detection process S6 described below are preparatory processes before the main test, and processes after a process S7 are processes for the main test.

When the test start button E11 on the menu screen Sc1 (FIG. 10) displayed on the touch screen is touched, the durability test starts, and the initialization S1 of the test device 1 is first performed. In the initialization S1, various setting values to be used for control and measurement by the test device 1 are read. In addition, each movable part of the test device 1 returns to the origin and moves to the initial position. After completion of the initialization S1, the specimen W is attached to the test device 1.

(Polarity Check Process)

After the specimen W is attached to the test device 1, a polarity check process S2 is performed.

A relationship between a rotation direction of the steering shaft W1 and a movement direction of the tie rod W4 varies depending on the type of the specimen W. For example, a so-called "front steer" steering device in which the tie rod W4 is connected to the steering knuckle in front of the axle is configured such that the tie rod W4 moves to the right (Y-axis negative direction) when the steering wheel is rotated in the forward direction (clockwise, CW) and the tie rod W4 moves to the left (Y-axis positive direction) when the steering wheel is rotated in the reverse direction (counterclockwise, CCW). A so-called "rear steer" steering device in which the tie rod W4 is connected to the steering knuckle behind the axle is configured such that the tie rod W4 moves to the left when the steering wheel is rotated in the forward direction and the tie rod W4 moves to the right when the steering wheel is rotated in the reverse direction. In this specification, such relationship between the rotation direction of the steering shaft W1 and the movement direction of the tie rod W4 is referred to as a polarity of the steering device (the specimen W). The polarity of the steering device for the "front steer" is referred to as a positive polarity, and the polarity of the steering device for the "rear steer" is referred to as a negative polarity.

Further, as described above, the movable base 66 of the output side drive part 60 is provided with the pair of arms 661 (the front arm 661f and the rear arm 661r) for attaching the tie rod end W41 of the specimen W at two positions in front of and behind the rotation axis of the movable base 66, and the relationship between the movement direction of the tie rod W4 and the rotation direction of the movable base 66 depends on which of the arms 661 (tic rod connecting parts) the tie rod W4 is connected to. That is, the relationship between the rotation direction of the steering shaft W1 of the specimen W and the rotation direction of the movable base 66 of the output side drive part 60 (or the movement direction of the tie rod W4) (i.e., the polarity of the entire test system which is hereinafter referred to as a "system polarity") differs depending on the type of the specimen W and which of the arms 661 (the front arm 661f or the rear arm 661r) the tie rod W4 is connected to.

The system polarity is set in advance as a test condition. However, if the system polarity is erroneously set, an excessive load L acts on the specimen W and the specimen W may be damaged. Therefore, the polarity check process S2 for confirming whether the setting of the system polarity is correct is performed before the test.

Figure 20:
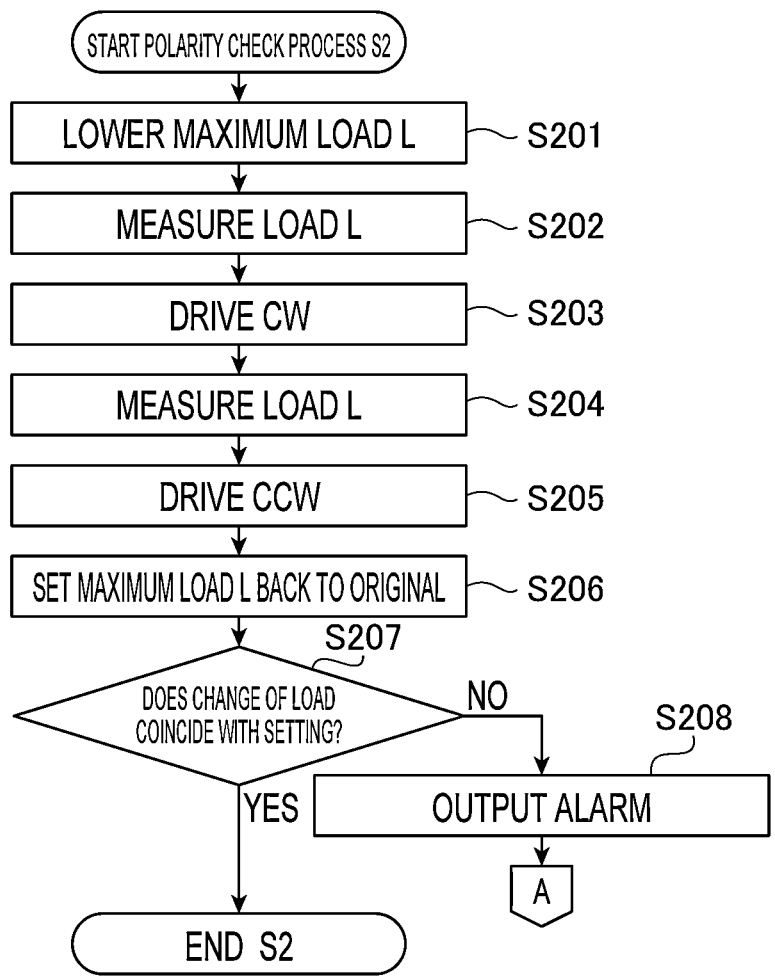
FIG. 20 is a flowchart showing a procedure of a polarity check process.

FIG. 20 is a flowchart showing a procedure of the polarity check process S2. In the polarity check process S2, first, the maximum value of the load L, is lowered to a small value (for example, 5 kN) that does not affect the specimen W (S201). Since the output side drive part 60 operates so as not to exceed the set maximum value of the load L, by performing the process S201, even when the system polarity is erroneously set, damage or deterioration of the specimen W can be prevented.

Next, the load L, detected by the force sensor 662 provided on the movable table 66 of the output side drive part 60 is read (S202). Next, the servomotor 21 of the input side drive part 20 is driven, the steering shaft W1 of the specimen W is rotationally driven by a predetermined angle (for example, about 20 to 30 degrees) in the forward direction (clockwise, CW) (S203), and the load L detected by the force sensor 662 is read again after the rotational driving (S204). After the load measurement S204, the steering shaft W1 of the specimen W is rotationally driven in the reverse direction (counterclockwise, CCW) by the same angle as that of the CW drive S203 by the input side drive part 20 to set back to the initial angular position (S205), and then the maximum value of the load L is set back to the setting value before being changed in the process S201 (S206). Next, it is determined whether a change (increase or decrease) of the load IL before and after the CW driving S203 coincides with the preset system polarity (S207), and when it does not coincide (S207: NO), an alarm indicating that the setting of the system polarity (i.e., the polarity of the specimen W or the mounting position of the tie rod W4 of the specimen W) is wrong is output (S208), and the durability test is aborted. When the change in the measured value of the load L coincides with the setting of the polarity of the specimen W (S207: YES), the polarity check process S2 ends, and the process proceeds to the next process S3 (FIG. 19).

(Centering Process)

Next, it is confirmed whether the setting is to perform a centering process S4 of the specimen W (S3). The centering process S4 is a process for automatically checking and setting a range of the angular position $\theta_{20}$ the steering shaft W1 of the specimen W can rotate (a movable range) and a center position $\theta_C$ of the range. When the movable range of the specimen W is not set, the centering process S4 is enabled (ON), and when the movable range of the specimen W is known, the movable range is input in advance and the centering process S4 is disabled (OFF). When the centering process is enabled (ON) (S3: YES), the centering process S4 is executed, and when the centering process S4 is disabled (OFF) (S3: NO), the centering process S4 is skipped and the process proceeds to the next process S5.

FIG. 21 is a flowchart showing a procedure of the centering process S4. In the centering process S4, first, a drive control S401 is performed. In the drive control S401, while monitoring the torque T of the steering shaft W1 detected by the torque sensor 23 of the input side drive part 20 (i.e., while measuring the torque T (S4012) and determining whether a magnitude of the measured torque T exceeds a reference value $\tau$ (S4013)), the steering shaft W1 of the specimen W is slowly rotationally driven by the input side drive part 20 at a constant speed in a set drive direction (for example, CW) (S4011) until a magnitude of the torque T increases (specifically, until the torque T exceeds a reference value $\tau$)[a unidirectional drive step]. When the increase in the Torque T is detected (i.e., when it is determined that the magnitude of the measured torque T exceeds the reference value $\tau$ (S4013: YES)), the driving of the steering shaft W1 is stopped (S4014).

The angular velocity $\omega_{20}$ of the steering shaft W1 in drive control S401 is set to such a magnitude that the torque T exceeding an allowable torque of the specimen W is not generated until the driving is stopped after the torque T exceeding the reference value $\tau$ is detected. For example, the angular velocity $\omega_{20}$ of the steering shaft W1 is set such that an amount of increase in the torque T (an amount of increase in the measured value before and after exceeding the reference value $\tau$) when the specimen W reaches an end of the movable range (an end-abutment position which will be described later) becomes equal to or less than the reference value $\tau$.

Further, the reference value $\tau$ of the torque T is a small value to the extent that the specimen W is not damaged even if the torque T is repeatedly applied to the specimen W. In the present embodiment, the reference value $\tau$ is set to a value larger than a maximum value of the torque T detected when the steering shaft W1 is rotated in a state where the specimen W has not reached the end-abutment position (more specifically, for example, a value larger than an average value of the torque T detected when the steering shaft W1 is rotated in a state where the specimen W has not reached the end-abutment position by three times the standard deviation or more).

When the magnitude of the torque T becomes equal to or larger than the reference value $\tau$(S4013: YES), the driving of the steering shaft W1 is stopped (S4014) and the drive control S401 ends. Then, a value $\theta_A$ of the angular position $\theta_{20}$ of the steering shaft W1 when the magnitude of the torque T reaches the reference value $\tau$ in the first drive control S401 is detected and stored (S402) [first end-abutment position detection step]. It is noted that the angular position of the steering shaft W1 (i.e., the angular position $\theta_{20}$ of the input side drive part 20) is calculated from a detection value by the rotary encoder RE built in the servomotor 21 of the input side drive part 20 (i.e., an angular position $\Theta_{21}$ of the shaft of the servomotor 21) and a reduction ratio $r_{22}$ of the speed reducer 22.

Next, the driving direction of the steering shaft W1 is switched to the opposite direction (for example, CCW) (S403), and the drive control S401 is performed again 1a reverse direction drive step). Then, when the magnitude of the torque T becomes equal to or larger than the reference value $\tau$ in the reverse drive control S401 (S4013: YES), the driving is stopped (S4014) and a value $\theta_B$ of the angular position $\theta_{20}$ of the steering shaft W1 at the time is detected and stored (S404) [a second end-abutment position detection step].

Next, the center position $\theta_C$ which is the center of the movable range of the steering shaft W1 is calculated by the following equation (1) (S405) [a center position calculation step], and the calculation result is stored (S406). Then, the angular position of the steering shaft W1 is moved to the center position $\theta_C$ (S407) [a centering step], and the centering process S4 ends.

$$\theta_C = \frac{\theta_A + \theta_B}{2} \quad (1)$$

it is note that, when the angular position $\theta_{20}$ of the steering shaft W1 of the specimen W reaches the end of the movable range, the specimen W is in a state where the rack end (more specifically, a stopper provided to the rack end) abuts against the steering gear box W3 (hereinafter, referred to as an "end-abutment state"). In this specification, the angular position of the steering shaft W1 in the end-abutment state is referred to as an end-abutment position. When the steering shaft W1 rotationally driven in the constant angular velocity $\omega_{20}$ reaches the end-abutment position, since the rotation of the steering shaft W1 is prevented, the torque T rapidly increases and exceeds the reference value $\tau$. That is, in the centering process S4, the end-abutment positions $\theta_A$ and $\theta_B$ of the specimen W are detected, and the center position $\theta_C$ is set in the middle of the end-abutment positions $\theta_A$ and $\theta_B$.

(Speed Transmission Ratio Detection Process)

Next, it is determined whether the transmission ratio detection process S6 is enabled (ON) (S5).

The speed transmission ratio detection process S6 is a process for automatically detecting and setting a ratio (hereinafter referred to as a "speed transmission ratio Tr") of a rotation angle of the movable base 66 corresponding to the steering knuckle (i.e., a change amount $\Delta\theta_{60}$ of the angular position of the movable base 66 of the output side drive part 60) with respect to a rotation angle of the steering shaft W1 of the specimen W (i.e., a change amount $\Delta\theta_{20}$ of the angular position of the input side drive part 20). The speed transmission ratio Tr is a parameter equivalent to a steering gear ratio. The speed transmission ratio Tr is necessary when determining the controlled variable of the output side drive part 60. The specimen W can be rotationally driven without changing the load L acting on the specimen W by rotationally driving the movable table 66 of the output side drive part 60 by an amount obtained by multiplying a drive amount of the steering shaft W1 by the input side drive part 20 (the angular velocity $\omega_{20}$ or the rotation angle $\Delta\theta_{20}$) by the speed rotation ratio Tr. When the speed transmission ratio Tr of the specimen W is not set, the speed transmission ratio detection process S6 is enabled (ON), and when the speed transmission ratio Tr of the specimen W is set, the speed transmission ratio detection process S6 is disabled (OFF). It is noted that the speed transmission ratio detection process S6 of the present embodiment is adapted to a variable gear ratio (VGR) steering device of which the steering gear ratio changes in accordance with the angular position $\theta_{20}$ of the steering shaft W1. When the type of the specimen W is set to the VGR, the speed transmission ratio detection process S6 is automatically enabled.

When the transmission ratio detection process S6 is enabled (ON) in S5 (FIG. 19) (S5: YES), the transmission ratio detection process S6 is executed, and when the transmission ratio detection process S6 is disabled (OFF) in S5 (FIG. 19) (S5: NO), the transmission ratio detection process S6 is skipped and the process proceeds to the next process S7.

Figure 22:
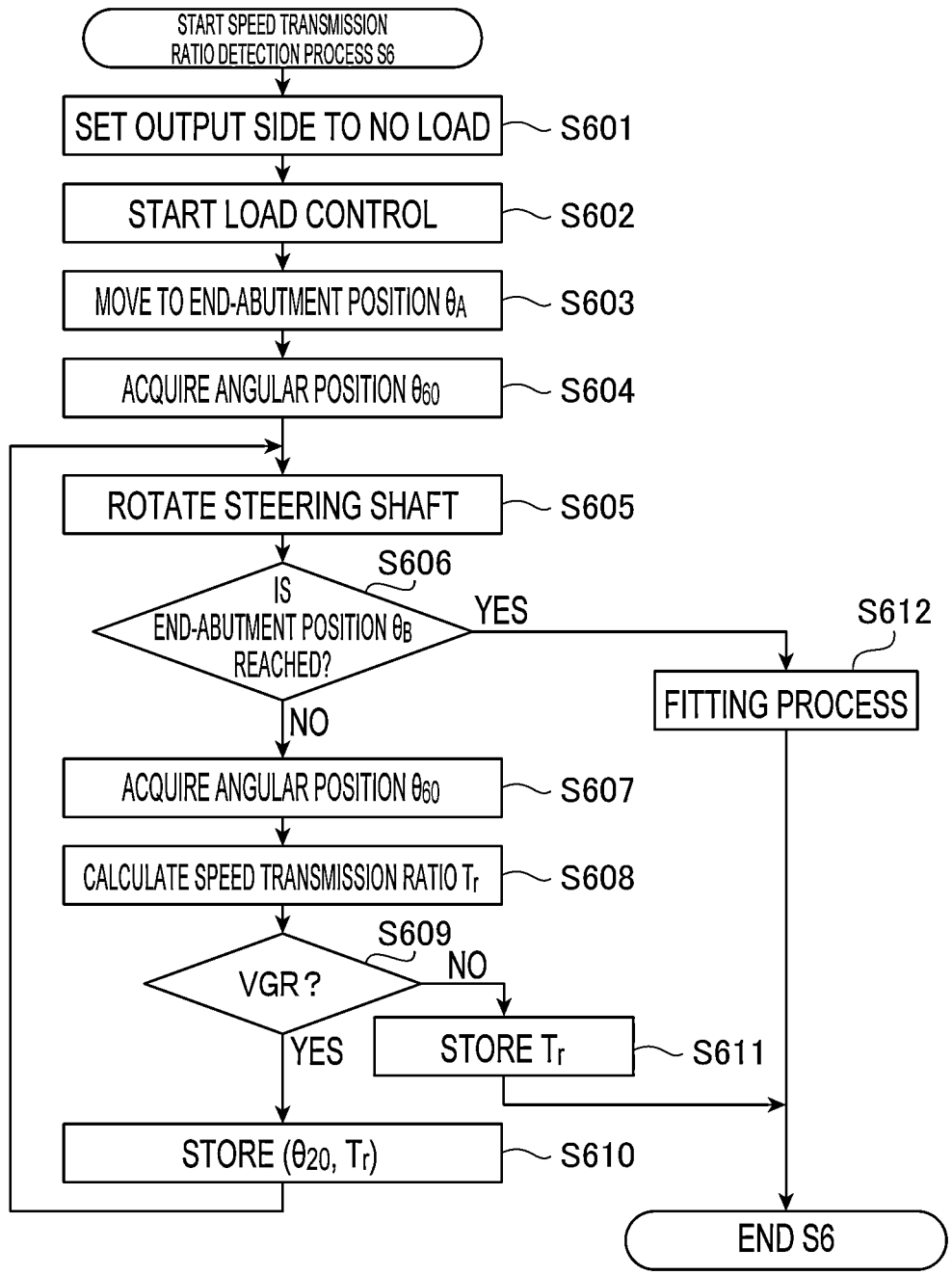
FIG. 22 is a flowchart showing a procedure of a transmission ratio detection process.

FIG. 22 is a flowchart showing a procedure of the transmission ratio detection process S6. In the speed transmission ratio detection process S6, first, the target value $R_L$ is set to zero (no load) (S601), and a load control by the output side drive part 60 is started (S602). By this configuration, the operation of the output side drive part 60 can be made to automatically follow the movement of the tie rod W4 of the specimen W in a no-load state. The load control continues until the transmission ratio detection process S6 ends.

Next, the steering shaft W1 is rotationally driven by the input side drive part 20 up to one end-abutment position $\theta_A$ (S603), and the angular position $\theta_{60}$ of the movable base 66 of the output side drive part 60 at the end-abutment position $\theta_A$ is obtained (S604). It is noted that the angular position $\theta_{60}$ of the output side drive part 60 is calculated from a detection value by a rotary encoder RE embedded in the servomotor 62 of the output side drive part 60 (an angular position $\Theta_{62}$ of a shaft of the servomotor 62) and a reduction ratio $r_{63}$ of the speed reducer 63.

Next, the steering shaft W1 is rotationally driven to rotate once (360 degrees) by the input side drive part 20 (S605), and when the end-abutment position $\theta_B$ is not reached (S606: NO), the angular position $\theta_{60}$ of the output side drive part 60 is obtained (S607).

Next, by Equation (2), the speed transmission ratio $T_r$ is calculated from the change amount $\Delta\theta_{20}$ of the angular position of the input side drive part 20 (360 degrees) and the change amount $\Delta\theta_{60}$ of the angular position of the output side drive part 60 before and after the immediately preceding rotational drive S605 (S608).

$$Tr = \frac{\Delta\theta_{60}}{\Delta\theta_{20}} \qquad (2)$$

Next, setting information relating to the specimen W is referred to, and it is determined whether the specimen W is the VGR (S609).

The VGR is configured such that the steering gear ratio gradually changes in accordance with the angular position $\theta_{20}$ of the steering shaft W1. Therefore, in order to perform tests on the VGR, information indicating a relationship between the angular position $\theta_{20}$ and the steering gear ratio over the entire movable range of the steering shaft W1 is required.

When the type of the specimen W is set to VGR (S609: YES), current angular position $\theta_{20}$ of the steering shaft W1 and speed transmission ratio Tr are stored in association with each other (S610). Then, the process returns to the process S605, and the processes S605 to S610 are repeated until the steering shaft W1 of the specimen W reaches the end-abutment position $\theta_B$. By this configuration, the speed transmission ratio Tr at each angular position $\theta_{20}$ is acquired and stored together with the angular position $\theta_{20}$ every time the steering shaft W1 of the specimen W is driven to rotate once i.e., every time a pinion of the specimen W rotates once).

When the end-abutment position $\theta_B$ is reached (S606: YES), a fitting process S612 (a fitting step) is performed, and the transmission ratio detection process S6 ends. In the fitting process S612, a calculation formula for calculating the speed transmission ratio Tr from the angular position $\theta_{20}$ is determined based on a plurality of pairs of the angular position $\theta_{20}$ of the steering shaft W1 and the speed transmission ratio Tr acquired in the above-mentioned processes S603 to S610 and stored. The calculation formula for the speed transmission ratio Tr is, for example, a polynomial obtained based on the obtained plurality of pairs of the angular position $\theta_{20}$ and the speed transmission ratio Tr by a regression analysis such as a least squares method. The calculation formula of the speed transmission ratio Tr may be determined by a method other than the regression analysis, such as an interpolation method.

In the present embodiment, the ratio of the rotation angle (or the angular velocity) of the movable base 66 to the rotation angle (or the angular velocity) of the steering shaft W1 is defined as the speed transmission ratio Tr, but the definition of the speed transmission ratio Tr is not limited to this. For example, a ratio of the rotation angle of the shaft of the servomotor 62 of the output side drive part 60 or the movable base 66 to the rotation angle of the shaft of the servomotor 21 of the input side drive part 20 or the steering shaft W1 can be used as the speed transmission ratio Tr. For example, when the ratio of the rotation angles of the shaft of the servomotor 21 and the shaft of the servomotor 62 is set as the speed transmission ratio Tr, a target value of the control of the servomotor 62 (a control without changing the load L) can be easily obtained by multiplying the target value of the drive control of the servomotor 21 by the speed transmission ratio Tr, and thus the calculation of the target value of the drive control of the servomotor 62 can be simplified.

When the specimen W is not a VGR and has a fixed gear ratio (S609: NO), the speed transmission ratio Tr is stored (S611), and the speed transmission ratio detection process S6 ends.

Then, the process proceeds to the main test of the durability test (S7 to S9. See FIG. 19.). In the main test, first, it is confirmed whether the end-abutment control S9, which will be described later, is enabled (ON) (S7). The end-abutment control S9 is a control for preventing the torque T exceeding an allowable value from being applied to the steering shaft W1 by mitigating an impact generated when the steering shaft W1 reaches the end-abutment position. When performing the test by the conventional method in which the torque T is mechanically limited by using a torque limiter or the like, the end-abutment control is disabled (OFF). It is noted that since, in the conventional method in which the torque T is mechanically limited, accurate torque control cannot be performed and, in case of a durability test over a long period of time, mechanical parts such as a torque limiter nay break down or characteristics thereof may change due to deterioration during the test, the end-abutment control is usually enabled (ON). When the end-abutment control is enabled (ON) (S7: YES), the end-abutment control S9 is executed next, and when the end-abutment control is disabled (OFF) (S7: NO), a basic drive control S8 is executed next.

(Basic Drive Control)

Figure 23:
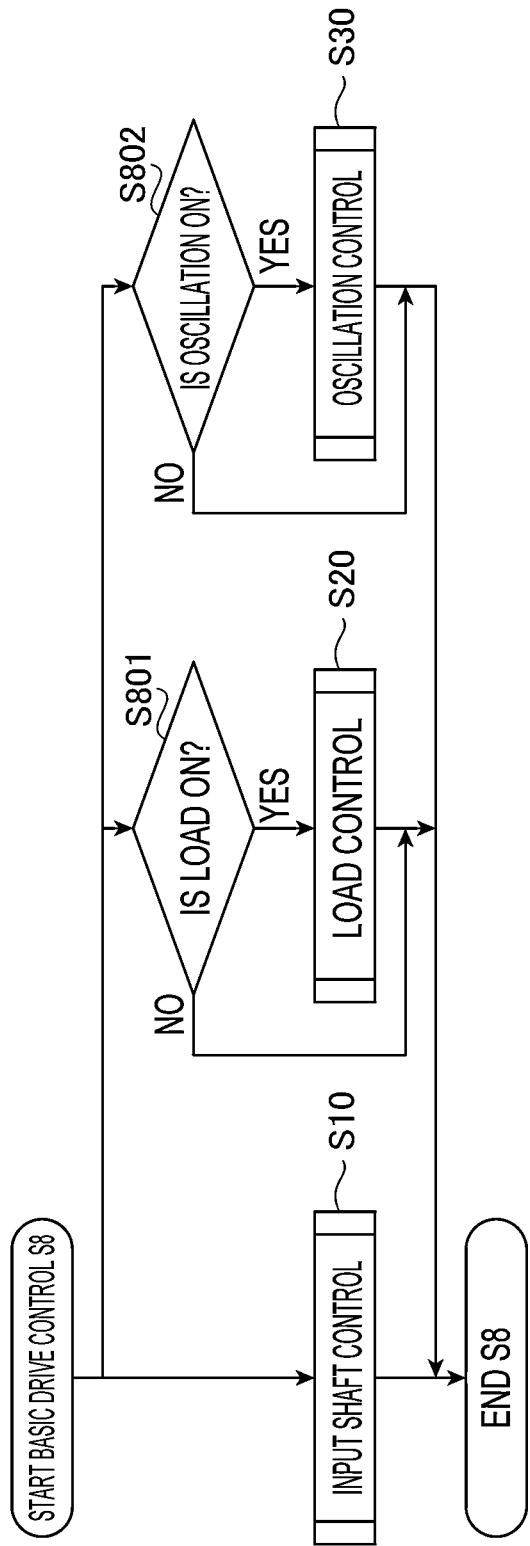
FIG. 23 is a flowchart showing a procedure of a basic drive control.

FIG. 23 is a flowchart showing a procedure of the basic drive control S8. In the basic drive control S8, three controls (the input shaft control S10, the load control S20 and the oscillation control S30) are executed in parallel. The input shaft control S10 is a drive control of rotational motion of an input end (steering shaft W1) of the specimen W by the input side drive part 20, and the load control S20 and the oscillation control S30 are drive controls of linear motion of output ends (the tie rods W4) of the specimen W by the output side drive parts 60 (60L, and 60R).

It is noted that, in the present embodiment, the load control S20 and the oscillation control S30 are controls that are arbitrarily and additionally executed (i.e., the load control S20 is executed when the load control S20 is enabled (ON) (S801: YES), and the oscillation control S30 is executed when the oscillation control S30 is enabled (ON) (S802: YES)). The load control S20 is a control for applying an axial force (the load L) to the tie rod W4, and the oscillation control S30 is a control for applying vibration in a vertical direction (a direction perpendicular to the shaft of the tie rod W4 arranged substantially horizontally) to the tie rod end W41. The oscillation control S30 is a control that simulates a vertical movement of the axle caused by the behavior of the suspension when a vehicle actually travels. The load control S20 and the oscillation control S30 are performed for the left and right output side drive parts 60L and 60R, respectively. It is noted that, when the load control S20 and the oscillation control S30 is set to OFF, the test is performed in a state in which the output side drive part 60 is removed from the specimen W. Further, by performing the load control S20 while setting to no load (load=0), it becomes possible to perform the test without applying the load L to the tie rods W4 in a state in which the output side drive part 60 is connected to the specimen W.

(Input Shaft Control [Position Control])

Figure 24:
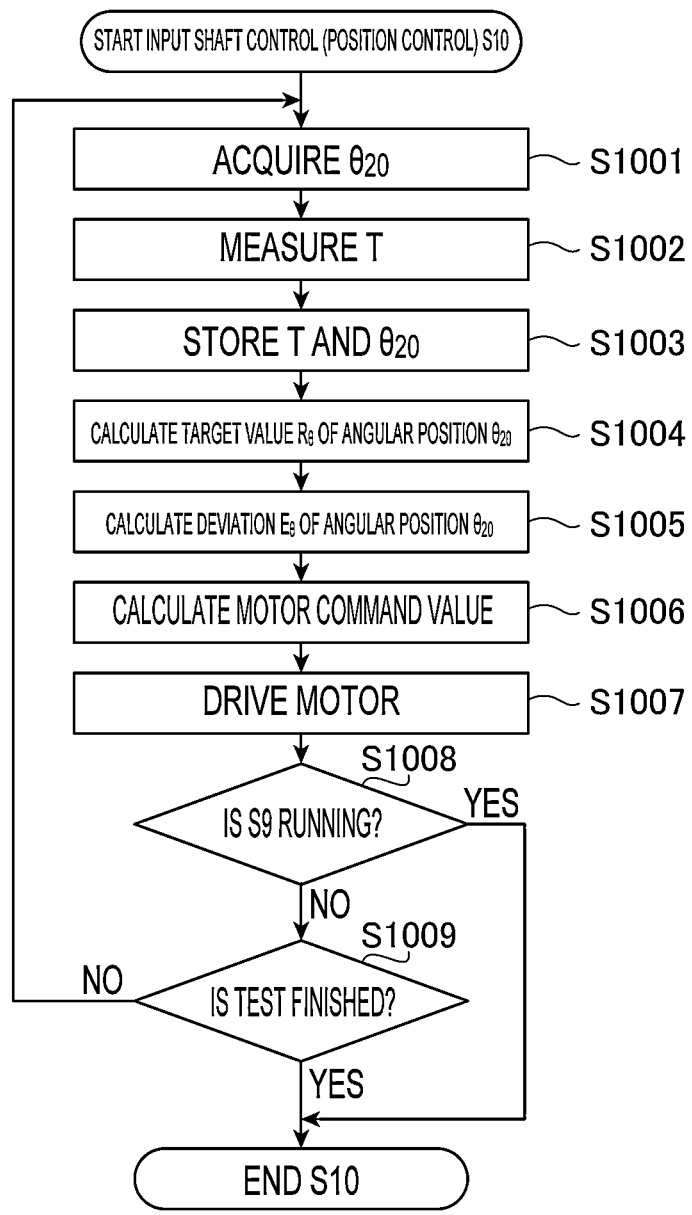
FIG. 24 is a flowchart showing a procedure of an input axis control (position control).

FIG. 24 is a flowchart showing a procedure of the input shaft control S10. As described above, the input shaft control S10 is a control for rotationally driving the steering shaft W1, which is the input shaft of the specimen W, with the input side drive part 20. In the input shaft control S10, a position control in which the angular position $\theta_{20}$ of the steering shaft W1 of the specimen W connected to the input side drive part 20 is used as a controlled variable is performed. In the input shaft control S10, first, current angular position $\theta_{20}$ of the steering shaft W1 is acquired (S1001), the torque T of the steering shaft W1 is measured by the torque sensor 23 (S1002), and the acquired torque T and angular position $\theta_{20}$ are stored (S1003).

Next, a target value $R_0$ and a deviation $E_\theta$ of the angular position $\theta_{20}$ of the steering shaft W1 are calculated based on the setting of the test condition (S1004, S1005). Then, a command value (i.e., an operation amount) of the servomotor 21 is calculated from the deviation $E_\theta$ and the speed reduction ratio $r_{22}$ of the speed reducer 22 (S1006). It is noted that, in the input shaft control S10, the driving of the servomotor 21 is controlled by a position control in which the angular position $\Theta_{21}$ of the shaft is used as the controlled variable. In the process S1006, a command value (an angular position $\Theta_{20}$) of the servomotor 21 is calculated so that the deviation $E_\theta$ of the angular position $\theta_{20}$ of the steering shaft W1 is eliminated. More specifically, for example, the target value $R_0$ of the angular position $\theta_{20}$ of the input side drive part 20 is corrected to reduce the deviation $E_0$, and the angular position $\Theta_{21}$ of the shaft of the servomotor 21 corresponding to the corrected target value $R_0$ of the angular position $\Theta_{20}$ of the steering shaft W1 becomes the command value for the servomotor 21. Then, the servomotor 21 is driven based on this command value (S1007), whereby a single input shaft control (the input shaft control for one control point) (S1001 to S1007) ends. The input shaft control (S1001 to S1007) is repeatedly performed until the test ends (S1009).

It is noted that the input shaft control S10 is also executed in the end-abutment control S9 which will be described later. However, in the end-abutment control S9 (S1008: YES), the processes S1001 to S1007 are not repeated, and upon driving the servomotor 21 (S1007), the input shaft control S10 ends.

In the input shaft control S10 described above, the driving of the servomotor 21 is controlled by the position control in which the angular position $\Theta_{21}$ of the shaft is used as a controlled variable. However, the driving of the servomotor 21 may be controlled by a velocity control in which the angular velocity $\Omega_{21}$ is used as a controlled variable.

(Load Control)

Figure 25:
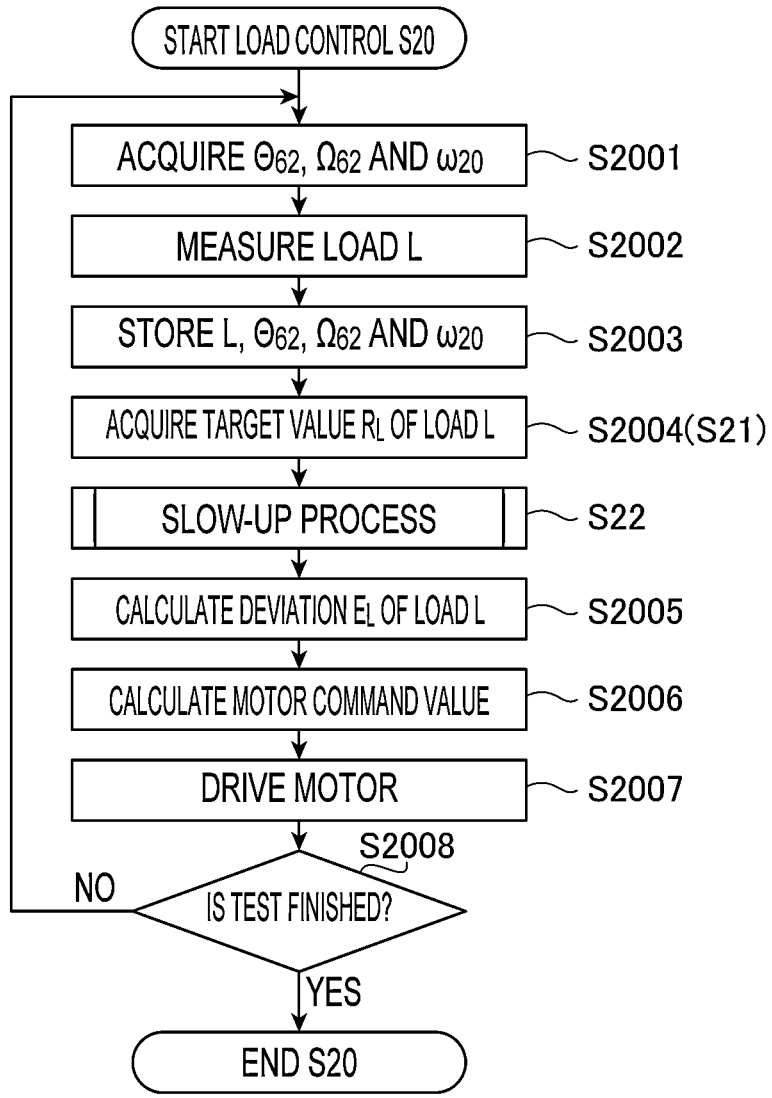
FIG. 25 is a flowchart showing a procedure of a load control.

FIG. 25 is a flowchart showing a procedure of the load control S20. In the load control S20, first, current angular position $\Theta_{62}$ and angular velocity $\Omega_{62}$ of the servomotor 62 of the output side drive part 60 and current angular velocity $\omega_{20}$ of the input side drive part 20 are acquired (S2001), the load L of the tie rod W4 is measured by the force sensor 662 (S2002), and the acquired values of the load L, angular position $\Theta_{62}$, and angular velocities $\Omega_{62}$ and $\omega_{20}$ are stored (S2003).

Next, a target value (an initial setting value) $R_L$ of the load L of the tie rod W4 is acquired (S2004), and the slow-up process S22 is performed.

Figure 26:
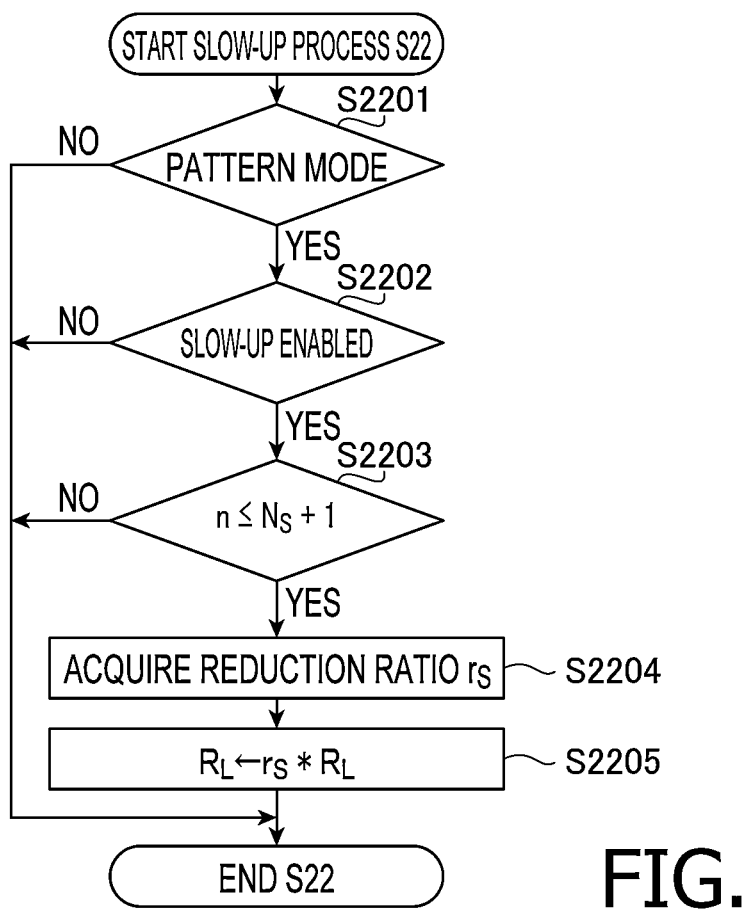
FIG. 26 is a flowchart showing a procedure of a slow-up process.

FIG. 26 is a flowchart showing a procedure of the slow-up process S22. The slow-up process S22 is a process for not applying 100% of the initial setting value of the load L to the specimen W immediately after the start of the load control S20 but for gradually increasing the load L at the initial stage of the load control S20 to approach the initial setting value. Specifically, in the slow-up process S22, a process of multiplying the target value $R_L$ of the load L by a coefficient (a load factor $r_S$) corresponding to the execution number n of the control cycle is performed in the initial preset number of control cycles of the load control S20.

Figure 27:
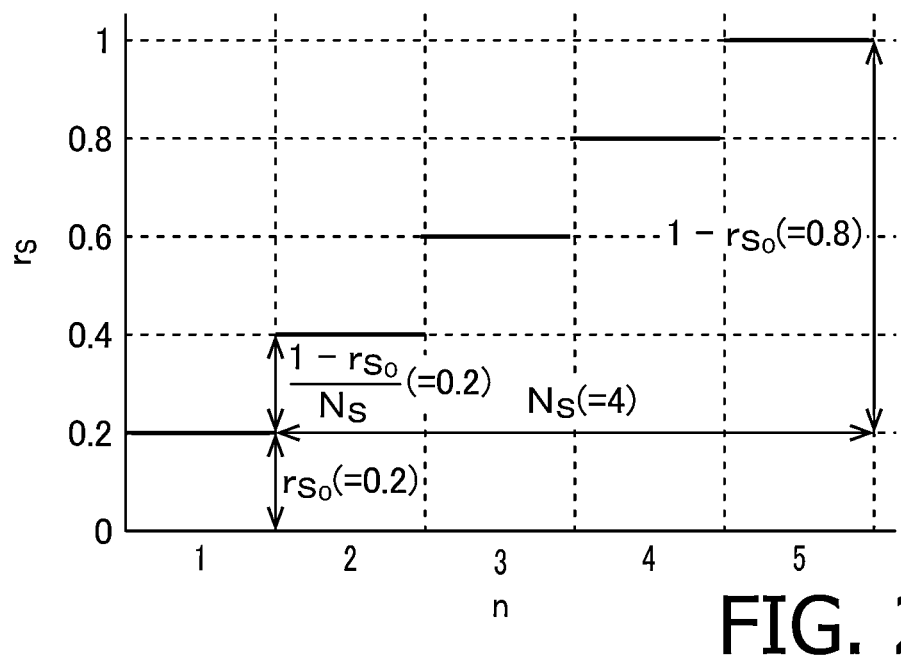
FIG. 27 is a graph showing an example of a change in a load factor due to the slow-up process.

FIG. 27 is a graph illustrating an example of a change in the load factor $r_S$ by the slow-up process S22. This graph is obtained when the initial load factor $r_{S0}$ is set to 0.2 (20%) and the slow-up count $N_S$ is set to 4.

In the slow-up process S22, first, it is determined whether the set control of the load L is the pattern mode (S2201) and whether the slow-up process S22 is enabled (S2202). In the present embodiment, since the slow-up process S22 is applied only to the pattern mode, in a case where the control of the load L is other than the pattern mode (S2201: NO), the slow-up process S22 ends without performing any substantial process (processes S2204 to S2205 which will be described later). Also, when the slow-up process S22 is disabled (S2202: NO), the slow-up process S22 ends without performing any substantial process.

Next, it is determined whether the execution number n of the target control cycle (nth control cycle) is equal to or less than the slow-up count $N_S+1$ (S2203). It is noted that the slow-up count $N_S$ is a value set by the slow-up count setting part E363 (FIG. 11). Since the slow-up process S22 is applied only to the first control cycle to the $(N_S+1)$th control cycle, when the execution number n of the control cycle is larger than $N_S+1$ (N2203: NO), the slow-up process S22 ends without performing any substantial process (S2204 to S2205 which will be described later).

Next, the load factor $r_S$ is calculated by the following equation (3) (S2204).

$$r_S = r_{S_0} + (n-1) \cdot \left( \frac{1 - r_{S_0}}{N_S} \right) \quad (3)$$

Where:
- $r_S$ is a load factor,
- $r_{S0}$ is an initial load factor.
- n is an execution number of a control cycle, and
- $N_S$ is a slow-up count.

It is noted that $r_S$ and $r_{S0}$ are positive decimal of less than 1, and n and $N_S$ are positive integers.

Then, the target value $R_L$ of the load L is multiplied by the load factor $r_S$ (S2205), and the slow-up process S22 ends.

By performing the slow-up process S22 described above, it becomes possible to gradually increase the load L applied to the specimen W at the initial stage of the load control S20. Therefore, for example, in a case where the specimen W is not correctly attached to the test device 1, it is possible to perform an operation of stopping the test device 1 before a large load is erroneously applied to the specimen W, and thus it is possible to prevent the specimen W from being damaged.

It is noted that, in the present embodiment, the slow-up process S22 is applied only to the pattern mode, but the slow-up process can also be applied to other control modes. For example, by setting in advance a slow-up period $T_{SU}$ (second) for performing the slow-up process S22 in addition to the initial load factor $r_{S0}$ and the slow-up count $N_S$ and calculating the load factor $r_S$ with respect to the elapsed time t from the start of the load control S20 in place of the execution number n of the control cycle, it becomes possible to apply the slow-up process to other control modes. In this case, for example, the load factor $r_S$ during the slow-up period $T_{SU}$ can be calculated by the following equation (4).

$$r_S = r_{S_0} + (1 - r_{S_0}) \cdot \frac{t}{T_{SU}} \quad (4)$$

Where:
- $T_{SU}$ is a slow-up period (second), and
- t is an elapsed time from the start of the load control S20 (second).

Next, a deviation $E_L$ (=$R_L-Y_L$) of the load L is calculated from the target value $R_L$ and a measured value $Y_L$ of the load L (S2005). The storage 824 or the like stores data representing a relationship between a driving amount of the servomotor 62 and a change amount of the load L (for example, a numerical value representing the change amount of the load L per unit rotation angle of the servomotor 62 or per unit angular velocity by a single drive control (the drive control for one control point)) obtained in advance experimentally or by simulation. The command value of the servomotor 62 is calculated from this data and the deviation $E_L$ of the load L (S2006).

It is noted that, in the present embodiment, in the load control S20, the driving of the servomotor 62 is controlled by a velocity control in which an angular velocity $\Omega_{62}$ is used as a controlled variable. In the load control S20, a command value $U_\Omega$ (the angular velocity $\Omega_{62}$) of the servomotor 62 is calculated by the following equation (5) so that the deviation $E_L$ of the load L is eliminated by, for example, a single driving (the driving for one control point) or a predetermined plurality of times of driving.

$$\begin{aligned} U_\Omega &= R_\Omega + E'_\Omega \\ &= T_r \cdot \omega_{20} / r_{63} + K_{L-\Omega} \cdot E_L \\ &= T_r \cdot \omega_{20} / r_{63} + K_{L-\Omega} \cdot (R_L - Y_L) \end{aligned} \quad (5)$$

Where:
- $U_\Omega$ is the command value $U_\Omega$ (angular velocity $\Omega_{62}$) of the servomotor 62,
- $R_\Omega$ is a target value of the angular velocity $\Omega_{62}$.
- $E_\Omega'$ is a correction value of the angular velocity $\Omega_{62}$ (corresponding to a deviation $E_\Omega$ of the angular velocity $\Omega_{62}$),
- $T_r$ is a speed transmission ratio,
- $\omega_{20}$ is an angular velocity of the input side drive part 20,
- $r_{63}$ is a speed reduction ratio of the speed reducer 63,
- $K_{L-\Omega}$ is a gain (load L-angular velocity $\Omega$ conversion coefficient),
- $E_L$ is a deviation of the load L,
- $R_L$ is a target value of the load L, and
- $Y_L$ is a measured value of the load L.

It is noted that the first term of Equation (5) above is a target value $R_\Omega$ of the angular velocity $\Omega_{62}$ of the servomotor 62, and a converted value ($T_r \cdot \omega_{20}/r_{63}$) of the angular velocity $\Omega_{62}$ of the servomotor 62 of the output side drive part 60 corresponding to the angular velocity $\omega_{20}$ of the input side drive part 20 is used as the target value $R_\Omega$. The second term is a correction value $E_\Omega'$ of the angular velocity $\Omega_{62}$. The correction value $E_\Omega'$ is a value corresponding to the deviation $E_\Omega$ of the angular velocity $\Omega_{62}$, and is calculated by multiplying the deviation $E_L$ of the load L by the gain $K_{L-\Omega}$.

The gain $K_{L-\Omega}$ (load L-angular velocity $\Omega$ conversion coefficient) is a coefficient for converting the load L into the angular velocity $\Omega_{62}$ of the servomotor 62. More specifically, the gain $K_{L-\Omega}$ is defined as the angular velocity $\Omega_{62}$ that changes the load L by one unit (for example, 1N) by a single drive control (the drive control for one control point). The gain $K_{L-\Omega}$ is obtained in advance experimentally or by simulation.

Then, the servomotor 62 is driven based on the command value Un calculated by the Equation (5) above (S2007), and a single load control (the load control for one control point) (S2001 to S2007) ends. The load control (S2001 to S2007) is repeatedly executed until the test ends (S2008).

It is noted that, in the above-described load control S20, the driving of the servomotor 62 is controlled by the velocity control in which the angular velocity $\Omega_{62}$ of the shaft is used as a controlled variable, but the driving may be controlled by a position control in which the angular position $\Theta_{62}$ is used as a controlled variable. Further, the driving of the servomotor 62 may be controlled by a torque control in which a shaft torque corresponding to the load L is used as a controlled variable. Further, instead of the servomotor 62, for example, a motor that does not include a gear mechanism such as a direct drive motor or a linear motor may be used. The elimination of the gear mechanism enables a faster and more stable control.

Next, a load control Sa20, which is a modification of the above-described load control S20, will be described. The load control Sa20 described below is a control of which control accuracy is improved by, in the frequency mode or the pattern mode in which the load L of the same waveform is repeatedly applied, determining the target value based on an actual value ("learning data LD" which will be described later) of the controlled variable of the servomotor 62 at the same phase (control point) of the basic waveform (or the waveform pattern). It is noted that the actual value of the controlled variable is a measured value of the controlled variable at a phase (or a phase range) corresponding to a control point being a control target (a target control point), an average of the measured values (for example, an arithmetic average, a weighted average, a geometric average, a harmonic average, or the like), or a value equivalent to the average. In this specification, for example, in the loud control, a control method in which the actual value of the controlled variable of the servomotor is used in place of the target value of the controlled variable of the servomotor 62 (e.g., the angular position $\Theta_{62}$ or the angular velocity $\Omega_{62}$) calculated from the target value of the load L as described above is referred to as a learning control (learning function). It is noted that, in the frequency mode and the pattern mode, a drive control according to one basic waveform or waveform pattern is performed by a control cycle consisting of a plurality of control points, and this control cycle is repeatedly executed.

Figure 28:
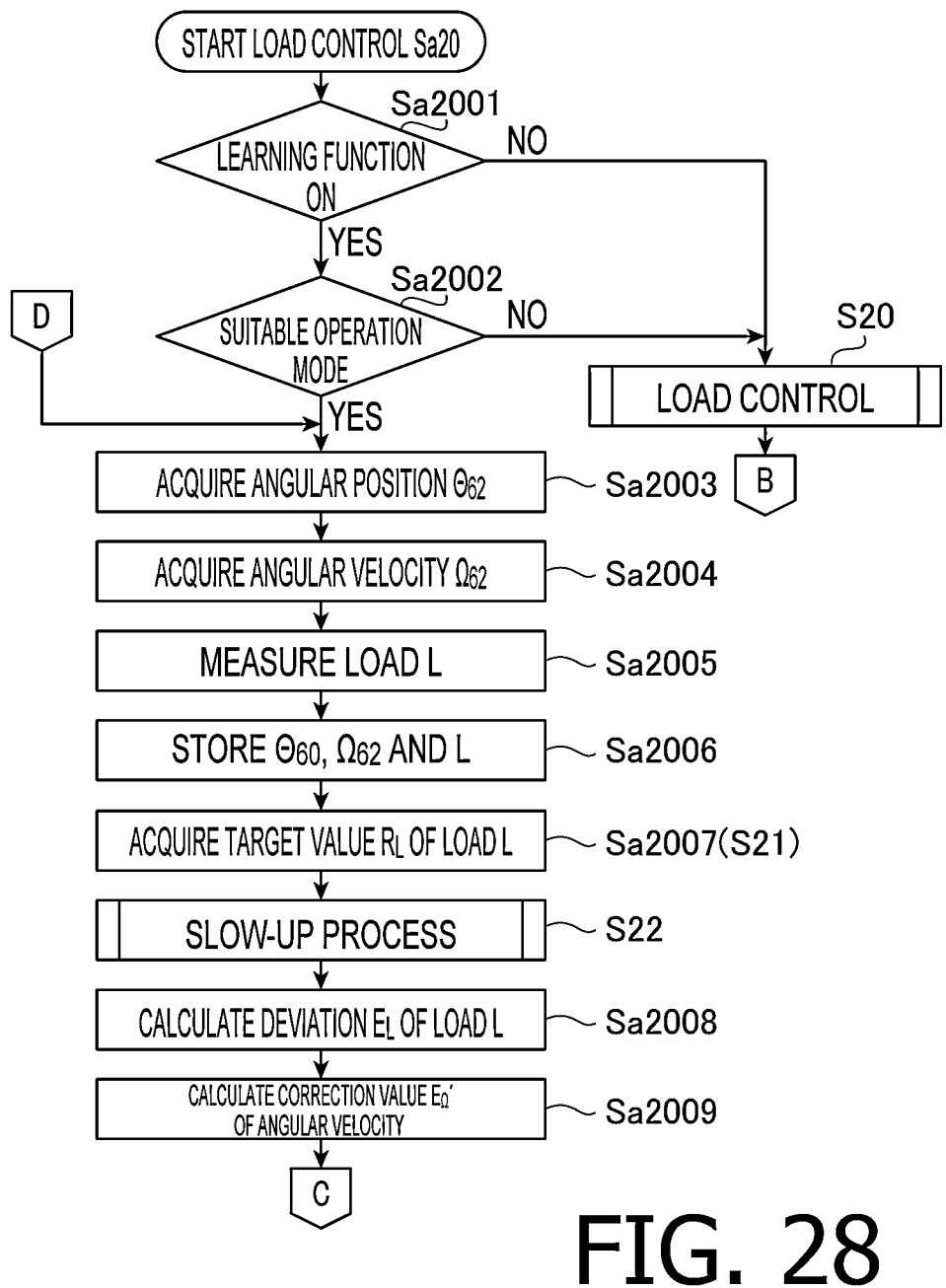
FIG. 28 is a flowchart showing a procedure of a modification of the load control.
Figure 29:
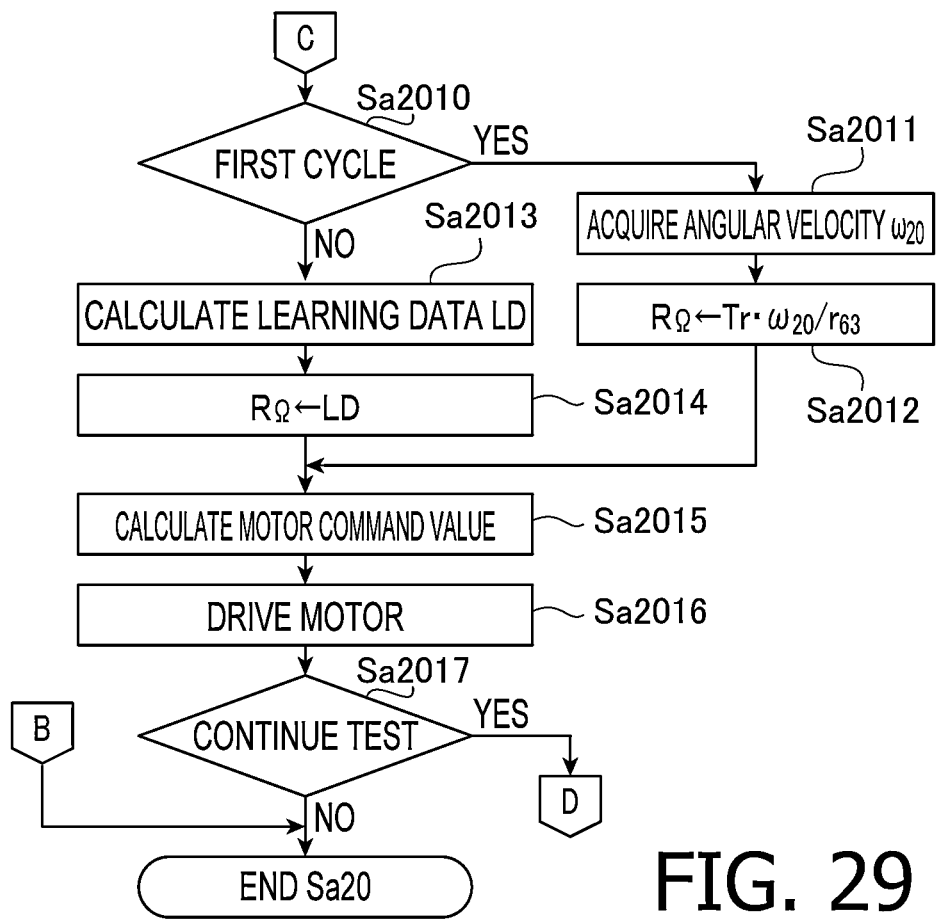
FIG. 29 is a flowchart showing a procedure of a modification of the load control.

FIGS. 28 to 29 are flowcharts showing a procedure of the of load control Sa20. In the load control Sa20, first, it is confirmed whether the learning control is enabled (Sa2001). If the learning control is disabled (Sa2001: NO), the above-described load control S20 is executed. If the learning control is enabled (Sa2001: YES), it is then determined whether the set operation mode is suitable for the learning control (specifically, whether the operation mode is the frequency mode or the pattern mode) (Sa2002). If the operation mode is not suitable for the learning control (Sa2002: NO), the above-described load control S20 is executed. If the operation mode is suitable for the learning control (Sa2002: YES), the measured values of the angular position $\Theta_{62}$, the angular velocity $\Omega_{62}$ and the load L of the servomotor 62 of the output side drive part 60 are acquired and stored (Sa2003 to 2006). Next, a target value (initial setting value) $R_L$ of the load L is acquired (Sa2007).

Next, the above-described slow-up process S22 (FIG. 26) is performed, and if the operation mode is suitable for the slow-up process S22 and the slow-up process S22 is enabled, the target value $R_L$ of the load L Is reduced for early predetermined number of control cycles. Then, the deviation $E_L$ (=$R_L$−$Y_L$) of the load L is calculated from the target value $R_L$ and the measured value $Y_L$ of the load L (Sa2008).

Next, the correction value $E_\Omega'$ of the controlled variable of the servomotor 62 (for example, the angular velocity $\Omega_{62}$) is calculated from the deviation $E_L$ of the load L, by the following Equation (6) (Sa2009). It is noted that the correction value $E_\Omega'$ is a value equivalent to the deviation $E_\Omega$ of the angular velocity $\Omega_{62}$, which is the controlled variable of the servomotor 62, and is calculated by multiplying the deviation $E_L$ of the load L by the gain $K_{L\text{-}\Omega}$.

$$E_\Omega' = K_{L\text{-}\Omega} \cdot E_L = K_{L\text{-}\Omega} \cdot (R_L - Y_L) \quad (6)$$

Where:

$E_\Omega'$ is a correction value of the angular velocity $\Omega_{62}$ (corresponding to a deviation $E_\Omega$ of the angular velocity $\Omega_{62}$), $K_{L\text{-}\Omega}$ is a gain (load L-angular velocity $\Omega$ conversion coefficient), $E_L$ is a deviation of the load L, $R_L$ is a target value of the load L, and $Y_L$ is a measured value of the load L.

Next, in case of the first control cycle (Sa2010: YES), the angular velocity $\omega_{20}$ of the input side drive part 20 is acquired (Sa2011) and, similarly to the above-described load control S20, the converted value ($T_r \cdot \omega_{20}/r_{63}$) of the angular velocity $\Omega_{62}$ of the servomotor 62 calculated from the angular velocity $\omega_{20}$ of the input side drive part 20 is used as the target value $R_\Omega$ of the controlled variable of the servomotor 62 (Sa2012).

In case of the second or subsequent control cycle (Sa2010: NO), the learning data LD is calculated first (Sa2013). The learning data LD of the present embodiment is an actual value of the controlled variable $Y_\Omega$ calculated from a control result of the servomotor 62 (a measurement value of the angular velocity $\Omega_{62}$ which is a controlled variable) in the past (for example, the latest one to several cycles), and is used in place of the target value $R_\Omega$ of the angular velocity $\Omega_{62}$ calculated from the target value $R_L$ of the load L. By using the actual value of the controlled variable as the target value, deviation decreases and thus accuracy of the control improves.

Learning data LD(n, m) corresponding to the mth control point in the nth control cycle (i.e., the target control point being the control point of the control target at that time) is calculated by the following equation (7).

$$LD(n, m) = \frac{1}{p(2q+1)} \sum_{i=n-p}^{n-1} \sum_{j=m-q}^{m+q} Y_\Omega(i, j) \quad (7)$$

Where:

LD(n, m) is learning data (nth control cycle, mth control point).

n and m are positive integer.

$Y_\Omega(i, j)$ is a controlled variable of the angular velocity $\Omega_{62}$ (ith control cycle, jth control point), p is a positive integer smaller than n (a constant representing a range of control cycles to be averaged), and q is a positive integer smaller than m (a constant representing a range of control points to be averaged).

That is, the learning data LD(n, m) is an average of the controlled variables $Y_\Omega(i, j)$ of the control points in the vicinity of the mth control point (2q+1 control points in the range from the (m−q)th point to the (m+q)th point, referred to as a "neighboring control point") in a plurality of most recent control cycles (p control cycles from the (n−p)th control cycle to the (n−1)th control cycle). It is noted that the constant p is a parameter that sets the range of control cycles to be averaged, and the constant q is a parameter that sets the range of control points to be averaged.

As described above, in the load control Sa20, by using the learning data LD(n, m) obtained by averaging the controlled variables $Y_\Omega(i, j)$ of a plurality of control cycles, it is possible to perform control with less influence of disturbance. Further, by using the learning data LD(n, m) obtained by averaging the controlled variables $Y_\Omega(i, j)$ of a plurality of control points, it is possible to perform control with less influence of disturbance.

Then, the learning data LD is set to the target value $R_\Omega$ of the angular velocity $\Omega_{62}$ of the servomotor 62 (Sa2014).

Next, the command value $U_\Omega$ of the servomotor 62 is calculated by the following equation (8) (Sa2015). It is noted that, in case of the first control cycle, Equation (8) becomes the same as Equation (5) described above.

$$U_\Omega = R_\Omega + E_\Omega' \tag{8}$$

Then, the servomotor 62 is driven based on the command value $U_\Omega$ (Sa2016), and a single load control (the load control for one control point) (Sa2003 to Sa2016) ends. The load control (Sa2003 to Sa2016) is repeatedly executed (Sa2017) until the test ends.

In the load control Sa20, the learning data LD(n, m) is the average of the controlled variables $Y_\Omega(i, j)$ for both the control cycle i and the control point j. However, the learning data LD(n, m) may be calculated without taking an average for at least one of the control cycle i and the control point j. For example, the value of the controlled variable $Y_\Omega(n-1, m)$ of the same (or corresponding) control point in the previous control cycle may be used as it is as the learning data LD(n, m) without taking an average for both the control cycle i and the control point j.

It is noted that, in the above equation (7), the controlled variable $Y_\Omega(i, j)$ from the (n–p)th control cycle to the (n–1)th control cycle is used for the entire range of the control points to be averaged (the entire range from the (m–q)th control point to the (m+q)th control point), but the learning data LD(n, m) may be calculated using the controlled variable $Y_\Omega(i, j)$ from the (n–p+1)th control cycle to the nth control cycle for the (m–q)th control point to the (m–1)th control point for which the controlled variable $Y_\Omega(n, j)$ of the nth control cycle has already been acquired.

In the above equation (7), the learning data LD(n, m) for the target control point (mth control point), which is the control target at that time, is calculated using the measured values of the controlled variable $Y_\Omega(i, j)$ within the range of the control points centered on the mth control point. That is, the learning data LD–(n, m) is calculated from the measured values of the controlled variable $Y_\Omega(i, j)$ having the same phase as the target control point. However, if there is a phase delay in the response, as shown in the following equation (9), by giving a phase difference (a phase adjustment amount r) to a range of phase points used in the calculation of the learning data LD(n, m) to cancel the phase delay, more stable control becomes possible. It is noted that, in this case, the (m–r)th control point whose phase is shifted from the target control point (mth control point) by the phase adjustment amount r is a corresponding control point corresponding to the target control point.

$$LD(n, m) = \frac{1}{p(2q+1)} \sum_{i=n-p}^{n-1} \sum_{j=m-q-r}^{m+q-r} Y_\Omega(i, j) \tag{9}$$

Where r is a positive integer representing a phase adjustment amount.

It is noted that, in the above-described load control Sa20, the driving of the servomotor 62 is controlled by the velocity control in which the angular velocity $\Omega_{62}$ of the shaft is used as a controlled variable. However, the driving of the servomotor 62 may be controlled by a position control in which the angular position $\Theta_{62}$ is used as a controlled variable. The driving of the servomotor 62 may also be controlled by a torque control in which the shaft torque is used as a command value (controlled variable). Since the shaft torque of the servomotor 62 is proportional to the load L, the load L, is substantially the controlled variable of the servomotor 62 in the torque control. Further, in place of the servomotor 62, for example, a motor that does not include a gear mechanism such as a direct drive motor or a linear motor may be used. The elimination of the gear mechanism enables control with faster and more stable response.

It is noted that, in the present embodiment, the target value (the learning data LD) of the controlled variable is determined based on the actual value of the controlled variable of the servomotor 62 (e.g., the angular position $\Theta_{62}$ or the angular velocity $\Omega_{62}$) as described above, but embodiments of the present disclosure are not limited to this configuration. For example, the target value of the controlled variable (e.g., the angular position or the angular velocity of the motor) may be determined based on the actual value of the operation amount of the motor (e.g., drive current supplied to the motor) (e.g., an average of controlled variables Y of adjacent control points in the last several control cycles may be used as the target value).

(Spring Load Control)

As described above, the load controls S20 and Sa20 are adapted to various control modes such as the constant load mode, the frequency mode, the pattern mode, the steering angle response mode, and the external signal mode. These control modes are determined in accordance with the target value $R_L$ acquired in the process S2004 (FIG. 25) or the process Sa2007 (FIG. 28).

Next, a spring load control which is one mode of the steering angle response mode in which the load L corresponding to the angular position $\theta_{20}$ of the steering shaft W1 is applied, will be described. The spring load control is a control for applying the load L that elastically changes (monotonically increases or decreases) in accordance with the angular position $\theta_{20}$ of the steering shaft W1. By the spring load control, it becomes possible to apply, to the specimen W, the load L that is close to a load that acts on a steering device when the steering device is installed in an actual vehicle, and it becomes possible to reproduce the state of being actually installed in the vehicle more accurately. It is noted that the spring load control is one aspect of the process S2004 in the load control S20 or the process Sa2007 in the load control Sa20.

Example 1

Figure 30:
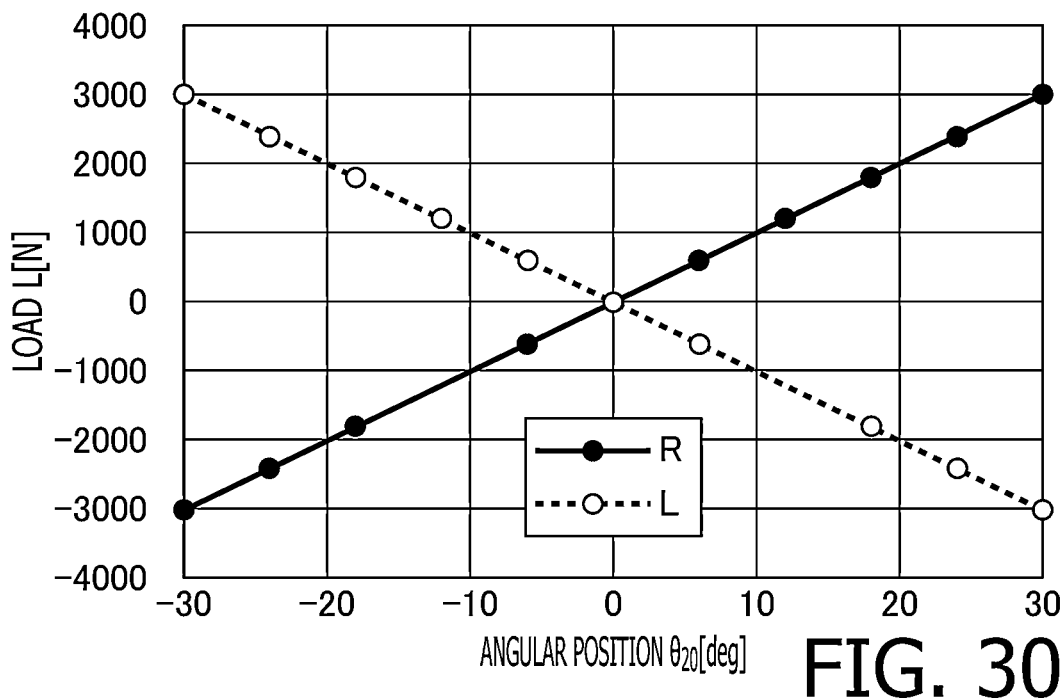
FIG. 30 is a graph showing a relationship between an angular position of a steering shaft and a load in Example 1 of a spring load control.

FIG. 30 is a graph showing a relationship between the angular position $\theta_{20}$ of the steering shaft W1 and the target value $R_L$ of the load L used in the spring load control of Example 1. In FIG. 30, a solid line (R) indicates the load L applied to the right tie rod W4, and a broken line (L) indicates the load L, applied to the left tie rod W4. As shown in FIG. 30, in the spring load control of Example 1, the loads L that change linearly (elastically) with respect to the angular position $\theta_{20}$ of the steering shaft W1 are applied to the tie rods W4 of the specimen W. The spring load control of Example 1 is a control to which dynamics of the loads L in an actual vehicle in which large drags (loads L) act on the tie rods W4 as the steering angle increases (the loads L monotonically increase in accordance with the steering angle) is reflected.

The information indicating the relationship between the angular position $\theta_{20}$ and the target value $R_L$ of the load L shown in FIG. 30 is stored in the storage 824 or the like in the form of, for example, a numerical value table or a function. In the process S2004 or Sa2007, the information indicating the relationship between the angular position $\theta_{20}$ and the target value $R_L$ of the load L stored in the control part 82 is read, and the target value $R_L$ of the load L corresponding to the angular position $\theta_{20}$ at that time is acquired based on this relationship. The spring load control of Example 1 is realized by driving the servomotor 62 by the command value $U_\Omega$ calculated based on the target value $R_L$ using, for example, Equation (5).

In the spring load control, the load L is controlled based on the input (rotation of the steering shaft W1) rather than the output (movement of the tie rods W4) of the specimen W. Therefore, the control is performed without using the gear mechanism the specimen W has, thereby delay of the response due to the play of the gear mechanism of the specimen W is prevented, and thus the control with higher accuracy becomes possible. In addition, since the control is performed without using the control mechanism of the specimen W, interference with a control by an ECU of the specimen W is avoided, and thus more stable control becomes possible.

In the spring load control of Example 1 described above, since the angular position $\theta_{20}$ of the steering shaft W1 and the target values $R_L$ of the left and right loads L correspond to each other on a one to-one basis, the same load L is applied to the angular position $\theta_{20}$ of the steering shaft W1 regardless of the rotation direction of the steering shaft W1. However, the load L that acts on the tie rod W4 in an actual vehicle has a hysteresis property in which the load L varies depending on the rotational direction of the steering shaft W1. Since the load L acts as a resistance to the rotation of the steering shaft W1, the direction of the load L also differs depending on the direction in which the steering shaft W1 is rotated.

Example 2

Example 2 of the spring load control (spring load control S21) described below is a control that makes it possible to more accurately reproduce a load that acts on the specimen W when the specimen W is installed in an actual vehicle by applying the load L having hysteresis like the actual vehicle.

Figure 31:
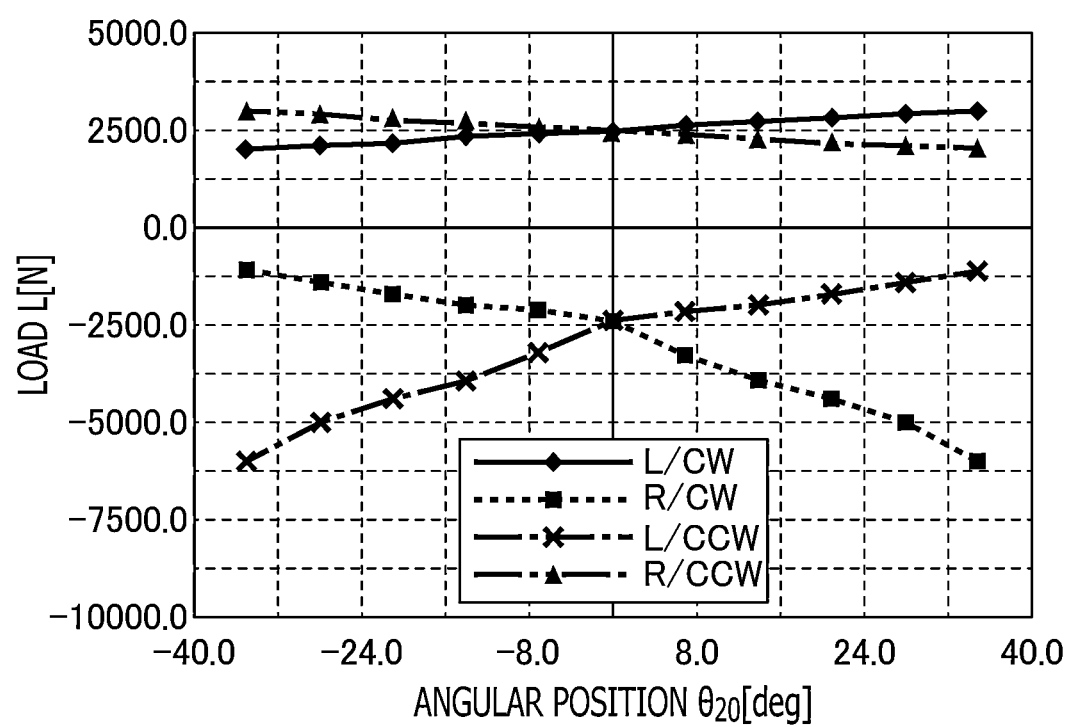
FIG. 31 is a graph showing a relationship between the angular position of the steering shaft and the load in Example 2 of the spring load control.

FIG. 31 is a graph showing a relationship between the angular position $\theta_{20}$ of the steering shaft W1 and the target value $R_L$ of the load L in Example 2. The graph of FIG. 31 consists of the following four curves (R/CW, L/CW, R/CCW and L/CCW). Therefore, the target value $R_L$ of the load L is not uniquely determined only from the angular position $\theta_{20}$, and a process of determining which of the four curves should be applied is required.

(1) A load L (R/CW) to be applied to the right tie rod W4 when the steering shaft W1 is rotated clockwise.
(2) A load L (L/CW) to be applied to the left tie rod W4 when the steering shaft W1 is rotated clockwise.
(3) A load L (R/CCW) to be applied to the right tie rod W4 when the steering shaft W1 is rotated counterclockwise.
(4) A load L (L/CCW) to be applied to the left tie rod W4 when the steering shaft W1 is rotated counterclockwise.

Figure 32:
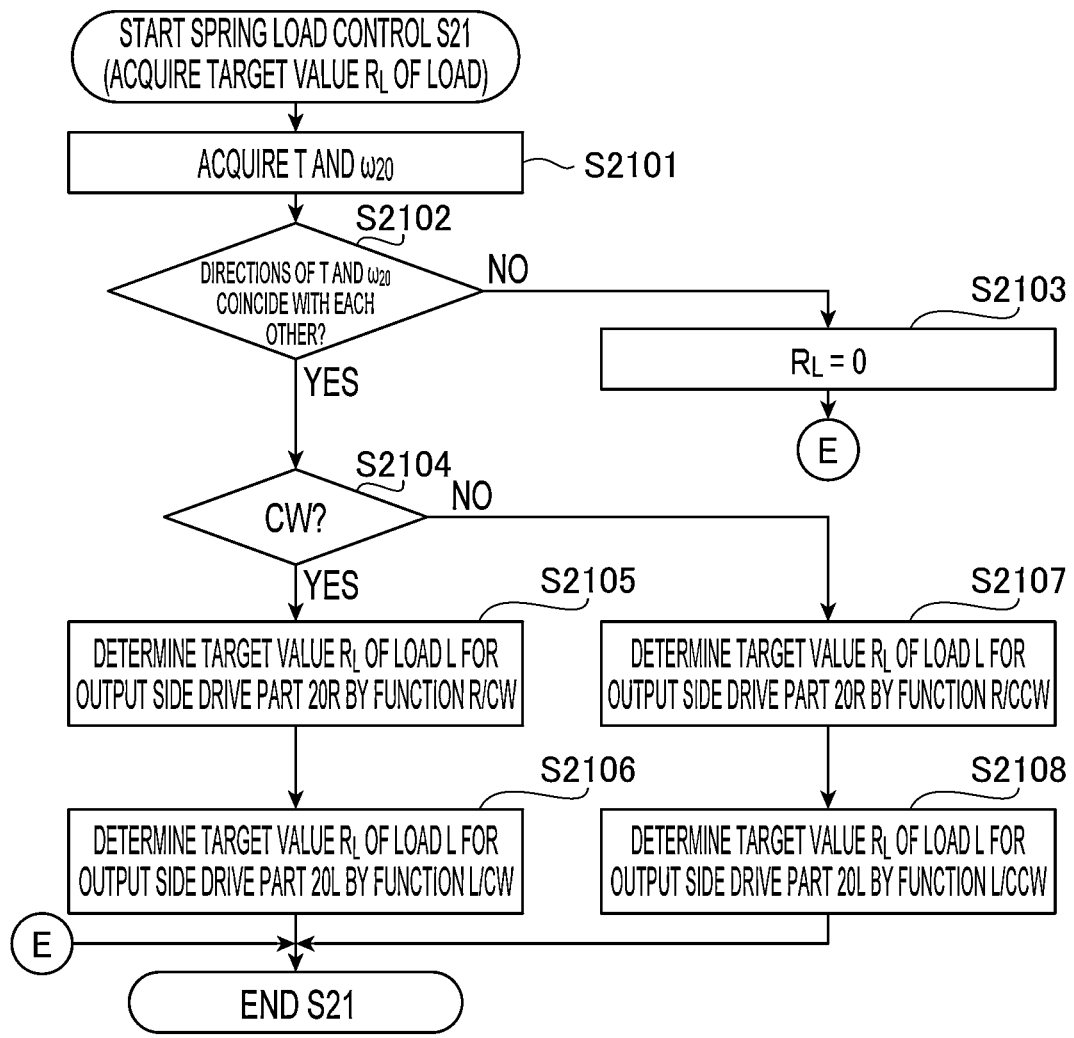
FIG. 32 is a flowchart showing a procedure of the spring load control.

FIG. 32 is a flowchart showing a procedure of the spring load control (a process for acquiring the target value $R_L$ of the load L) S21 of Example 2. The spring load control S21 is applied to the process S2004 in the load control S20 or the process Sa2007 in the load control Sa20.

In the spring load control S21, first, the torque T and the angular velocity $\omega_{20}$ of the steering shaft W1 of the specimen W are acquired (S2101). Next, directions of the torque T and the angular velocity $\omega_{20}$ are compared (S2102).

When the directions of the torque T and the angular velocity $\omega_{20}$ do not coincide with each other (S2102: NO), it is determined that a handle is in a state where a hand is released therefrom, and both of the loads L to be applied to the specimen W by the left and right output side drive parts 60L and 60R are set to no load (the target value $R_L$ of the load L=0) (S2103).

When the direction of the torque T coincides with the direction of the angular velocity $\omega_{20}$ (S2102: YES), the rotational direction of the steering shaft W1 is then determined (S2104). When the steering shaft W1 is rotating in the CW direction (S2104: YES), the target value $R_L$ of the load L for the right output side drive part 60R is determined by the function (or the numerical value table) R/CW (S2105), and the target value $R_L$ of the load L for the left output side drive part 60L is determined by the function (or the numerical value table) L/CW (S2106). When the steering shaft W1 is rotating in the CCW direction (S2104: NO), the target value $R_L$ of the load L for the right output side drive part 60R is determined by the function (or the numerical value table) R/CCW (S2107), and the target value $R_L$ of the load L for the left output side drive part 60L is determined by the function (or the numerical value table) L/CCW (S2108).

As shown in the graph of FIG. 31, in the spring load control S21 of Example 2, the load L acts in a direction against the movement of the tie rod W4 induced by the rotation of the steering shaft W1. It is noted that the sign of the load L is defined such that an outward direction (i.e., the rightward direction for the right tie rod W4 and the leftward direction for the left tie rod W4) is positive.

Further, when steering outward (R/CW, L/CCW), the change of the load L with respect to the angular position $\theta_{20}$ is large, and when steering inward (L/CW, R/CCW), the change of the load L with respect to the angular position $\theta_{20}$ is small.

As described above, since the spring load control S21 of Example 2 reflects the directionalities (hysteresis characteristics) of the loads that act on the tie rods W4 during running of an actual vehicle, it is possible to more accurately reproduce loads the tie rods W4 receive when incorporated in the actual vehicle.

It is noted that, in the spring load control S21, when the torque T (and/or the angular velocity $\omega_{20}$) is small, the determination results of S2102 and S2104 may change frequently, and the control may become unstable. Therefore, for example, when the torque T (and/or the angular velocity $\omega_{20}$) is smaller than a predetermined value, the left and right output side drive parts 60L and 60R may be set to the no-load state.

It is noted that, when performing the test in a state in which the specimen W adapted to an autonomous driving is operated in an autonomous driving mode, the input side drive part 20 is not used and the ECU of the specimen W is connected to the control part 82 through the interface part 86, and the control part 82 causes the ECU of the specimen W to control the steering. In this case, an input side measurement unit including a rotary encoder and a torque sensor is connected to the steering shaft W1 of the specimen W in place of the input side drive part 20. Then, the spring load control S21 is performed based on the torque T and the angular velocity $\omega_{20}$ of the steering shaft W1 measured by the input side measurement unit.

When the torque T cannot be detected, the spring load control S21 may be performed based only on the angular velocity taw of the steering shaft W1. In this case, the processes S2102 to S2103 are omitted.

When an angle signal indicating the angular position $\theta_{20}$ of the steering shaft W1 and a torque signal indicating the torque T can be extracted from the ECU of the specimen W, the spring load control S21 can also be performed based on these signals.

(Oscillation Control)

Figure 33:
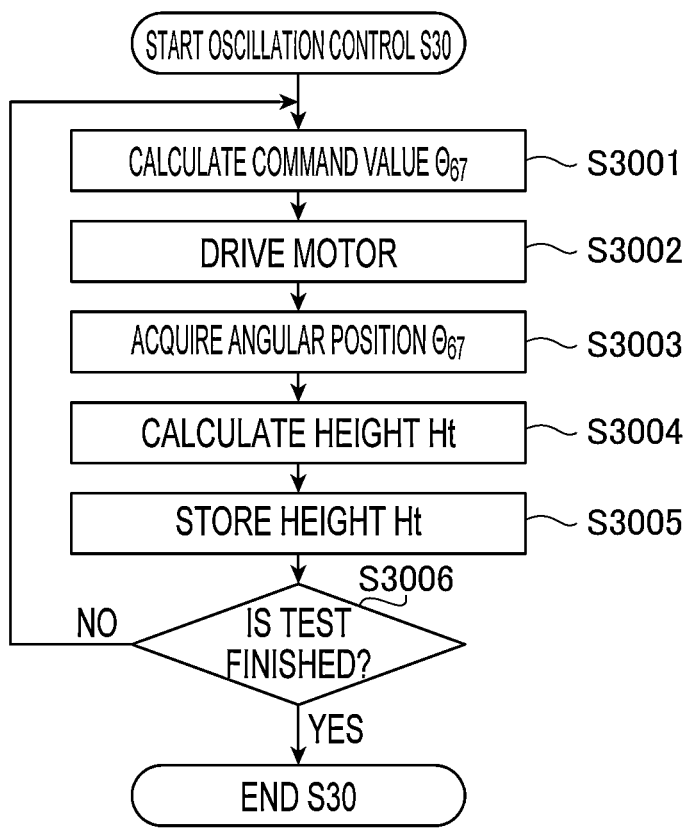
FIG. 33 is a flowchart showing a procedure of an oscillation control.

FIG. 33 is a flowchart showing a procedure of the oscillation control S30. In the oscillation control S30, first, a command value of an angular position $\Theta_{67}$ of the shaft of the servomotor 67 of the output side drive part 60 is calculated from a target value of a height Ht of the movable base 66 and a pitch of the feed screw of the feed screw mechanism 364b which can be obtained from the set test condition (S3001). Then, the servomotor 67 is driven in accordance with the command value of the angular position $\Theta_{67}$ (S3002).

Next, the measured value of the angular position $\Theta_{67}$ of the shaft detected by the rotary encoder RE built in the servomotor 67 is acquired (S3003), and the height Ht of the movable base 66 is calculated from the measured value of the angular position $\Theta_{67}$ and the pitch of the feed screw of the feed screw mechanism 364b (S3004) and stored (S3005), thereby a single oscillation control (the oscillation control for one control point) (S3001 to S3005) ends. The oscillation control (S3001 to S3005) is repeatedly executed until the test ends (S3006: YES).

(End-Abutment Control)

In the durability test of the steering device, the steering shaft W1 of the specimen W is repeatedly reciprocated a predetermined number of times (or a predetermined test time) over the entire movable range (from one end-abutment position to the other end-abutment position). In the conventional test device, the steering shaft W1 is rotationally driven at a constant speed until the steering shaft W1 reaches the end of the movable range, and a control for reversing the driving direction of the steering shaft W1 is performed after a torque jump generated when the steering shaft W1 reaches the end of the movable range (end-abutment) is detected. Therefore, for example, in case of a rack-and-pinion type steering device, when the rack end reaches the end-abutment position at a constant speed, the nick end collides with the gear case, and thus a destructive impact may act on the specimen W. Similarly to the rack-and-pinion type, since other types of steering device are also provided with a stopper that restricts the movable range, a similar destructive impact may occur when the end-abutment position is reached.

The end-abutment control S9 of the present embodiment is a drive control that makes it possible to prevent breakage of the specimen W due to an impact generated at the time of end-abutment by performing a control such that a torque equal to or larger than a preset maximum value does not act on the steering shaft W1 of the specimen W at the time of the end-abutment.

Figure 34:
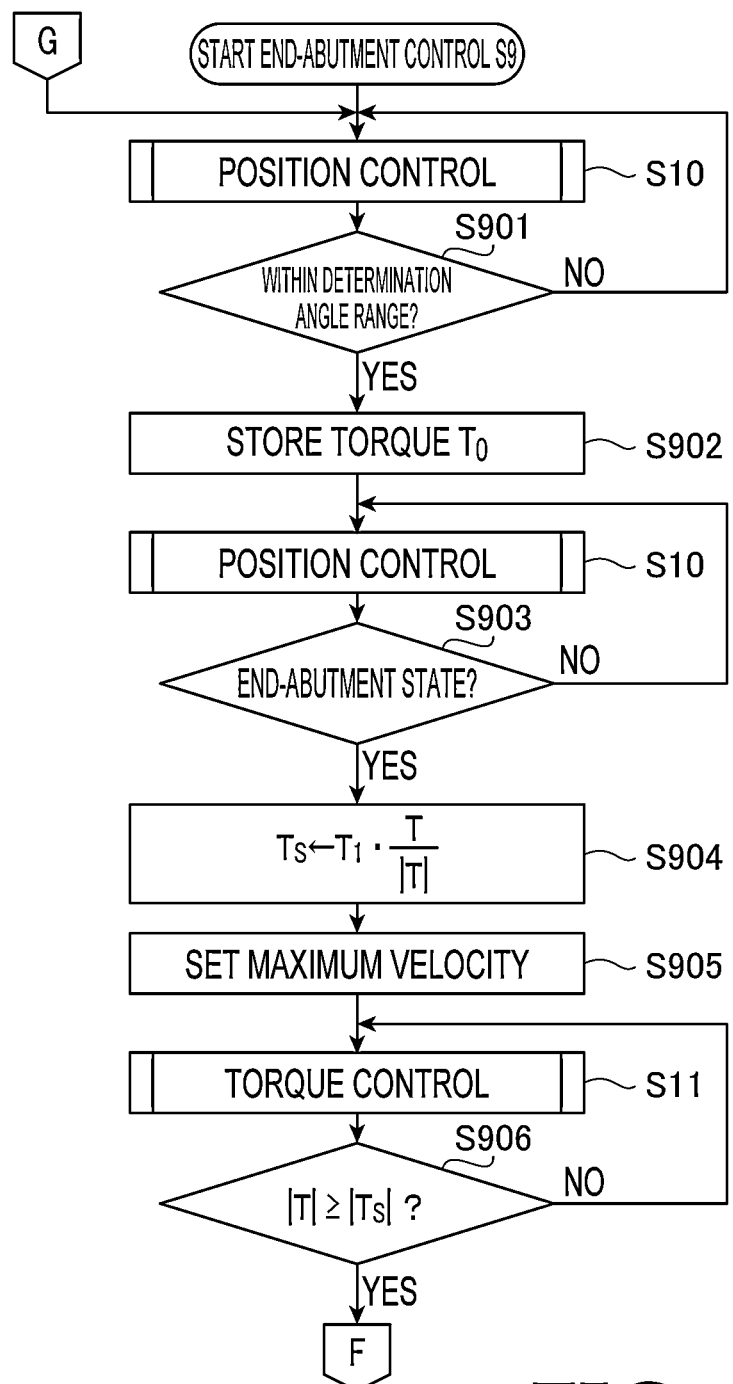
FIG. 34 is a flowchart showing a procedure of an end-abutment control.
Figure 35:
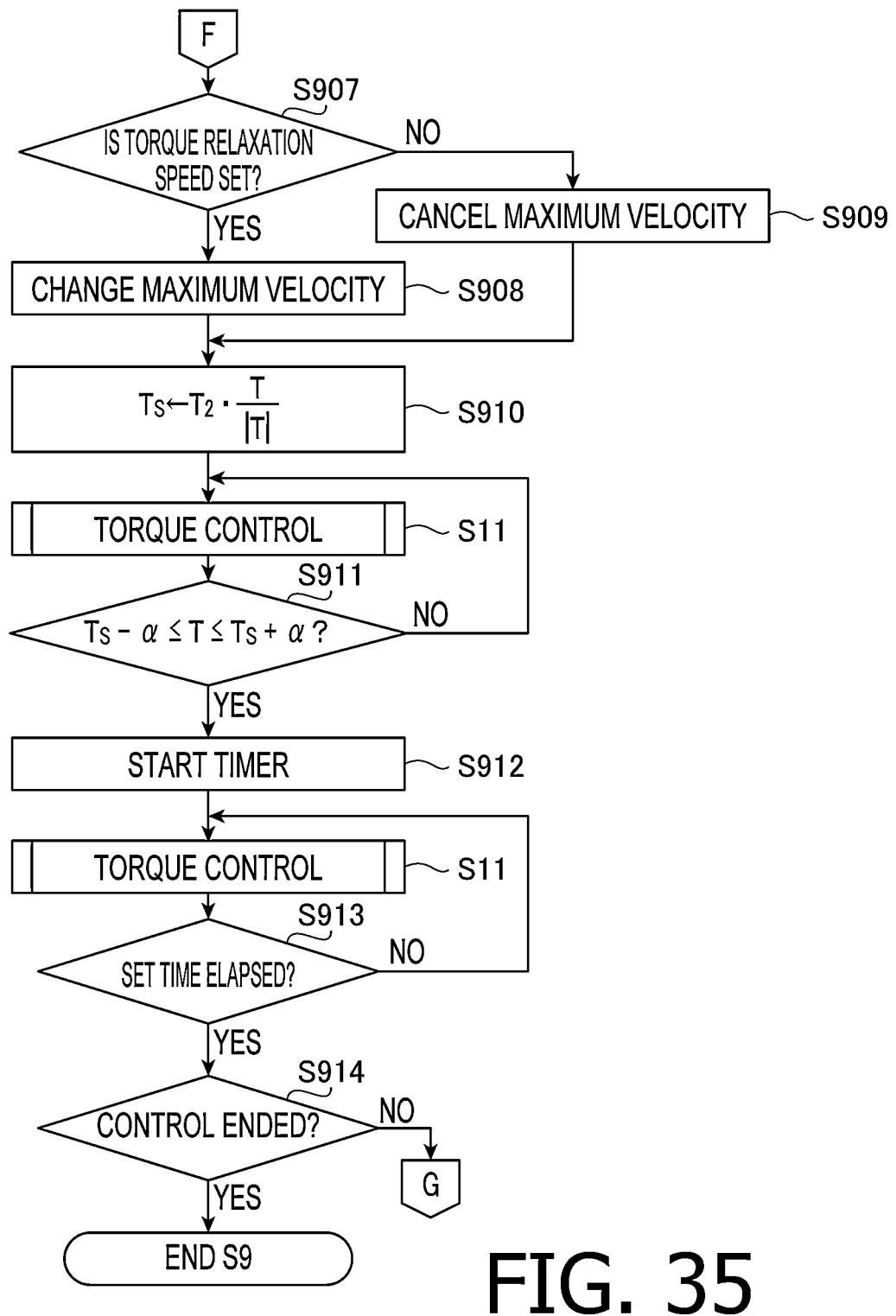
FIG. 35 is a flowchart showing a procedure of the end-abutment control.

FIGS. 34 to 35 are a flowchart showing a procedure of the end-abutment control S9. In the end abutment control S9, first, a position control, that is, the input shaft control S10 (FIG. 24) for the input side drive part 20 is performed, and the steering shaft W1 is rotationally driven at a preset angular velocity $\omega_{20}$. It is noted that the input shaft control S10 of the present embodiment is a position control in which the angular position $\theta_{20}$ of the steering shaft W1 is used as a controlled variable, and the control is performed using a target value of the angular position $\theta_{20}$ calculated from a setting value of the angular velocity $\omega_{20}$ of the steering shaft W1. Further, in the end abutment control S9, the input shaft control (S1001 to S1007) is not repeated (i.e., the determination S1009 is skipped), and is executed only once.

Next, it is determined whether the angular position $\theta_{20}$ of the steering shaft W1 acquired in the input shaft control S10 is within the end-abutment determination angle range (an end abutment determination S901). The end-abutment determination angle range is a region set at and near the end-abutment position. The input shaft control S10 is continued until the angular position $\theta_{20}$ of the steering shaft W1 reaches the end abutment determination angle range. When the angular position $\theta_{20}$ of the steering shaft W1 reaches the end-abutment determination angle range (S901: YES), the torque T of the steering shaft W1 at the time is stored as an initial torque $T_0$ before the end-abutment (S902).

Then, the input shaft control S10 is continuously repeated until the end-abutment state is reached (S903: YES). It is noted that, in the present embodiment, whether the specimen W is in the end-abutment state is determined based on whether the following equation (10) is satisfied (end-abutment determination).

$$|T| \geq r_T/100 \cdot (T_1 - |T_0|) + |T_0| \tag{10}$$

Where:
T is a measured value of the torque,
$r_T$ is an end-abutment determination criterion (%),
$T_1$ is a maximum torque, and
$T_0$ is an initial torque.

It I noted that the initial torque $T_0$ varies depending on how the specimen W is attached or the like, and is one of the factors that cause errors in the measured value of the torque. By subtracting the initial torque $T_0$ as shown in Equation (10), accuracy of the end-abutment determination can be improved. However, the end-abutment determination may be made by the following equation (10') without subtracting the initial torque $T_0$. In this case, a reference value (a setting value) of the torque for determining whether the specimen W is in the end-abutment state is obtained by multiplying the maximum torque $T_1$ (referred to as a "first target torque") by the determination criterion $r_T$.

$$|T| \geq r_T/100 \cdot T_1 \tag{10'}$$

The determination based on Equation (10) or (10') is performed by the control part 82. In this determination, the control part 82 functions as a torque setting value calculating part, and calculates a torque setting value different from the maximum torque $T_1$ based on the maximum torque $T_1$ and the end abutment determination criterion $r_T$ by the right side of each equation. Specifically, the control part 82 (the torque setting value calculating part) calculates, for example, a value obtained by multiplying the maximum torque by the determination criterion $r_T$ as the torque setting value.

The maximum torque $T_1$ is a preset maximum value of the torque and is set to, for example, a value equal to or less than a maximum value of an allowable torque of the specimen W. The end-abutment determination criterion $r_T$ is an index of a reference value of magnitude of the torque for determining the end-abutment state (referred to as an "end-abutment determination torque $T_d$") and is defined by a ratio (percentage) of the end-abutment determination torque $T_d$ to the maximum torque $T_1$, the end-abutment determination torque $T_d$ and the maximum torque $T_1$ being respectively zero-point corrected with the initial torque $T_0$. More specifically, the end-abutment determination criterion $r_T$ is defined by the following equation (11).

$$r_T = (T_d - |T_0|)/(T_1 - |T_0|) \times 100 \tag{1}$$

By setting the reference value of the torque by using the end-abutment determination criterion n in percentage, the determination criterion can be intuitively grasped, and the same determination criterion $r_T$ can be used regardless of the type of the specimen W (i.e., difference in the allowable torque). It is noted that, in place of the end-abutment determination criterion $r_T$, the end-abutment determination torque $T_d$ may be directly set.

It is noted that the maximum torque $T_1$ is set by the torque local limit setting part E81LT of the limit setting screen Sc8 (FIG. 18). Further, the end-abutment determination torque $T_d$ is set, for example, by the waveform pattern edit screen Sc7. That is, the torque local limit setting part E81LT and the waveform pattern edit screen Sc7 function as a torque setting value receiving part that receives a user input of a torque control condition (setting values of the torque T).

When the end-abutment state is reached (S903: YES), the maximum torque $T_1$ is set to the target value $T_S$ of the input shaft control (torque control) S11 which will be described later (S904), and a maximum value of the angular velocity $\omega_{20}$ of the steering shaft W1 (i.e., the angular velocity $\omega_{20}$ of the input side drive part 20) in the torque control S11 is set (S905). Then, the drive control of the input side drive part 20 is switched from the position control S10 to the torque control S11. By setting the maximum value of the angular velocity $\omega_{20}$ in S905, since the rotation of the steering shaft W1 is controlled so as not to exceed the set maximum value of the angular velocity $\omega_{20}$, occurrence of an impact due to sudden driving of the steering shaft W1 can be prevented.

Figure 36:
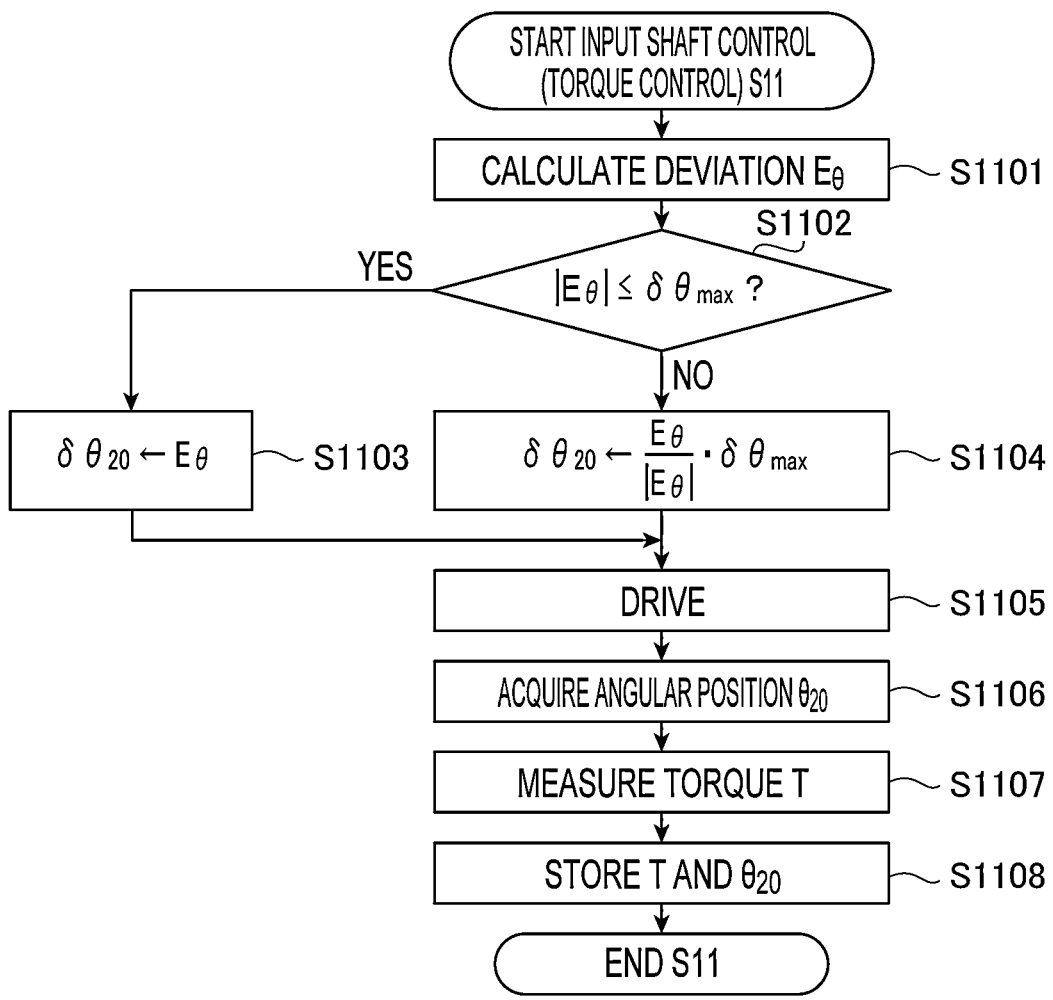
FIG. 36 is a flowchart showing a procedure of an input shaft control (a torque control).

FIG. 36 is a flowchart showing a procedure of the torque control S11. The torque control S11 is a drive control of the input side drive part 20 in which the torque T of the steering shaft W1 is used as a controlled variable. In the torque control S11, first, the deviation $E_\theta$ of the angular position $\theta_{20}$ of the steering shaft W1 is calculated by the following equation (12) (S1101). It is noted that the conversion coefficient $K_{T-\theta}$ is a constant defined as a change amount $\Delta\theta_{20}$ of the angular position for changing the torque T by one unit (for example, 1N·m), and is obtained in advance experimentally or by simulation.

$$E_\theta = K_{T-\theta} \cdot E_T = K_{T-\theta}(R_T - Y_T) \tag{12}$$

Where:
$E_\theta$ is a deviation of the angular position $\theta_{20}$ of the steering shaft W1,
$K_{T-\theta}$ is a torque T-angular position $\theta_{20}$ conversion coefficient,
$E_T$ is a deviation of the torque T,
$R_T$ is a target value of the torque T of the steering shaft W1, and
$Y_T$ is a measured value of the torque T of the steering shaft W1.

Next, it is determined whether a magnitude of the deviation $E_\theta$ is equal to or less than a maximum operation amount $\delta\theta_{max}$ corresponding to the maximum value of the angular velocity $\omega_{20}$ of the steering shaft W1 (S1102). When the magnitude of the deviation $E_\theta$ is equal to or less than the maximum operation amount $\delta\theta_{max}$ (S1102: YES), the value of the deviation $E_\theta$ is set to the operation amount $\delta\theta_{20}$ so that the deviation $E_\theta$ is eliminated (S1103). When the magnitude of the deviation $E_\theta$ is larger than the maximum operation amount $\delta\theta_{max}$ of the input side drive part 20 (S1102: NO), the operation amount $\delta\theta_{20}$ of the input side drive part 20 is set to a value having the same magnitude as the maximum operation amount $\delta\theta_{max}$ and the same sign as the deviation $E_\theta$ (S1104). Then, the servomotor 21 is driven by an angle $\delta\Theta_{21}$ (=$\delta\theta_{20}/r_{22}$) corresponding to the operation amount $\delta\theta_{20}$ (S1105).

Next, the angular position $\theta_{20}$ of the steering shaft W1 is acquired (S1106) and the torque T is measured (S1107), and the angular position $\theta_{20}$ and the torque T are stored (S1108), thereby one cycle of the torque control S11 ends. The torque control S11 is repeated until the magnitude of the torque T of the steering shaft W1 becomes equal to or larger than the magnitude of the target value $T_S$, (i.e., the maximum torque $T_1$) (S906: YES).

Next, when a torque relaxation speed $r_{RT}$ (unit: N·m/s) is set (S907: YES), the maximum value of the angular velocity $\omega_{20}$ of the steering shaft W1 is changed to a value $K_{T-\theta} \cdot r_{RT}$ corresponding to the torque relaxation speed $r_{RT}$ (S908). By this configuration, since the torque gradually changes at the torque relaxation speed $r_{RT}$, stability of the torque control improves. Further, when the torque relaxation speed $r_{RT}$ is not set (S907: NO), the setting of the maximum value of the angular velocity $\omega_{20}$ of the steering shaft W1 is cancelled (S909). It is noted that, when the torque relaxation speed $r_{RT}$ is not set, the maximum value of the angular velocity W20 set in the process S905 may be maintained without canceling the setting of the maximum value of the angular velocity $\omega_{20}$.

Then, a preset holding torque $T_2$ (referred to as a "second target torque") is set to the target value $T_S$ of the torque control S11 (S910) and the torque control S11 is performed. When the torque T substantially reaches the target value $T_S$ (i.e., the holding torque $T_2$) (S911: YES), a timer is started (S912), the torque control S11 is continued until a set time (referred to as a "duration") elapses (S913: YES), and the holding torque $T_2$ of the steering shaft W1 is maintained for the set time. The end-abutment control S9 described above is repeatedly executed until the test ends (S914: YES). It is noted that, when the test continues (S914: NO), the drive control method of the input side drive part 20 is switched from the position control S10 to the torque control S11.

(Reversing Control)

The end-abutment control S9 described above is a control for applying a predetermined impulse to the steering shaft W1 at the end-abutment position (specifically, for maintaining the predetermined holding torque T2 for the set time). However, there is also a case where a control for immediately reversing the rotation direction without applying the impulse to the steering shaft W1 at the end-abutment position is required. When such reversal of driving is performed by a normal position control, unintended sudden torque fluctuation (impact) may occur at the time of the reversal, and validity of the test result may be impaired. A reversing control S50, which will be described next, is a control for reversing driving of the steering shaft W1 so that the sudden torque fluctuation does not occur when the end-abutment position is reached.

Figure 37:
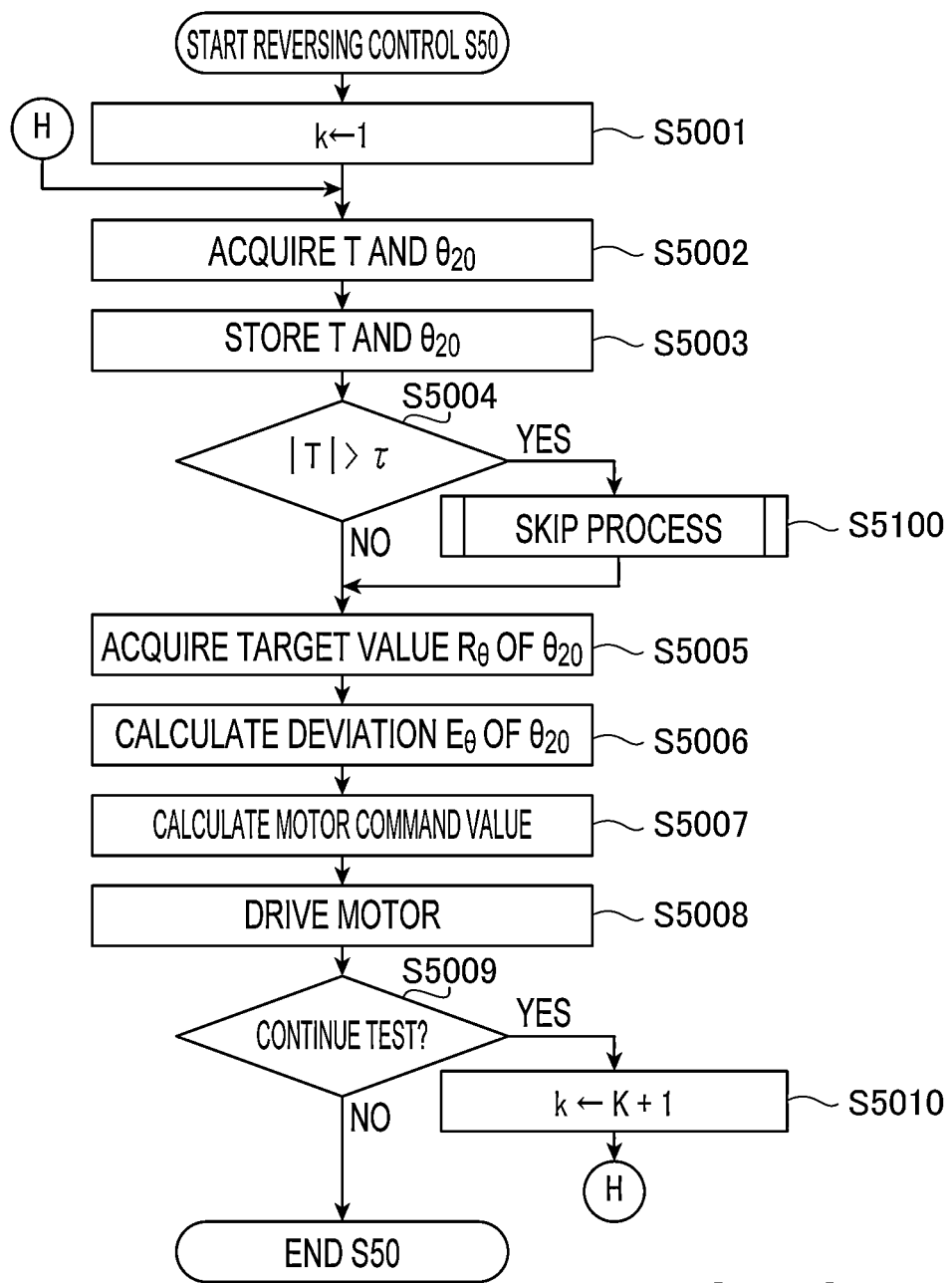
FIG. 37 is a flowchart showing procedure of reverse control.
Figure 38:
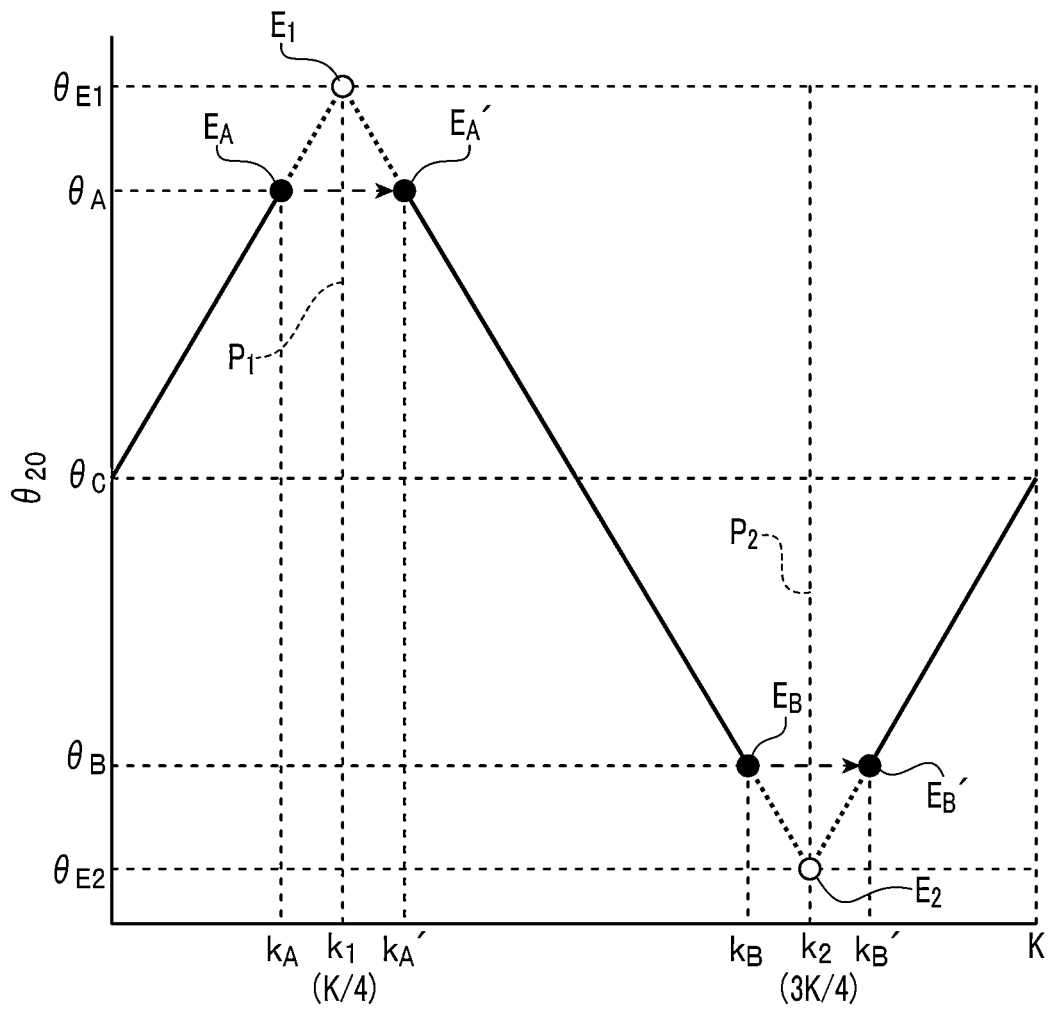
FIG. 38 is a graph (an input shaft test waveform) for explaining a behavior of the reverse control.

FIG. 37 is a flowchart showing a procedure of the reversing control S50. FIG. 38 is a graph (an input shaft waveform) for explaining the behavior of the reversing control S50. Specifically, FIG. 38 shows a waveform of the angular position $\theta_{20}$ of the steering shaft W1, which is a controlled variable, in which the abscissa represents a control point k equivalent to the time axis and the ordinate represents the angular position $\theta_{20}$. It is noted that the reversing control S50 is a process similar to the input shaft control S10, which is a normal position control, except that the reversing control S50 includes a skip process S5100 (and a determination S5004 as to whether to execute the skip process S5100), which will be described later.

In the reversing control S50, first, a counter k representing the control point k is reset to an initial value "1" (S5001). Next, the measured values of the angular position $\theta_{20}$ and the torque T of the steering shift W1 are acquired (S5002) and stored in association with the counter k (S5003).

Next, it is determined whether the magnitude of the torque T of the steering shaft W1 exceeds the reference value τ (i.e., the end-abutment position is reached) (S5004). When the magnitude of the torque T exceeds the reference value τ and it is determined that the end-abutment position is reached (S5004: YES), the skip process S5100 is then performed. The skip process S5100 is a process of skipping a region of the control points k (a portion indicated by a dotted line in FIG. 38) in which the torque T is expected to greatly exceed the reference value τ due to the end-abutment, and of advancing the counter to a control point k (for example, $k_A'$ or $k_B'$ in FIG. 38) at which the torque T is expected to be substantially equal to that at the time (i.e., the reference value τ). Details of the skip process S5100 will be described later.

When the magnitude of the torque T is not exceeding the reference value τ (S5004: NO), the target value $R_θ$ of the angular position $θ_{20}$ corresponding to the control point k is acquired (S5005). The target value RA is calculated based on a preset input shaft waveform (a numerical table or a function representing the relationship between the control point k and the angular position $θ_{20}$ shown in FIG. 38). Next, the deviation $E_θ$ of the angular position $θ_{20}$ is calculated (S5006), the command value $Ω_{62}$ of the servomotor 62 is calculated based on the deviation $E_θ$ (S5007), and the servomotor 62 is driven by the command value $Ω_{62}$ (S5008). If the test is to be continued (S5009: YES), the counter k is incremented (S5010), and the process returns to step S5002. The processes S5002 to S5010 are repeatedly executed until the test ends.

Next, the skip process S5100 will be described. In the input shalt waveform shown in FIG. 38, a waveform for one cycle (control cycle) is set, and the control of the rotational driving of the steering shaft W1 based on this input shaft waveform is continuously repeated over a predetermined period (for example, 2000 hours).

In the input shaft control shown in FIG. 38, the steering shaft W1 is driven to reciprocally rotate at a constant angular velocity $ω_{20}$ between both ends of an assumed movable range of the steering shaft W1 (assumed end-abutment positions $θ_{E1}$ and $θ_{E2}$). The end-abutment positions of the steering shaft W1 gradually change during a long-term durability test. Therefore, in order to reliably reach the end-abutment positions, the assumed end-abutment positions $θ_{E1}$ and $θ_{E2}$ are set to positions outside the actual initial end-abutment positions $θ_A$ and $θ_B$ (i.e., positions away from the center position $θ_C$) which are checked in the centering process S4 or the like before the durability test. Therefore, the angular position $θ_{20}$ of the steering shaft W1 reaches the actual end abutment positions $θ_A$ and $θ_B$ before reaching the assumed end-abutment positions $θ_{E1}$ and $θ_{E2}$, and the torque T exceeds the reference value τ.

Figure 39:
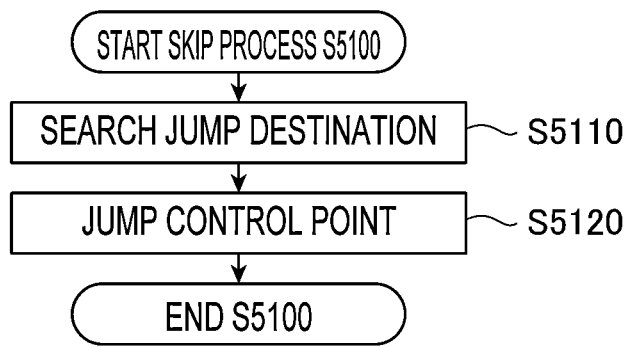
FIG. 39 is a flowchart showing a procedure of a skip process.

FIG. 39 is a flowchart showing a procedure of the skip process S5100. As described above, the skip process S5100 is a process of skipping the dotted line portions near points $E_1$ and $E_2$ on the input shaft waveform (i.e., the assumed end-abutment positions $θ_{E1}$ and $θ_{E2}$) where the torque T is expected to greatly exceed the reference value τ, and moving from points $E_A$ and $E_B$ to points $E_A'$ and $E_B'$ at the same angular positions $θ_A$ and $θ_B$ when points $E_A$ and $E_B$ (i.e., the end-abutment positions $θ_A$ and $θ_B$) on the input shaft waveform shown in FIG. 38 are reached and the magnitude of the torque T exceeds the reference value τ.

For this purpose, first, points $E_A'$ and $E_B'$ on the input shaft waveform at the same angular positions $θ_A$ and $θ_B$ as the points $E_A$ and $E_B$ are searched (S5110). In the example of the input shaft waveform shown in FIG. 38, the points $E_A$ and $E_A'$ are located symmetrically with respect to a perpendicular line $P_1$ passing through the point $E_1$, and the points $E_B$ and $E_B'$ are located symmetrically with respect to a perpendicular line $P_2$ passing through the point $E_2$. Further, since the number K of control points constituting the input shaft waveform is a known value set in advance and the points $E_1$ and $E_2$ are located at ¼ cycle and ¾ cycle of the input shaft waveform, respectively, a control point $k_1$ at the point $E_1$ and a control point $k_2$ at the point $E_2$ are K/4 and K3/4, respectively. Therefore, the control point $k_A'$ at the point $E_A'$ and the control point $k_B'$ at the point $E_B'$ are calculated by the following equations (13) and (14), respectively.

$$k_A' = k_A + 2 \times (k_1 - k_A) \qquad (13)$$
$$= k_A + 2 \times \left(\frac{K}{4} - k_A\right)$$
$$= \frac{K}{2} - k_A$$
$$k_B' = k_B + 2 \times (k_2 - k_B) \qquad (14)$$
$$= k_B + 2 \times \left(\frac{3}{4}K - k_B\right)$$
$$= \frac{3}{2}K - k_B$$

When the magnitude of the torque T exceeds the reference value τ (i.e., when the point $E_A$ is reached) during the rotational driving of the steering shaft W1 in the CW direction, the process jumps to the control point $k_A'$ (point $E_A'$) calculated by Equation (13) (S5120), and the skip process S5100 ends. Thereafter, the steering shaft W1 is rotationally driven in accordance with the input shaft waveform by the normal position control until the magnitude of the torque T exceeds the reference value τ again.

As can be seen from the fact that an inclination of the input shaft waveform reverses across the jump from the point $E_A$ to the point $E_A'$, a direction of the rotational driving of the steering shaft W1 reverses across the jump (i.e., at the end-abutment position $θ_A$). Further, since the angular position $θ_A$ of the steering shaft W1 does not change before and after this reversal, the torque T does not greatly change before and after the reversal, and the driving is smoothly reversed without impact. Therefore, it is possible to perform the test without causing unexpected damage to the specimen W or the test device 1 due to the impact at the time of the reversal.

<Modifications>

Figure 40:
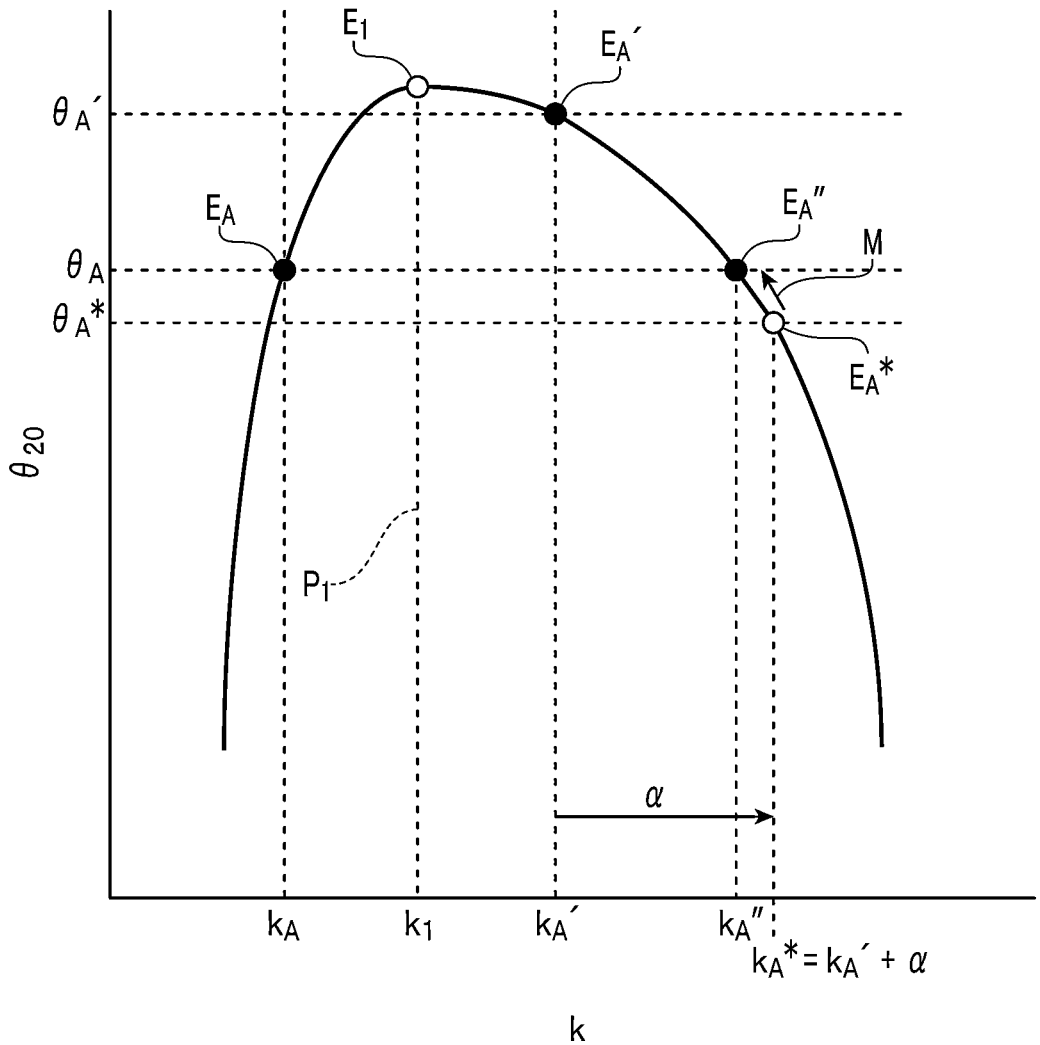
FIG. 40 is a graph (an input axis test waveform) for explaining a behavior of a modification of a jump destination search process.

The calculation of the control points $k_A'$ and $k_B'$ as the jump destinations by the above equations (13) and (14) in the process S5110 is based on the premise that the input shaft waveform is symmetrical with respect to the perpendicular lines $P_1$ and $P_2$ in the vicinity of the points $E_1$ and $E_2$, respectively. However, since the input shaft waveform can be arbitrarily set, the input shaft waveform does not necessarily have the above-described symmetry. For example, as shown in FIG. 40, when the shape of the input shaft waveform in the vicinity of the point $E_1$ is asymmetric with respect to the perpendicular line $P_1$, the angular position $θ_A'$ of the point $E_A'$ (the control point $k_A'$) obtained by Equation (13) is further outside the end-abutment position $θ_A$ (i.e., away from the center position $θ_C$). Therefore, at the point $E_A'$, a strong torque T that acts to move the angular position $θ_{20}$ back toward the center position $θ_C$ acts on the steering shaft W1. Therefore, since a sudden increase in the torque T (i.e., an impact) occurs when jumping from the control point $k_A$ (point $E_A$) to the control point $k_A'$ (point $E_A'$), an unplanned stress acts on the specimen W, and validity of the test result may be impaired.

A modification of the process S5110 which will be described below effectively prevents the occurrence of an impact at the time of the reversal even when the test is performed with an input shaft waveform asymmetric with respect to the perpendicular lines $P_1$ and $P_2$.

Figure 41:
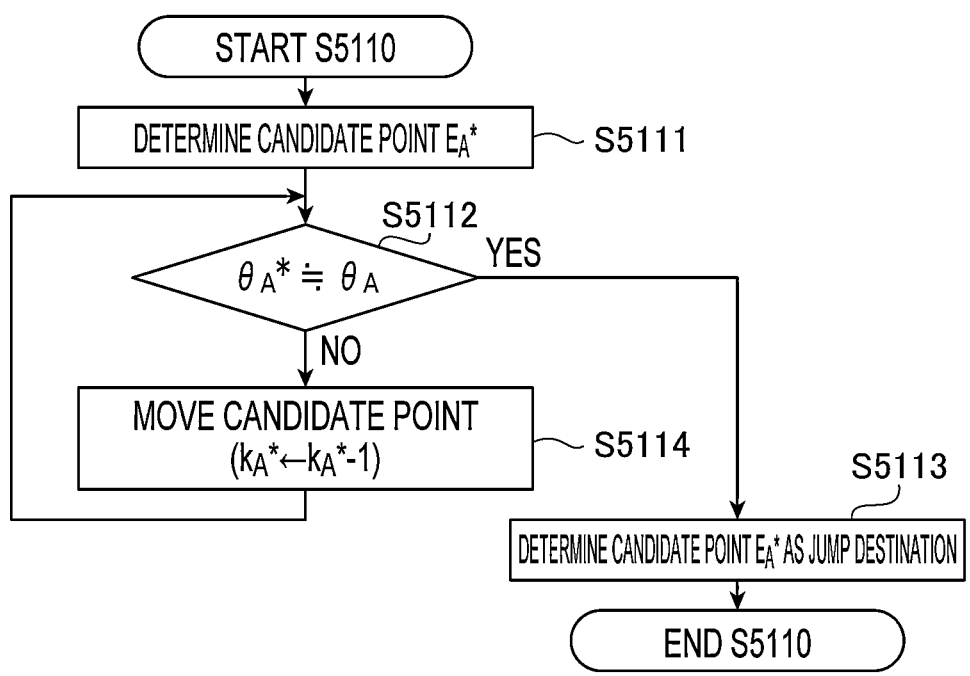
FIG. 41 is a flowchart showing a procedure of a modification of the jump destination searching process.

FIG. 41 is a flowchart showing a procedure of a modification of the jump destination search process S5110. In this modification, first, a jump destination candidate point $E_A*$ shown in FIG. 40 is determined (S5111). As described above, in the case of the input shaft waveform asymmetric with respect to the perpendicular line $P_1$ such as the one shown in FIG. 40, if the control jumps to the point $E_A'$ of the control point $k_A'$ obtained by the equation (13), an impact may occur. Therefore, in the present modification, a point $E_A*$ which is a point further ahead of the point $E_A'$ (a point whose value of the control point k is larger) is set as a candidate point. Specifically, the control point $k_A*$ of the candidate point $E_A*$ is calculated by the following equation (15).

$$k*_A = k'_A + \alpha \quad (15)$$

Where $\alpha$ is a positive number.

Next, the angular position $\theta_A*$ of the candidate point $E_A*$ is calculated from the control point $k_A*$ of the candidate point $E_A*$ obtained by the equation (15) and the input shaft waveform, and it is determined whether the angular position $\theta_A*$ of the candidate point $E_A*$ is sufficiently close to the end-abutment position $\theta_A$ (i.e., whether the angular position $\theta_A*$ is close to the end-abutment position $\theta_A$ to the extent that an impact that may affect the test result does not occur when jumping to the candidate point $E_A*$) (S5112). Specifically, whether the angular position $\theta_A*$ of the candidate point $E_A*$ is sufficiently close to the end-abutment position $\theta_A$ is determined by whether the following equation (16) is satisfied (i.e., whether a deviation of the angular position $\theta_A*$ from the end-abutment position $\theta_A$ is equal to or less than a reference value $\delta\theta_A$).

$$|\theta_A* - \theta_A| \leq \delta\theta_A \quad (16)$$

Where $\delta\theta_A$ is a positive constant (a reference value for the determination S5112).

If the angular position $\theta_A*$ of the candidate point $E_A*$ is sufficiently close to the end-abutment position $\theta_A$ (S5112: YES), the candidate point $E_A*$ is determined to be the jump destination (S5113), and the process S5110 of searching for the jump destination ends. If the angular position $\theta_A*$ is not sufficiently close to the end-abutment position $\theta_A$ (S5112: NO), the control point $k_A*$ is decremented by one, and the candidate point $E_A*$ is moved toward the point $E_1$ (S5114). Then, the process returns to the process S5112, and it is determined whether the angular position $\theta_A*$ of the candidate point $E_A*$ after the move is sufficiently close to the end-abutment position $\theta_A$. The processes S5112 and S5114 are repeated until it is determined that the angular position $\theta_A*$ of the candidate point $E_A*$ is sufficiently close to the end-abutment position $\theta_A$. In the input shat waveform shown in FIG. 40, when the candidate point $E_A*$ reaches a point $E_A"$ (or the vicinity thereof), it is determined that the angular position $\theta_A*$ of the candidate point $E_A*$ is sufficiently close to the end-abutment position $\theta_A$.

In the above-described modification, since the control point is jumped after it is confirmed that the angular position $\theta_A"$ of the jump destination point $E_A"$ is sufficiently close to the end-abutment position $\theta_A$ (current position), it is possible to more reliably prevent the impact generated when reversing the rotational drive of the steering shaft W1.

In the above-described modification, the first candidate point $E_A*$ is set on the inner side of the end-abutment position $\theta_A$ (on the center position $\theta_C$ side), and the jump destination is searched from the inner side toward the outer side (upward in the graph of FIG. 40 as indicated by the arrow M), but embodiments of the present disclosure are not limited to this configuration. Contrary to the above-described modification, the jump destination may be searched from a point outside the end-abutment position OA (for example, the point $E_1$ or the point $E_A'$) toward the inside.

It is noted that, when performing the search with the point $E_1$ as the starting point, the starting point can be easily set, but a distance (the number of control points) to the point $E_A"$, which is a point to be reached by the search, is longer than the distance to the point $E_A*$ or the point $E_A'$, and thus the amount of computation required for the search of the jump destination increases. Therefore, it is possible to efficiently search for the jump destination by setting a point located ahead of the point $E_1$ (i.e., a point having a larger number of control points) as the starting point.

In addition, the direction of the search for the jump destination (i.e., a direction in which the candidate point $E_A*$ is moved in the process S5114) needs to be, of course, a direction in which the candidate point FA* approaches a reaching point $E_A"$ of the search. In the above-described modification, the constant $\alpha$ for determining the candidate point $E_A*$ of the first jump destination is set to a large value so that the candidate point $E_A*$ is always set ahead (on the right side in FIG. 40) of the reaching point $E_A"$ of the search. Therefore, in the process S5114, a process of decreasing the number of control points and moving the candidate point $E_A*$ to the left in FIG. 40 is unconditionally performed. However, when the constant $\alpha$ is set to a relatively small value or when the candidate point $E_A*$as the first jump destination is set to, for example, the point $E_A'$ (whose distance to the perpendicular line $P_1$ is the same as that of the point $E_A$), since the candidate point $E_A*$ is located on the left side of the reaching point $E_A"$ of the search in FIG. 40, it is necessary to move the candidate point $E_A*$ to the right in the process S5114. Therefore, in such a case, for example, it is necessary to provide a process of determining a positional relationship between the candidate point $E_A*$ and the reaching point $E_A"$ of the search (a magnitude relationship of the control points k), and to determine the direction in which the candidate point $E_A*$ is to be moved in accordance with the determination result.

The above is the description of embodiments of the present disclosure. The embodiments of the present disclosure are not limited to those described above, and various modifications are possible. For example, configurations obtained by appropriately combining the configurations of the embodiments and the like explicitly illustrated in the present specification and/or configurations of embodiments and the like obvious to those skilled in the art from the description in the present specification are also included in the embodiments of the present application.

In the above embodiment, in the load control Sa20, the converted value of the angular velocity $\Omega_{62}$ (Tr·$\omega_{20}/r_{63}$) calculated from the angular velocity $\omega_{20}$ of the input side drive part 20 is used as the target value $R_\Omega$ (Sa2012) only in the case of the first control cycle (Sa2010: YES). However, the process Sa2012 may be applied to a plurality of initial control cycles.

In the above-described embodiment, in the end-abutment control S9, the control for increasing the torque T once to the maximum torque $T_1$ and then gradually changing to the holding torque $T_2$ is performed. However, this process may be eliminated and the holding torque $T_2$ may be set to the target value from the beginning to perform the torque control S11.

In the above embodiment, in the end-abutment control S9, the holding torque $T_2$ is set to a value lower than the maximum torque $T_1$, but the holding torque $T_2$ may be set to a value higher than the maximum torque $T_1$.

In the above-described embodiment, the behavior of the entire test device 1 is defined by a single waveform pattern, but a sequence table may be composed from a plurality of waveform patterns that define different partial behaviors of the test device 1 (for example, three waveform patterns, namely, an input side waveform pattern, a right output side waveform pattern and a left output side waveform pattern, that respectively define behaviors of the input side drive part 20, the output side drive part 60R and the output side drive part 60L).

What is claimed is:

1. A test device, comprising:
    an input side drive part configured to rotationally drive a steering shaft of a steering device as a specimen;
    a control part configured to control the input side drive part; and
    a position detecting part configured to detect an angular position of the steering shaft,
    wherein the control part is configured to:
        control the input side drive part to restrict a maximum value of a torque of the steering shaft when the angular position of the steering shaft reaches an end-abutment position being an end of a mechanical movable range of the steering shaft, and
        control driving of the steering shaft by:
            a position control in which the angular position of the steering shaft is used as a controlled variable; and
            a torque control in which the torque of the steering shaft is used as a controlled variable,
    wherein the control part:
        performs the position control when the angular position of the steering shaft is outside a first angular range including the end-abutment position, and
        in response to determining that the angular position of the steering shaft is within the first angular range, switches the driving of the steering shaft from the position control to the torque control.

2. The test device according to claim 1, wherein, in the torque control, rotation of the steering shaft is controlled such that an angular velocity of the steering shaft does not exceed a predetermined maximum value.

3. The test device according to claim 1, wherein:
    a first target torque is set to a target value of the torque when the driving of the steering shaft is switched from the position control to the torque control, and
    the driving of the steering shaft is switched from the torque control to the position control when a predetermined duration elapses after the torque reached the first target torque.

4. The test device according to claim 1, wherein:
    a first target torque is set to a target value of the torque when the driving of the steering shaft is switched from the position control to the torque control, the target value of the torque is changed to a second target torque different from the first target torque when the torque reaches the first target torque, and
    the driving of the steering shaft is switched from the torque control to the position control when a predetermined duration elapses after the torque reached the second target torque.

5. The test device according to claim 1, comprising:
    an output side drive part configured to apply a load as an axial force to a tie rod of a steering device as a specimen; and
    a load detecting part configured to detect the load,
    wherein:
        the output side drive part includes a first motor configured to generate the load,
        the control part includes:
            a target value calculating part configured to calculate a target value of a controlled variable of the first motor based on a target value of the load; and
            a learning data generating part configured to generate learning data based on the measured value of the controlled variable of the first motor, and
        the target value calculating part calculates the target value of the controlled variable of the first motor based on the learning data when repeatedly applying the load having the same waveform to the tie rod, the target value calculating part including:
            a deviation calculating part configured to calculate a deviation of the load from the target value and the measured value of the load;
            a correction value calculating part configured to calculate a correction value of the controlled variable of the first motor from the deviation of the load; and
            a correcting part configured to output a value obtained by adding the correction value to a value of the learning data as the target value of the controlled variable of the first motor.

6. The test device according to claim 5, wherein when the control part repeatedly executes a control cycle consisting of a plurality of control points, the learning data is obtained by averaging the measured values of the controlled variable for a plurality of latest control cycles.

7. The test device according to claim 5, wherein the target value calculating part calculates the target value of the controlled variable of the first motor by using, as the learning data, a converted controlled variable obtained by converting the angular velocity of the steering shaft of the specimen into an angular velocity of the first motor when the number of the obtained measured values of the controlled variable of the first motor is fewer than a predetermined number.

8. The test device according to claim 1, wherein the control part includes:
    a torque setting value receiving part configured to receive an input of a maximum torque value being a setting value of maximum value of an allowable range of the torque, and a first index representing a setting value of the torque different from the maximum torque value; and
    a torque setting value calculating part configured to calculate a setting value of the torque based on the maximum torque value and the first index received by the torque setting value receiving part.

9. The test device according to claim 8, wherein:
    the first index is a ratio of the setting value of the torque to the maximum torque value, and the torque setting value calculating part calculates a value obtained by multiplying the maximum torque value by the first index as the setting value of the torque.

10. The test device according to claim 8, comprising a second motor configured to drive the steering shaft,
wherein the control part includes a command value calculating part configured to calculate a command value for the second motor based on the setting value of the torque.

11. The test device according to claim 1,
wherein the control part is configured to execute a centering process,
wherein the centering process includes:
a unidirectional drive step of rotationally driving the steering shaft in one direction until the torque of the steering shaft reaches a predetermined value;
a first end-abutment position detection step of detecting an angular position $\theta_A$ of the steering shaft when the torque of the steering shaft reaches the predetermined value by the unidirectional drive step;
a reverse direction drive step of rotationally driving the steering shaft in a reverse direction until the torque of the steering shaft reaches the predetermined value;
a second end-abutment position detection step of detecting an angular position $\theta_B$ of the steering shaft when the torque of the steering shaft reaches the predetermined value by the reverse direction drive step; and
a center position calculation step of calculating a center position $\theta_C$ of the movable range of the steering shaft by the following equation (1).

$$\theta_C = \frac{\theta_A + \theta_B}{2} \quad (1)$$

12. The test device according to claim 1, comprising:
an output side drive part configured to apply a load as an axial force to a tie rod of a steering device as a specimen; and
a load detecting part configured to detect the load,
wherein:
the output side drive part includes a movable base configured to be rotationally driven about a rotation axis orthogonal to a moving direction of the tie rod,
the movable base includes a pair of arms extending in a front-rear direction substantially orthogonal to the rotation axis and formed symmetrically with respect to a plane including the rotation axis, and
the tie rod is attached to one of the pair of arms.

13. The test device according to claim 12,
wherein the control part is configured to execute a polarity check process,
wherein the polarity check process includes:
an input receiving step of receiving an input indicating whether a type of the specimen is a front steer type or a rear steer type;
a first output side position detecting step of detecting an angular position of the movable base;
a driving step of rotationally driving the steering shaft in a predetermined rotation direction by a predetermined rotation angle;
a second output side position detecting step of detecting an angular position of the movable base after the driving step;
a rotation direction determining step of determining a rotation direction of the movable base in the driving step based on detection results of the first output side position detecting step and the second output side position detecting step; and
a polarity determining step of determining whether a relationship between the rotation direction of the steering shaft and the rotation direction of the movable base matches with the type of the specimen.

14. The test device according to claim 13,
wherein the polarity check process includes:
a maximum torque value reduction step of reducing a maximum torque value being a setting value of a maximum value of the torque of the steering shaft before the driving step; and
a maximum torque value restoring step of restoring the maximum torque value to an original value after the driving step.

15. The test device according to claim 12,
wherein the control part is configured to execute a speed transmission ratio detection process,
wherein the speed transmission ratio detection process includes:
an entire range rotational driving step of rotationally driving the steering shaft over a substantially entire range of the movable range of the steering shaft;
an entire range output side position detecting step of detecting, in the entire range rotational driving step, angular positions of the movable base for a plurality of angular positions of the steering shaft at predetermined intervals over substantially the entire range of the movable range of the steering shaft; and
a speed transmission ratio calculating step of calculating a speed transmission ratio being a ratio of a rotation angle of the movable base to the rotation angle of the steering shaft in each section of the movable range of the steering shaft divided at the plurality of angular positions, based on a detection result in the entire range output side position detecting step.

16. The test device according to claim 15, configured to:
intermittently drive the steering shaft at the predetermined interval in the entire range rotational driving step, and
detect the angular position of the movable base every time the steering shaft is rotationally driven by the predetermined interval in the entire range output side position detecting step.

17. The test device according to claim 16,
including a fitting step of determining a calculation formula representing a relationship between the angular position of the steering shaft and the speed transmission ratio based on a value of the speed transmission ratio in each of the sections calculated in the speed transmission ratio calculating step.

18. The test device according to claim 1, comprising:
an output side drive part configured to apply a load as an axial force to a tie rod of a steering device as a specimen; and
a load detecting part configured to detect the load,
wherein the control part includes:
a load setting value receiving part configured to receive a maximum load value being a setting value of a maximum value of an allowable range of the load and a second index indicating a setting value of the load different from the maximum load value; and
a load setting value calculating part configured to calculate a setting value of the load based on the maximum load value and the second index received by the load setting value receiving part.

19. The test device according to claim 18, wherein:

the output side drive part includes a first motor configured to generate the load, the second index is a ratio of the setting value of the load to the maximum load value, the load setting value calculating part outputs a value obtained by multiplying the maximum load value by the second index as the setting value of the load, and the control part includes a target value calculating part configured to calculate the target value of the controlled variable of the first motor based on the setting value of the load.

* * * * *